United States Patent [19]
Koza et al.

[11] Patent Number: 5,742,738
[45] Date of Patent: Apr. 21, 1998

[54] SIMULTANEOUS EVOLUTION OF THE ARCHITECTURE OF A MULTI-PART PROGRAM TO SOLVE A PROBLEM USING ARCHITECTURE ALTERING OPERATIONS

[75] Inventors: John R. Koza, 25372 La Rena La., Los Altos Hills, Calif. 94022; David Andre, Menlo Park; Walter Alden Tackett, San Francisco, both of Calif.

[73] Assignee: John R. Koza, Los Altos Hills, Calif.

[21] Appl. No.: 286,134

[22] Filed: Aug. 4, 1994

Related U.S. Application Data

[63] Continuation-in-part of Ser. No. 881,507, May 11, 1992, Pat. No. 5,343,554, which is a continuation-in-part of Ser. No. 787,748, Nov. 5, 1991, Pat. No. 5,136,686, which is a continuation of Ser. No. 500,791, Mar. 28, 1990, abandoned, which is a continuation-in-part of Ser. No. 196,973, May 20, 1988, Pat. No. 4,935,877.

[51] Int. Cl.$^6$ .............................. G06F 15/00; G06F 15/18
[52] U.S. Cl. ............................................................. 395/13
[58] Field of Search ................................................. 395/13

[56] References Cited

U.S. PATENT DOCUMENTS

| | | | |
|---|---|---|---|
| 4,697,242 | 9/1987 | Holland et al. | 395/13 |
| 4,935,877 | 6/1990 | Koza | 395/13 |
| 5,136,686 | 8/1992 | Koza | 395/13 |
| 5,343,554 | 8/1994 | Koza et al. | 395/13 |

OTHER PUBLICATIONS

N.L. Cramer "A Representation for the Adaptive Generation of Simple Sequential Programs", Proceedings of First Int'l. Conf. on Genetic Algorithms (1985), pp. 183–187.

Sims, Karl, "Artificial Evolution for Computer Graphics", *Computer Graphics*, vol. 25, No. 4, pp. 319–328, Jul. 1991.

Storer, James A. and Cohn, Martin, "The Use of Factual Theory in a Video Compression System", *Data Compression Conference DCC '92*, pp. 259–268, 1992.

de Groot, Marc, "Primordial Soup", San Francisco, California, Jan. 1992.

Kinsley, "A Darwinian Approach to Artificial Neural Systems"; Proc. of Systems, Man, and Cybernetics Conference, 1987, pp. 572–577.

Fujiki et al., "Using the Genetic Algorithm to Generate LISP Source Code to Solve the Prisoner's Dilemma"; Proc. of the 2nd Int. Conf. on Genetic Algorithms, Jul. 28–31, 1987, pp. 236–240.

Schaefer, "The Argot Strategy: Adaptive Representation Genetic Optimizer Technique", Proc. of the 2nd Int. Conf. on Genetic Algorithms, Jul. 28–31, 1987, pp. 50–58.

Schaffer et al., "An Adaptive Crossover Distribution Mechanism for Genetic Algorithms", Proc. of the 2nd Int. Conf. on Genetic Algorothms, Jul. 28–31, 1987, pp. 36–40.

Bickel et al., "Tree Structured Rules in Genetic Algorithms", Proc. of the 2nd Int. Conf. on Genetic Algorithms, Jul. 28–31, 1987, pp. 77–81.

De Jong, "On Using Genetic Algorithms to Search Program Spaces", Proc. of the 2nd Int. Conf. on Genetic Algorithms, Jul. 28–31, 1987, pp. 210–216.

(List continued on next page.)

*Primary Examiner*—Robert W. Downs
*Attorney, Agent, or Firm*—Blakely, Sokoloff, Taylor & Zafman

[57] ABSTRACT

An apparatus and method for solving problems where a population is created and evolved to generate a result. While solving the problem, the architecture of entities in the population are altered. Each of said entities may include internally and externally invoked sub-entities. The externally invoked sub-entities are capable of having actions, invocations of sub-entities which are invoked internally, and material. Also, each sub-entity which is invoked internally is capable of including actions, invocations of internally invocable sub-entities, material provided to the externally invocable sub-entity, and material.

51 Claims, 30 Drawing Sheets

OTHER PUBLICATIONS

Holland et al., "Cognitive Systems Based on Adaptive Algorithms", Cognitive Systems, 1978, pp. 313–329.

Dolan et al., "Symbolic Schemata in Connectionist Memories: Role Binding and the Evolution of Structure", UCLA-AL-87-11, pp. 1–23, 1987.

Dolan et al., "Towards the Evolution of Symbols", Proc. of the 2nd Int. Conf. on Genetic Algorithms, Jul. 28–31, 1987, pp. 123–131.

P.J. Angeline and J.B. Pollack, "The Evolutionary Induction of Subroutines," Proc. of the Fourteenth Annual Conf. of the Cognitive Science Society, pp. 236–241, Jul. 1992.

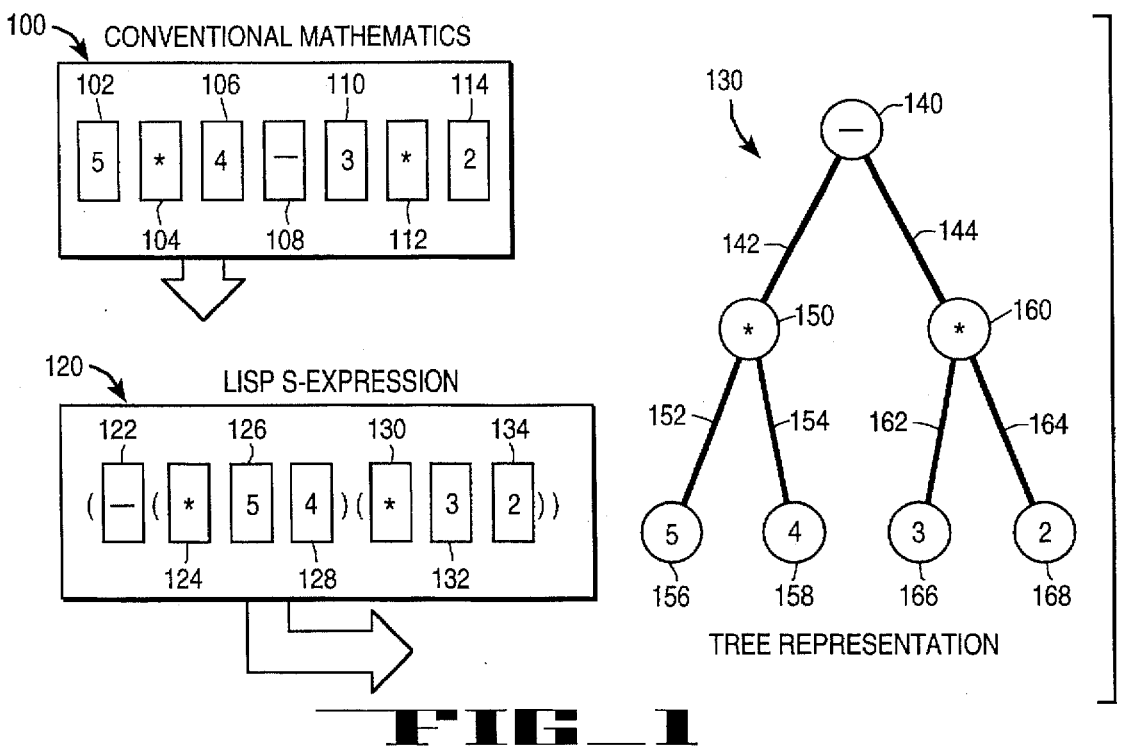
FIG_1
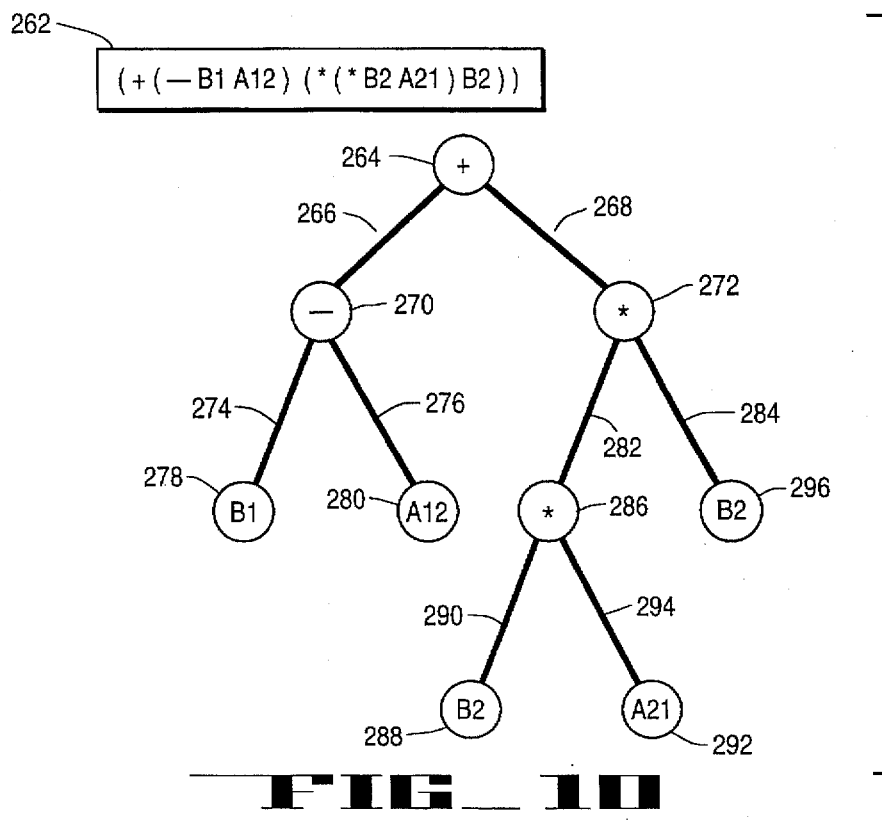
FIG_10

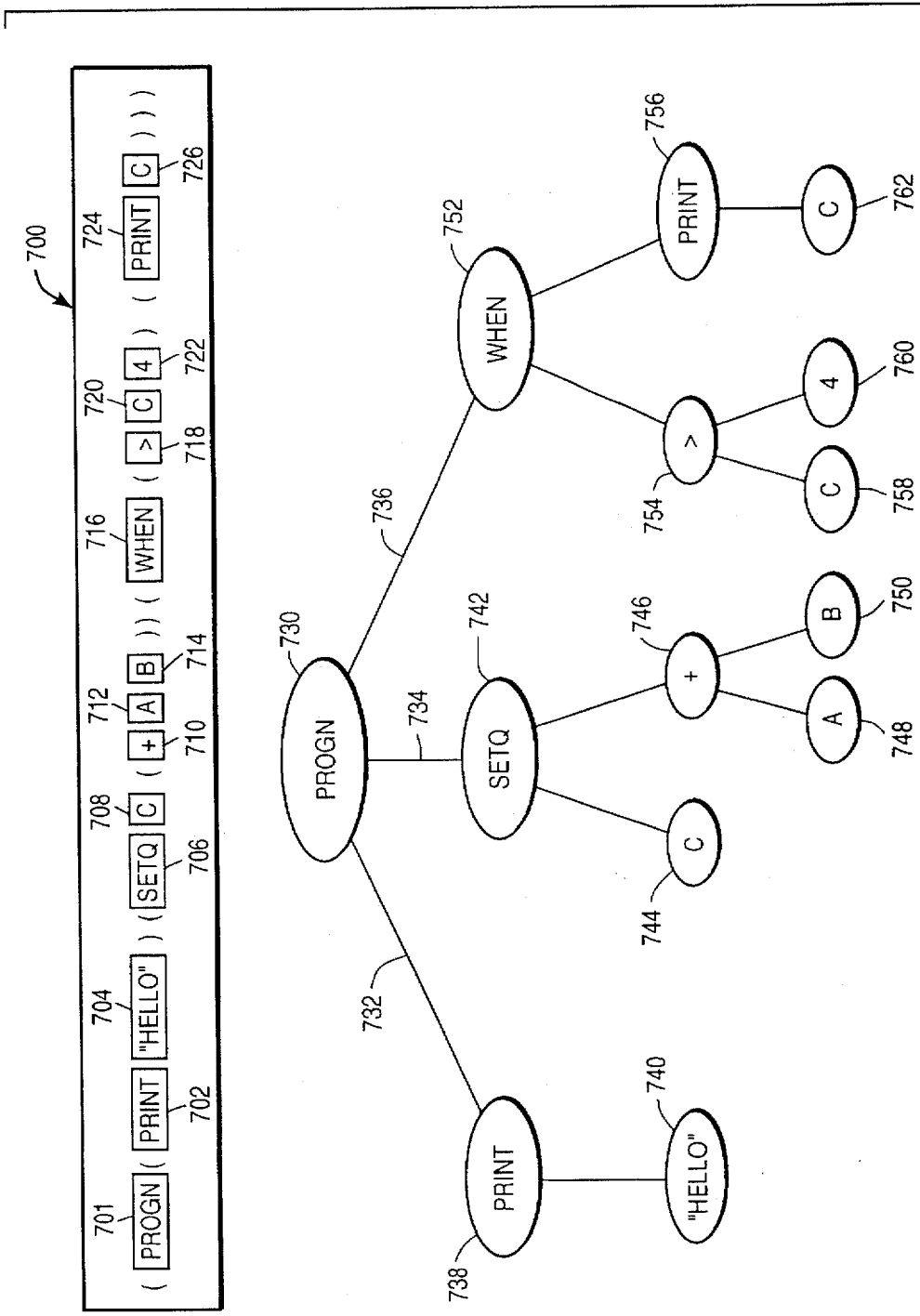
FIG_2

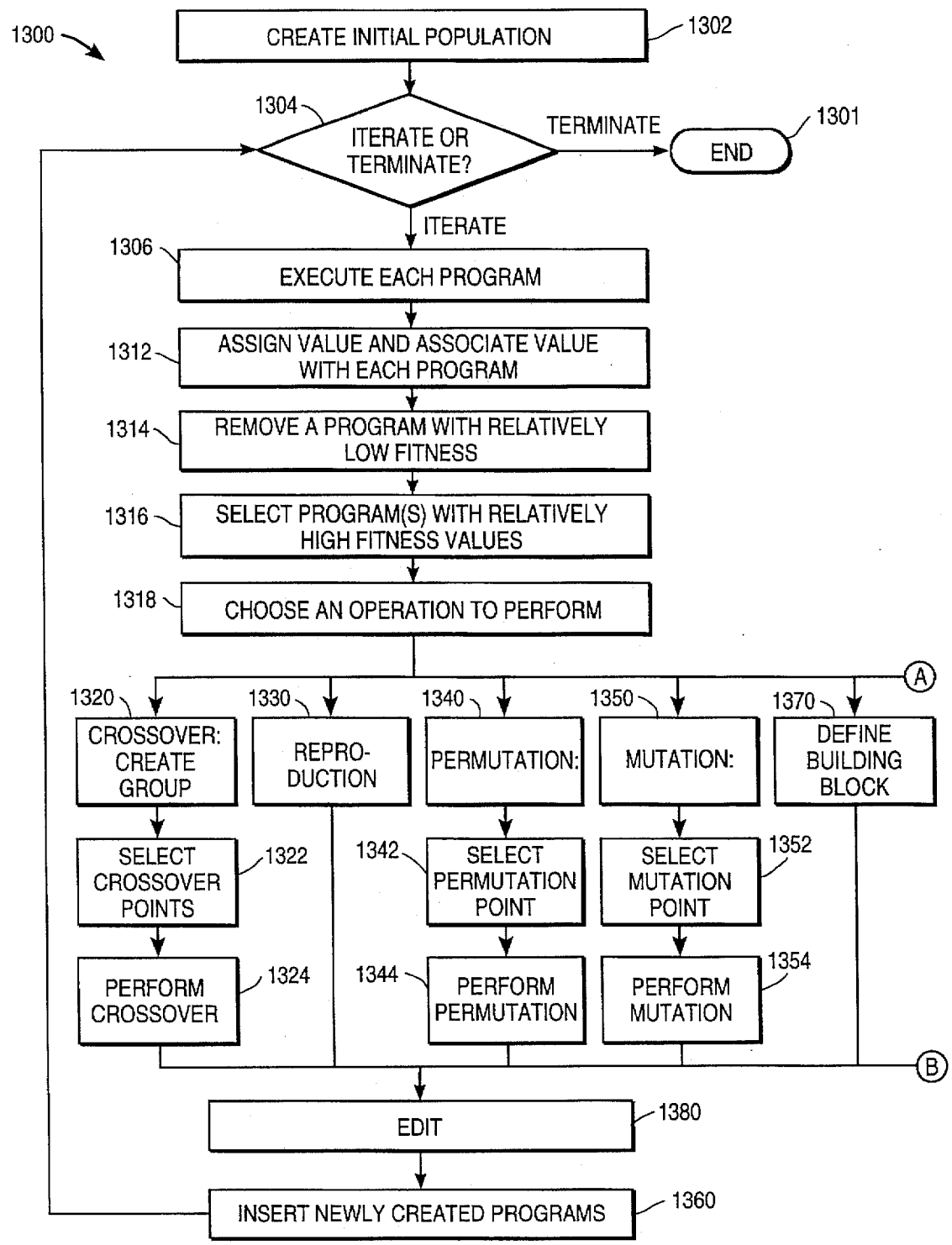
FIG_3A

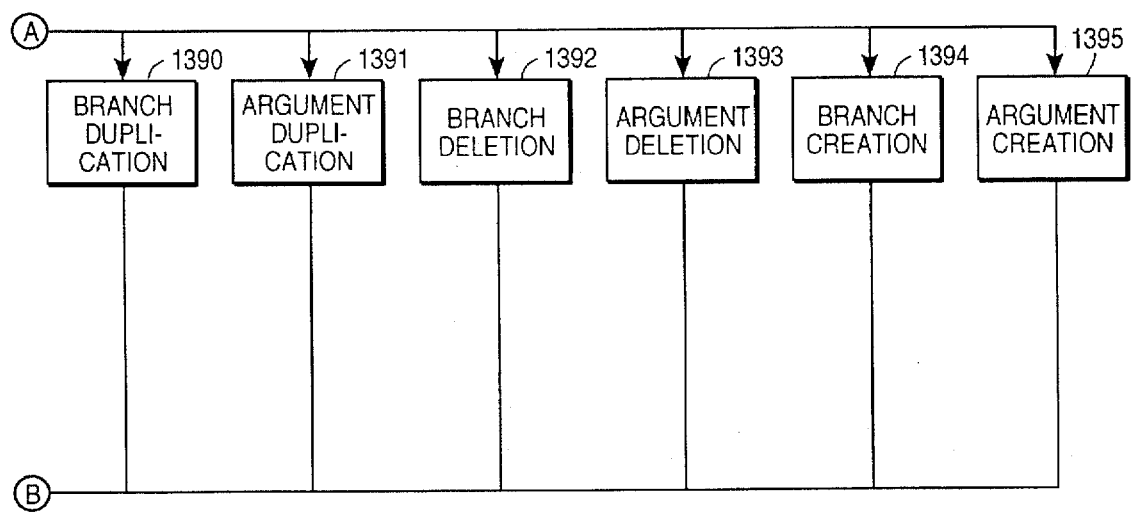
FIG_3B

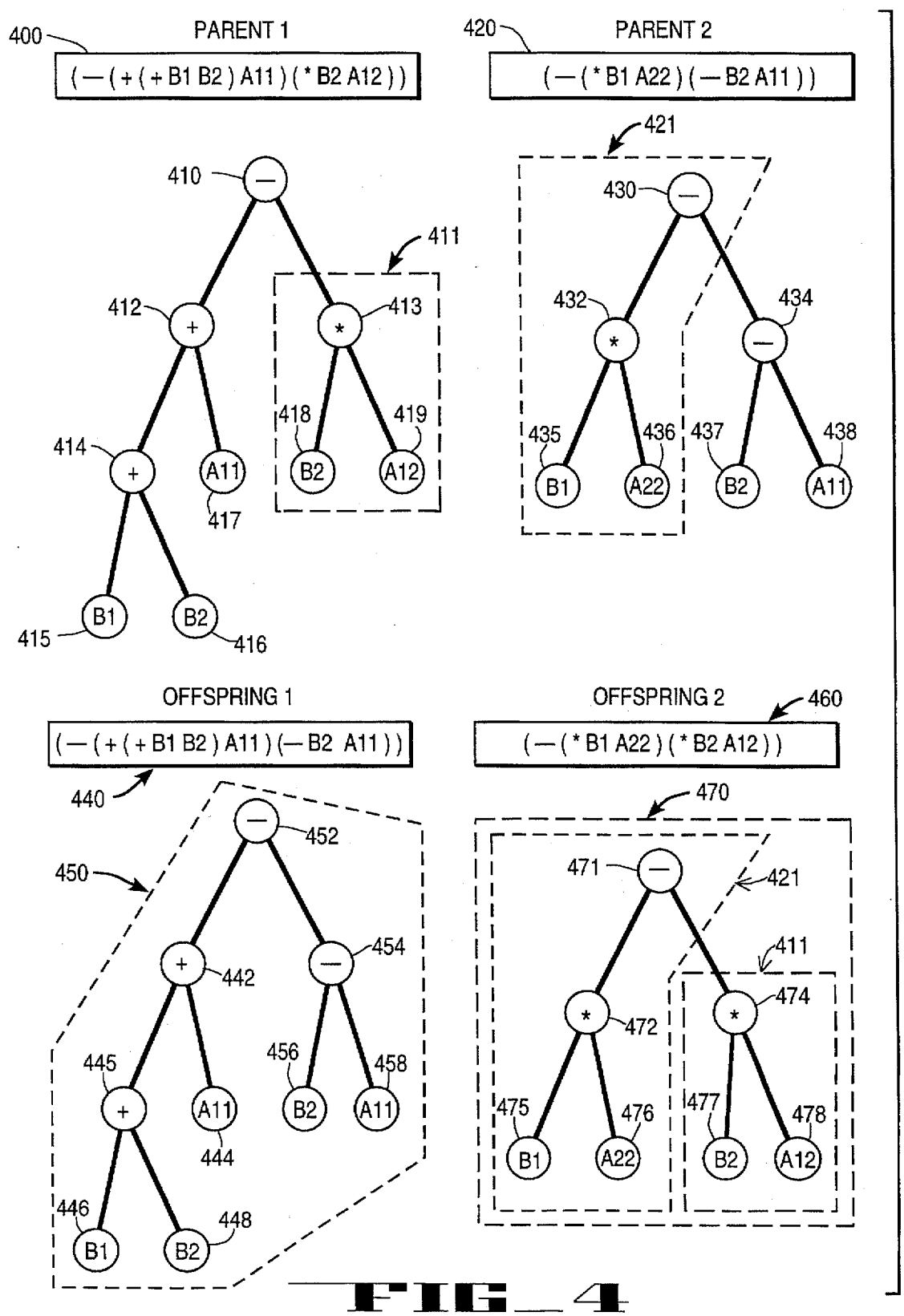
FIG_4

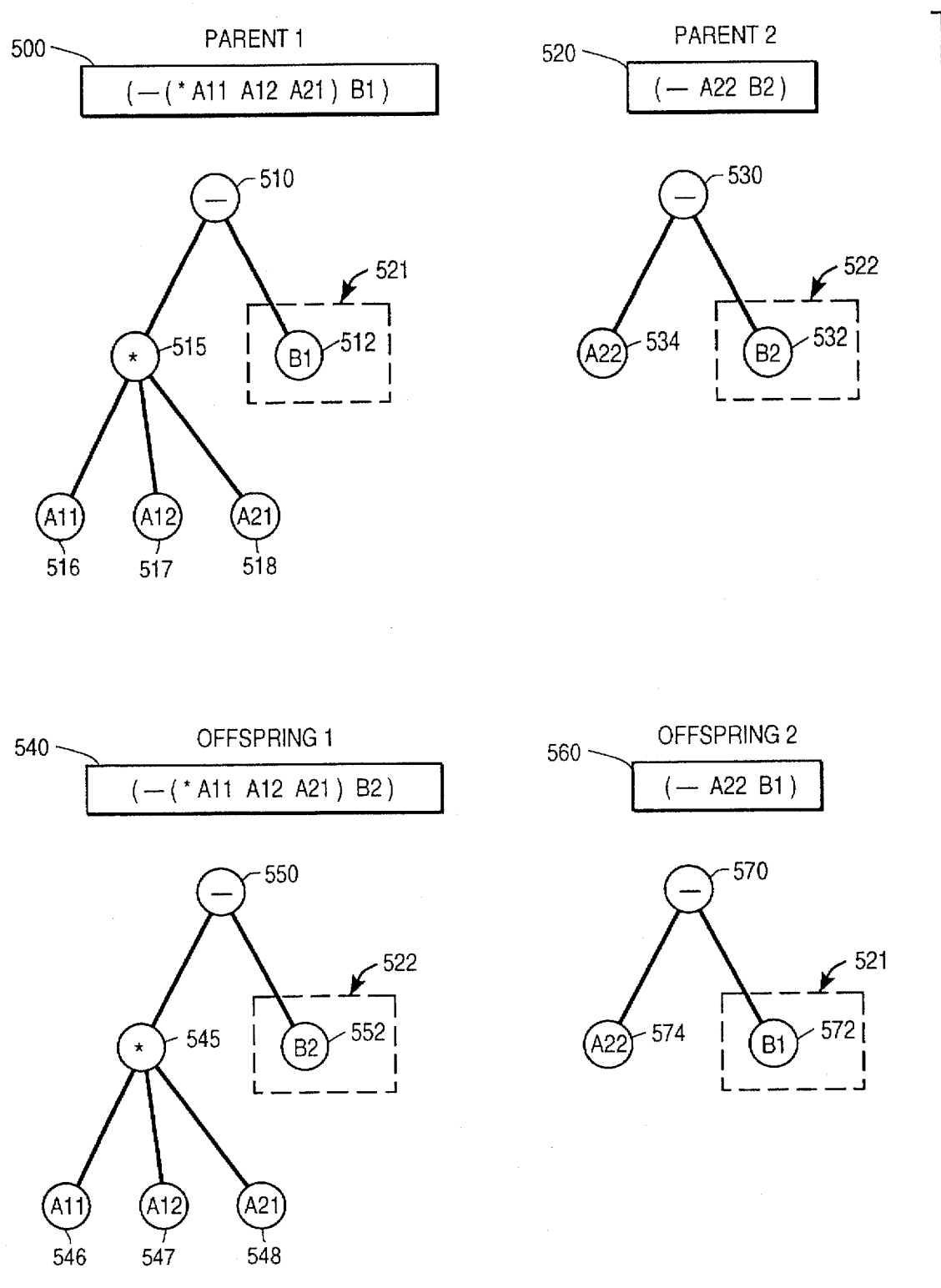
FIG_5

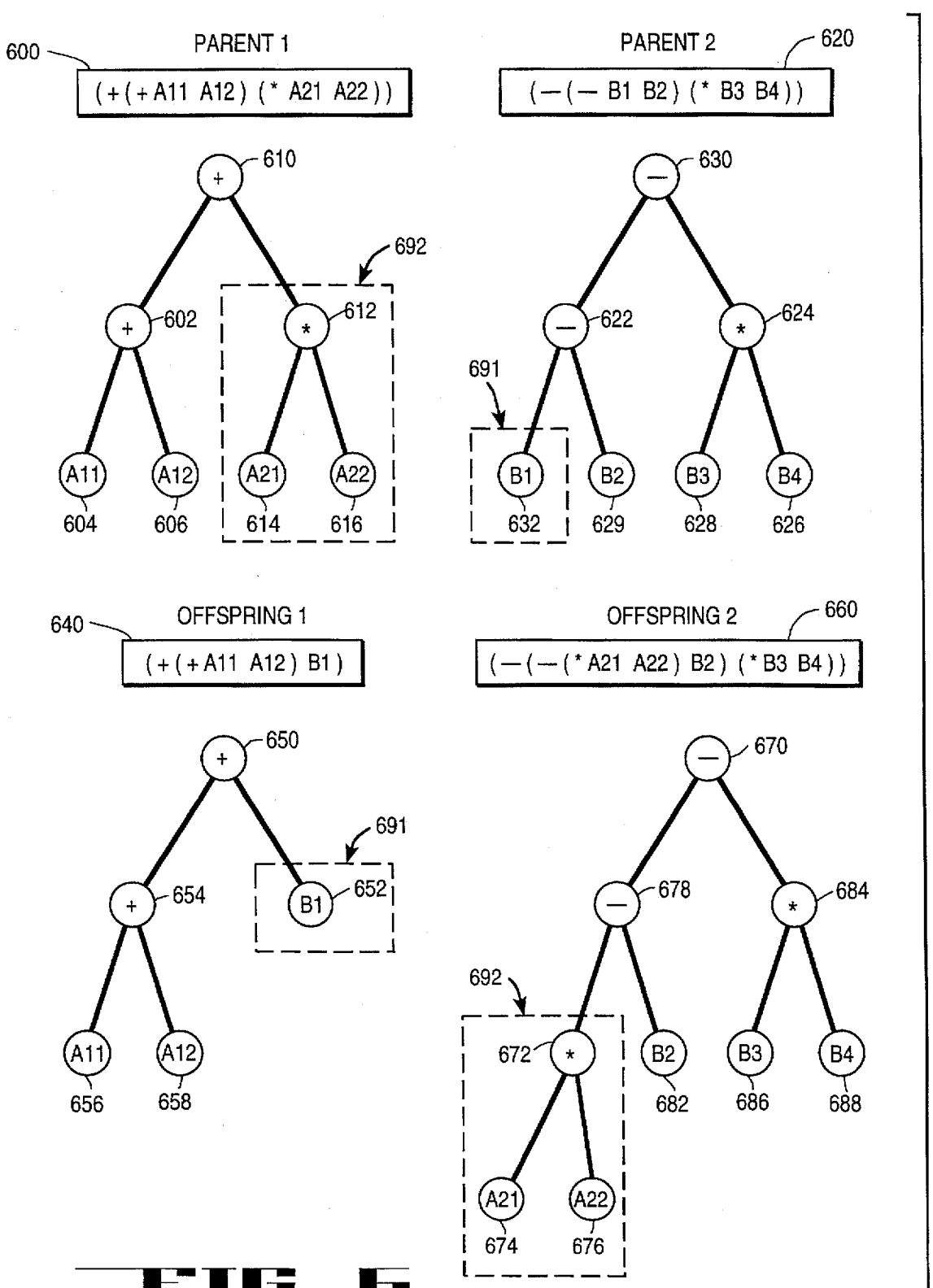
FIG_6

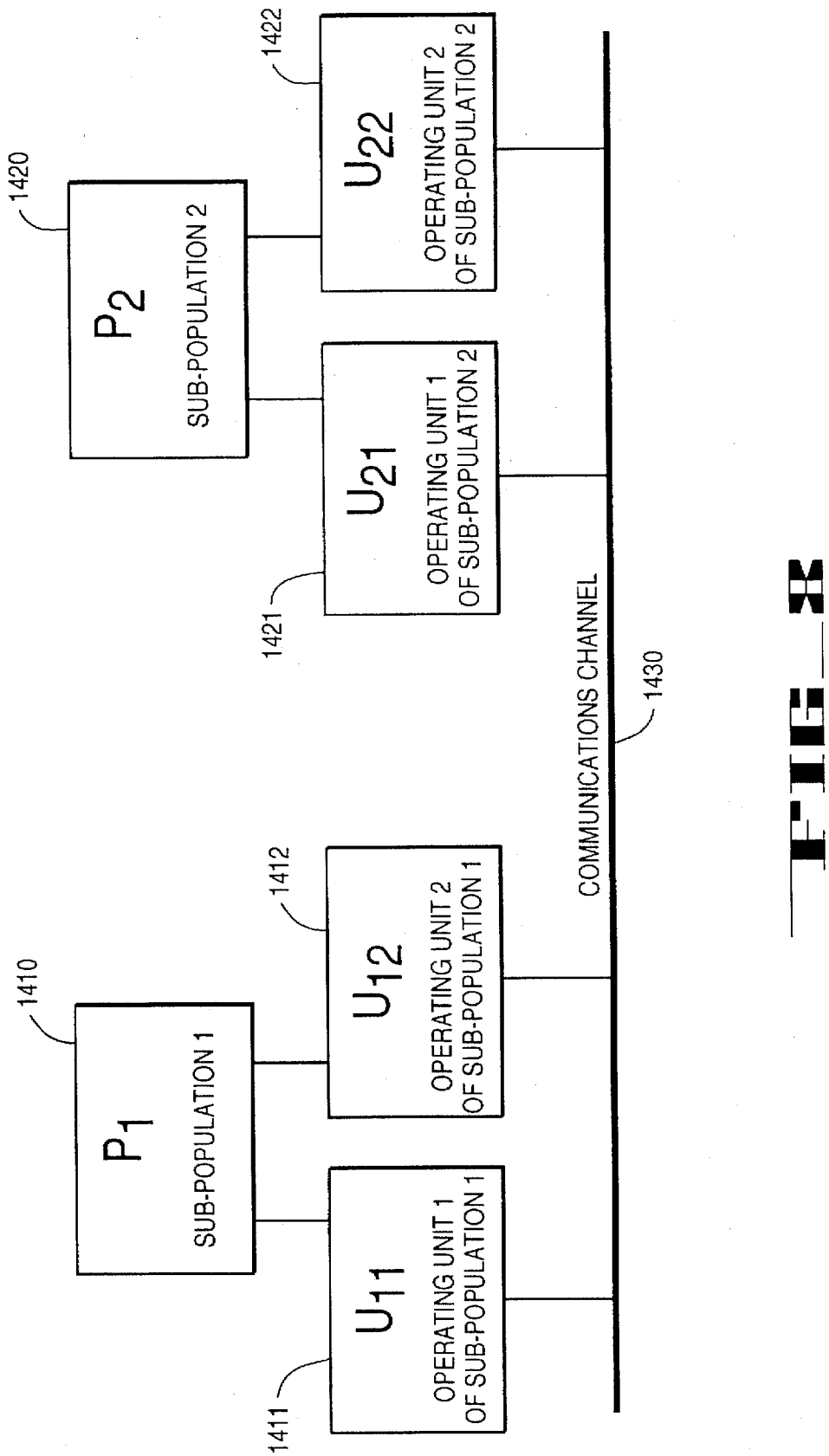
FIG. X

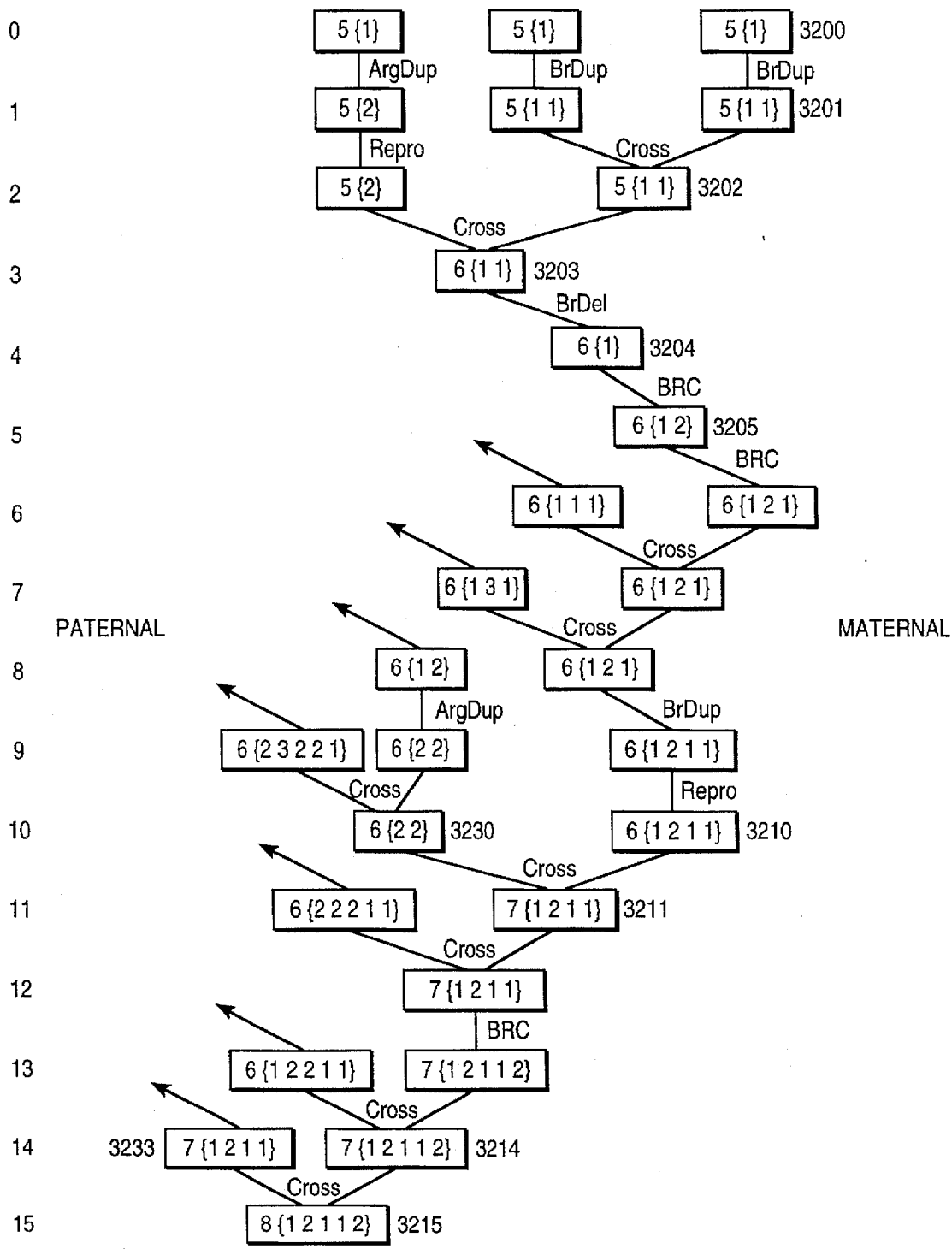
FIG_9

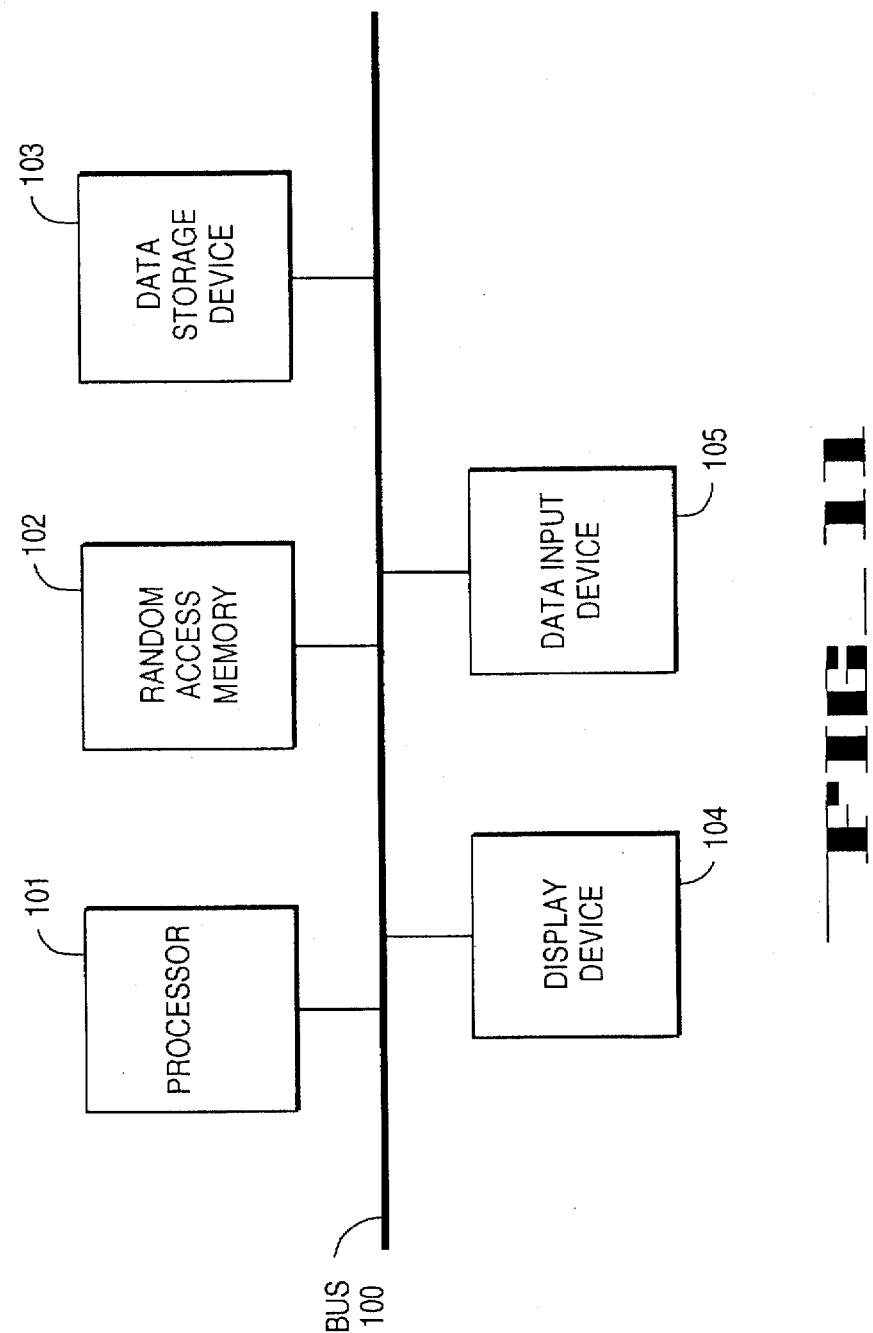
FIG_11

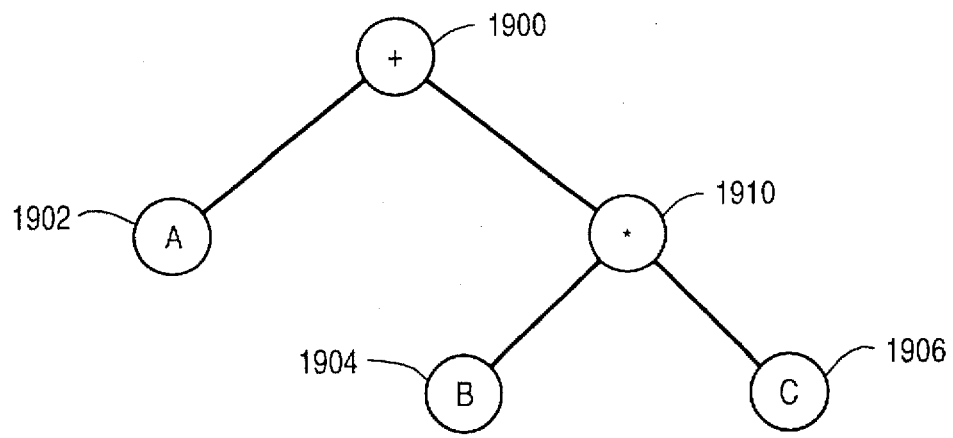
FIG_12
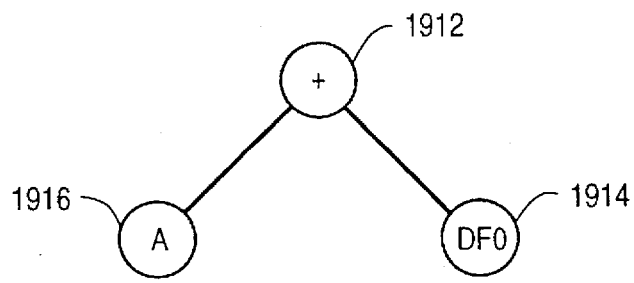
FIG_13
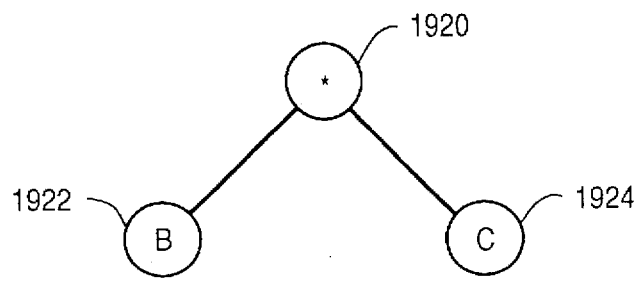
FIG_14

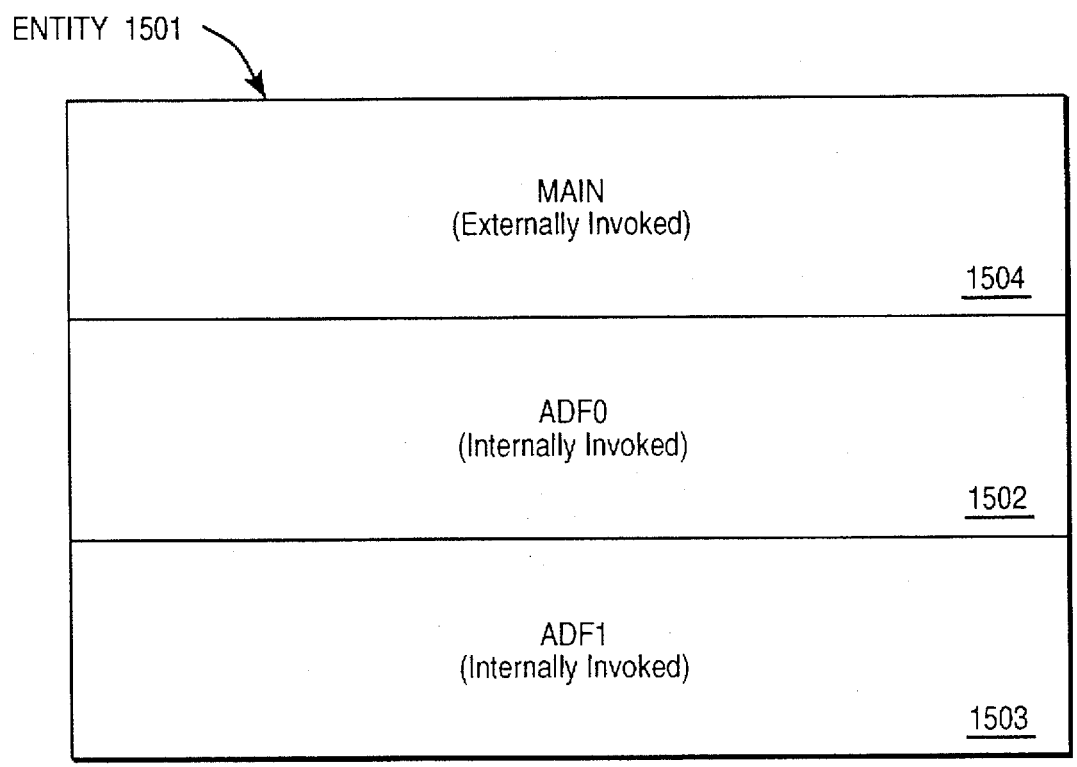
FIG_15

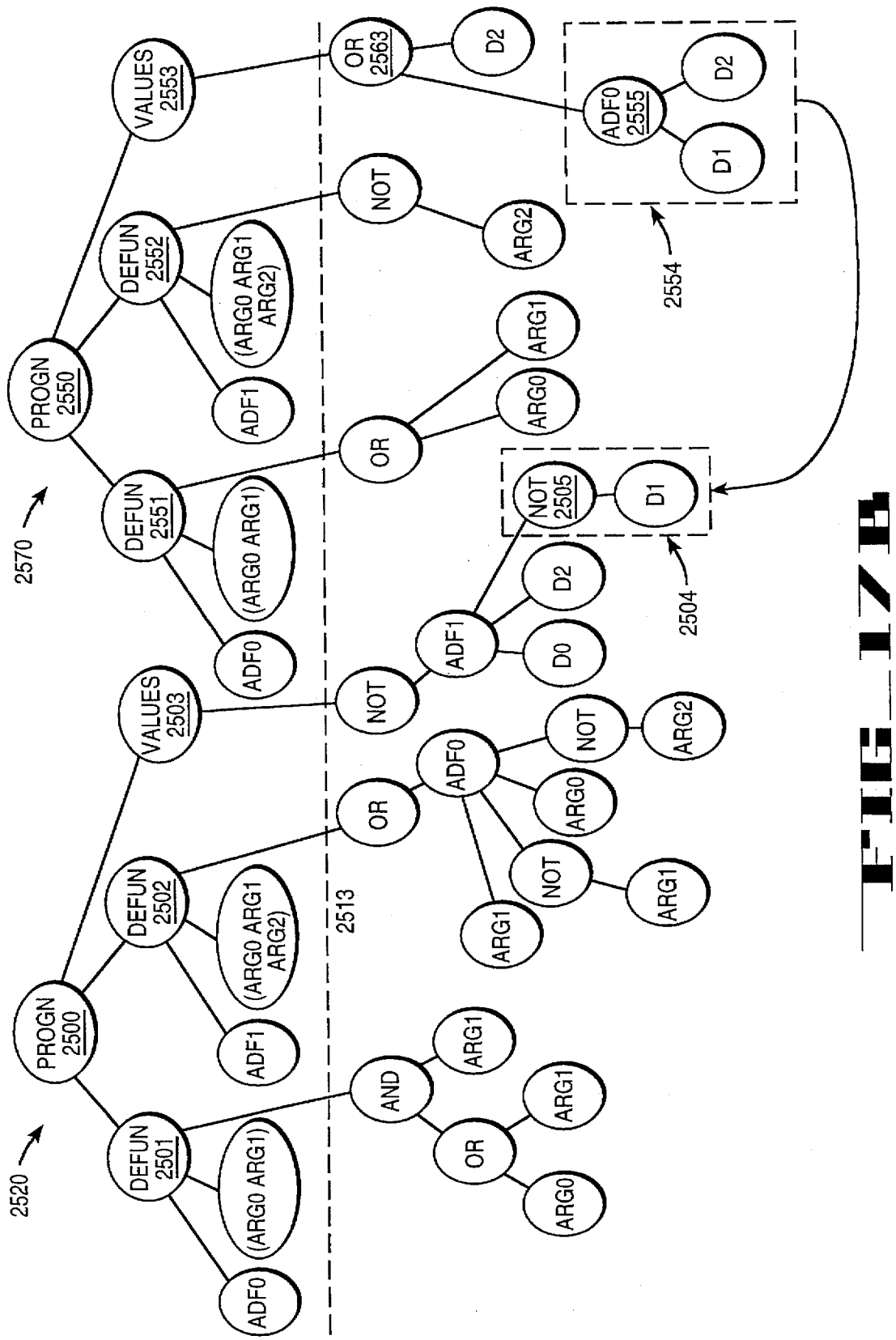
FIG_17B

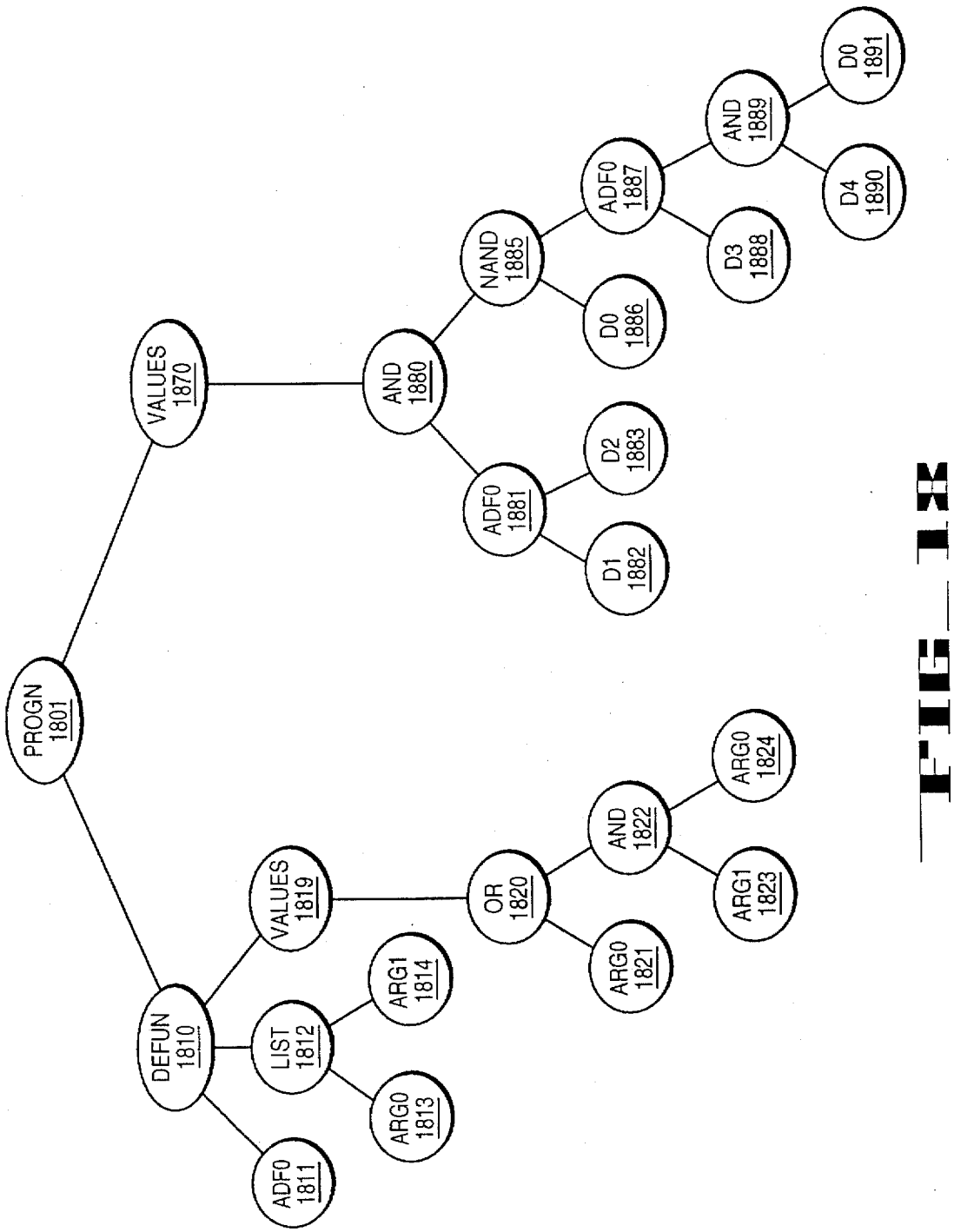
FIG_1X

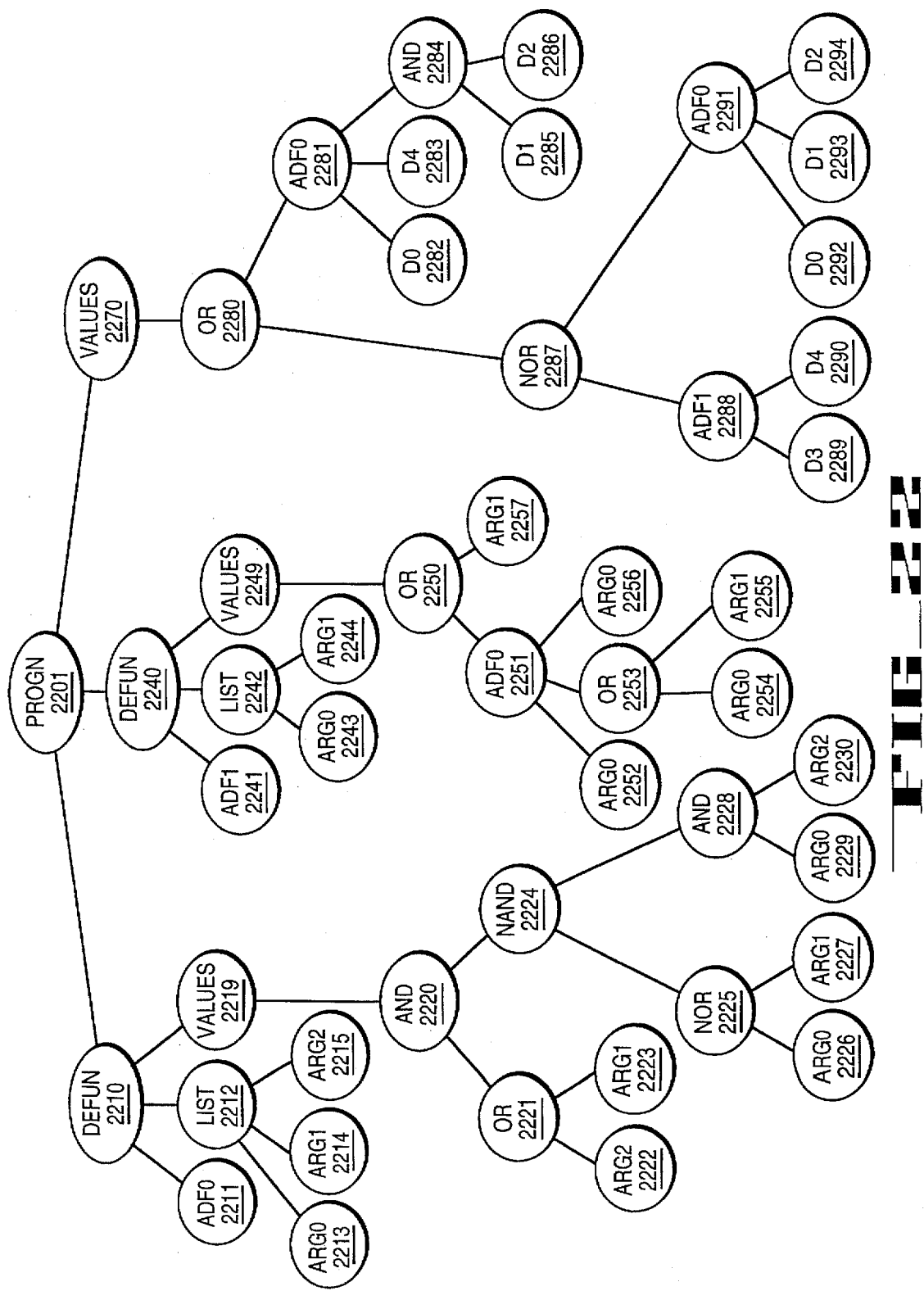
FIG._22

FIG_26

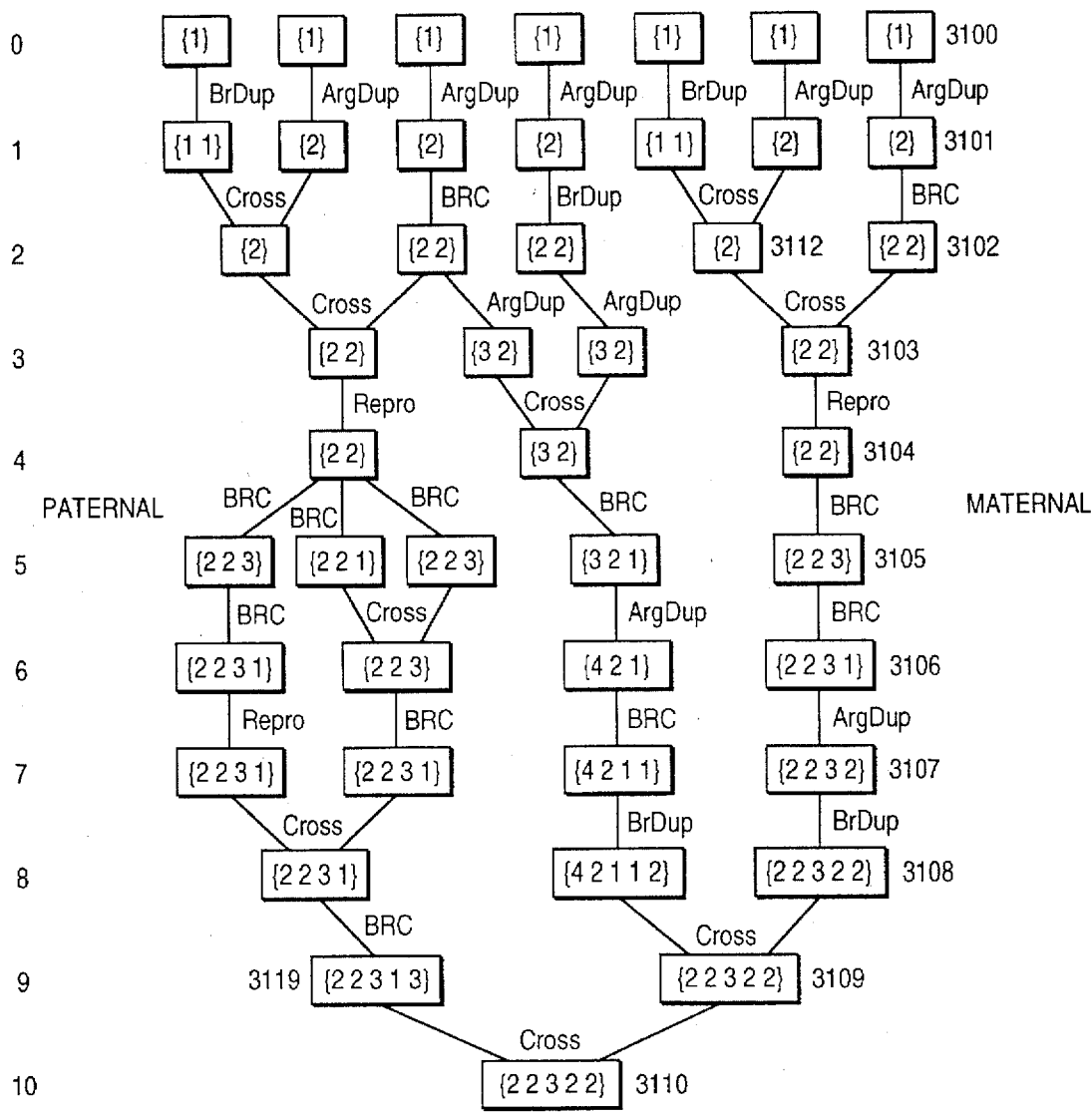
FIG_31

SIMULTANEOUS EVOLUTION OF THE ARCHITECTURE OF A MULTI-PART PROGRAM TO SOLVE A PROBLEM USING ARCHITECTURE ALTERING OPERATIONS

This application is a continuation-in-part of U.S. patent application (continuation-in-part) Ser. No. 07/881,507, filed May 11, 1992, titled *Non-Linear Genetic Process for Data Encoding and for Solving Problems Using Automatically Defined Functions*, now U.S. Pat. No. 5,343,554 which is a continuation-in-part of Application Ser. No. 07/787,748, filed Nov. 5, 1991, now U.S. Pat. No. 5,136,686, issued Aug. 4, 1992, titled *Non-linear Genetic Algorithms for Solving Problems by Finding a Fit Composition of Functions*, which is a continuation of Application Ser. No. 07/500,791, now abandoned, filed Mar. 28, 1990, which is a continuation-in-part of Application Ser. No. 07/196,973 filed May 20, 1988, now U.S. Pat. No. 4,935,877, issued Jun. 19, 1990, titled *Non-linear Genetic Algorithms for Solving Problems*.

BACKGROUND OF THE INVENTION

1. The Field of the Invention

The field of the invention is computer-implemented genetic algorithms. More specifically, the field is genetic algorithms useful for problem solving. The field spans the range of problems wherein a fit composition of functions may be found as a solution to the problem.

2. The Prior Art

The Natural Selection Process in Nature

The natural selection process provides a powerful tool for problem solving. This is shown by nature and its various examples of biological entities that survive and evolve in various environments. In nature, complex combinations of traits give particular biological populations the ability to adapt, survive, and reproduce in their environments. Equally impressive is the complex, relatively rapid, and robust adaptation and relatively good interim performance that occurs amongst a population of individuals in nature in response to changes in the environment. Nature's methods for adapting biological populations to their environment and nature's method of adapting these populations to successive changes in their environments (including survival and reproduction of the fittest) provides a useful model. This model can be used to develop methods to solve a wide variety of complex problems that are generally thought to require "intelligence" to solve.

In nature, a gene is the basic functional unit by which hereditary information is passed from parents to offspring. Genes appear at particular places (called gene "loci") along molecules of deoxyribonucleic acid (DNA). DNA is a long thread-like biological molecule that has the ability to carry hereditary information and the ability to serve as a model for the production of replicas of itself. All known life forms on this planet (including bacteria, fungi, plants, animals, and humans) are based on the DNA molecule.

The so-called "genetic code" involving the DNA molecule consists of long strings (sequences) of 4 possible gene values that can appear at the various gene loci along the DNA molecule. For DNA, the 4 possible gene values refer to 4 "bases" named adenine, guanine, cytosine, and thymine (usually abbreviated as A, G, C, and T, respectively). Thus, the "genetic code" in DNA consists of a long strings such as CTCGACGGT.

A chromosome consists of numerous gene loci with a specific gene value (called an "allele") at each gene locus.

The chromosome set for a human being consists of 23 pairs of chromosomes. The chromosomes together provide the information and the instructions necessary to construct and to describe one individual human being and contain about 3,000,000,000 genes. These 3,000,000,000 genes constitute the so-called "genome" for one particular human being. Complete genomes of the approximately 5,000,000,000 living human beings together constitute the entire pool of genetic information for the human species. It is known that certain gene values occurring at certain places in certain chromosomes control certain traits of the individual, including traits such as eye color, susceptibility to particular diseases, etc.

When living cells reproduce, the genetic code in DNA is read. Sub-sequences consisting of 3 DNA bases are used to specify one of 20 amino acids. Large biological protein molecules are, in turn, made up of anywhere between 50 and several thousand such amino acids. Thus, this genetic code is used to specify and control the building of new living cells from amino acids.

The organisms consisting of the living cells created in this manner spend their lives attempting to deal with their environment. Some organisms do better than others in grappling with (or opposing) their environment. In particular, some organisms survive to the age of reproduction and therefore pass on their genetic make-up (chromosome string) to their offspring. In nature, the process of Darwinian natural selection causes organisms with traits that facilitate survival to the age of reproduction to pass on all or part of their genetic make-up to offspring. Over a period of time and many generations, the population as a whole evolves so that the chromosome strings in the individuals in the surviving population perpetuate traits that contribute to survival of the organism in its environment.

3. Gene Duplication and Deletion in Nature

In nature, chromosomes (molecules of DNA) are linear strings of nucleiotide bases. During reproduction, chromosomes are frequently modified by naturally occurring genetic operations, such as mutation and crossover (sexual recombination). Mutation, for example, occasionally alters the linear string of nucleiotide bases that are translated and manufactured into work-performing proteins in the living cell. A small mutational change in one nucleiotide base in a gene may lead to the manufacture of a slight variant of the original protein. The variant of the protein may then affect the structure and behavior of the living thing in some advantageous or disadvantageous way. If the slight change is advantageous, natural selection will tend to perpetuate the change.

As Charles Darwin stated in *On the Origin of Species by Means of Natural Selection* (1859), I think it would be a most extraordinary fact if no variation ever had occurred useful to each being's own welfare .... But if variations useful to any organic being do occur, assuredly individuals thus characterised will have the best chance of being preserved in the struggle for life; and from the strong principle of inheritance they will tend to produce offspring similarly characterised. This principle of preservation, I have called, for the sake of brevity, Natural Selection. In addition to mutational changes, chromosomes are also modified by other naturally occurring genetic operations, such as gene duplication and gene deletion. A description of gene duplication and gene deletion appears in the seminal book *Evolution by Gene Duplication* (1970) by Susumu Ohno.

In gene duplication, there is a duplication of a portion of the linear string of nucleiotide bases of the DNA that would otherwise be translated and manufactured into work-performing proteins in the living cell. When such a gene duplication occurs, there is no immediate change in the proteins that are translated and manufactured. The effect of a gene duplication is merely to create two identical ways of manufacturing the same protein. However, over a period of time, some other genetic operation, such as mutation, may change one or the other of the identical genes. Over short periods of time, the changes accumulating in the changing gene may be of no practical effect or value. In fact, the changing linear string of nucleiotide bases of the DNA may not even produce a viable protein. As long as one of the two genes remains unchanged, the original protein manufactured from the unchanged gene continues to be manufactured.

Natural selection exerts considerable force in favor of maintaining a gene that manufactures a protein that is important for the successful performance and survival of the living thing. However, after a gene duplication has occurred, there is no disadvantage associated with the loss of the second way of manufacturing the original protein. Consequently, natural selection usually exerts little or no pressure to maintain a second way of manufacturing the same protein. The second gene may, over a period of time, accumulate additional changes and diverge more and more from the original gene. Eventually the now-changed gene may lead to the manufacture of a new and different and viable protein that affects the structure and behavior of the living thing in some advantageous or disadvantageous way. If and when a changed gene eventually leads to the manufacture of a viable and advantageous protein, natural selection again begins to work to preserve that new gene.

Ohno (1970) points out the highly conservative role of natural selection in the evolutionary process:

... the true character of natural selection ... is not so much an advocator or mediator of heritable changes, but rather it is an extremely efficient policeman which conserves the vital base sequence of each gene contained in the genome. As long as one vital function is assigned to a single gene locus within the genome, natural selection effectively forbids the perpetuation of mutation affecting the active sites of a molecule. (Emphasis in original).

Ohno continues,

... while allelic changes at already existing gene loci suffice for racial differentiation within species as well as for adaptive radiation from an immediate ancestor, they cannot account for large changes in evolution, because large changes are made possible by the acquisition of new gene loci with previously non-existent functions. Only by the accumulation of forbidden mutations at the active sites can the gene locus change its basic character and become a new gene locus. An escape from the ruthless pressure of natural selection is provided by the mechanism of gene duplication. By duplication, a redundant copy of a locus is created. Natural selection often ignores such a redundant copy, and, while being ignored, it accumulates formerly forbidden mutations and is reborn as a new gene locus with a hitherto non-existent function. (Emphasis in original).

Ohno concludes, "[t]hus, gene duplication emerges as the major force of evolution."

Ohno's provocative thesis is supported by the discovery of pairs of proteins with similar sequences of DNA and similar sequences of amino acids, but different functions. Examples include trypsin and chymotrypsin; the protein of microtubules and actin of the skeletal muscle; myoglobin and the monomeric hemoglobin of hagfish and lamprey; myoglobin used for storing oxygen in muscle cells and the subunits of hemoglobin for transporting oxygen in red blood cells of vertebrates; and the light and heavy immunoglobin chains.

Gene deletion also occurs in nature. In gene deletion, there is a deletion of a portion of the linear string of nucleiotide bases that would otherwise be translated and manufactured into work-performing proteins in the living cell. When a gene deletion occurs, some particular protein that was formerly manufactured is no longer being manufactured. Consequently, there is often some change in the structure or behavior of the biological entity.

4. Gene Duplication and Gene Deletion and Evolutionary Algorithms

The genetic algorithm provide a method of improving a given set of objects. The processes of natural selection and survival of the fittest provide a theoretical base. Genetic algorithms in their conventional form can solve many problems.

The Prisoner's Dilemma is a well-researched problem in game theory (with numerous psychological, sociological, and geopolitical interpretations) in which two players can either cooperate or not cooperate. The players make their moves simultaneously and without communication. Each player then receives a payoff that depends on his move and the move of the other player.

The payoffs in the Prisoner's Dilemma game are arranged so that a non-cooperative choice by one player always yields that player a greater payoff than a cooperative choice (regardless of what the other player does). However, if both players are selfishly non-cooperative, they are both worse off than if they had both cooperated. The game is not a "zero sum game" because, among other things, both players are better off if they both cooperate. For more information on the Prisoner's Dilemma game, see Robert Axelrod (1987).

Lindgren (1991) analyzed the Prisoner's Dilemma game using an evolutionary algorithm that employed an operation referred to as gene duplication. In this work, strategies for playing the game were expressed as fixed-length binary character strings of length 2, 4, 8, 16, or 32. Strings of length 2 were used to represent game-playing strategies that considered only one previous action by the opponent. Specifically, the string 01 instructed the player to make a non-cooperative move (indicated by a 0) if the opponent had made an uncooperative move on his previous move and to make a cooperative move (indicated by 1) if the opponent had made a cooperative move on his previous move. This particular strategy is called "tit-for-tat" in this game since the player mimics his opponent's previous move. The string 10 is called "anti-tit-for-tat" because it instructs the player to do the opposite of what the opponent did on the previous move.

The string 11 is the strategy that instructs a player to be cooperative regardless of what the opponent did on his previous move. The string 00 calls for unconditional non-cooperation.

The 16 strategies represented by strings of length 4 took both the opponent's previous move and the player's own previous move into account. Similarly, strings of length 8, 16, and 32 took additional previous moves of the opponent and/or the player himself into account.

Lindgren used an evolutionary algorithm to evolve a population of game-playing strategies. Lindgren started with a population of 1,000 consisting of 250 copies of each of the 4 possible strings of length 2 . At each generational step of the process, strings were copied (reproduced) in proportion to the score they achieved when playing the prisoner's dilemma game interactively against all other strings in the population. A mutation operation that randomly altered a single bit in a string was occasionally applied to a string in the population. In addition, an operation called "gene duplication" was occasionally used to double the length of a string. In this operation, the existing string was copied, so, for example, the string 01 would become 0101. An operation called "split mutation" cut the length of a string in half by deleting the first or second half of the string. For example, when this operation was applied to the string 1100, the result was either the string 11 or 00 (with equal probability). Lindgren's "split mutation" operation applied to linear strings bears a resemblance to gene duplication applied to chromosome strings in nature.

Lindgren's evolutionary algorithm did not contain the crossover (recombination) operation usually found in the genetic algorithm.

5. Background on Genetic Programming

Genetic programming is capable of evolving computer programs that solve, or approximately solve, a variety of problems from a variety of fields. Genetic programming starts with a primordial ooze of randomly generated computer programs composed of available programmatic ingredients and then genetically breeds the population of programs using the Darwinian principle of survival of the fittest and an analog of the naturally occurring genetic operation of crossover (sexual recombination).

Genetic programming (also called the "non-linear" or "hierarchical" genetic algorithm) is described in the book *Genetic Programming: On the Programming of Computers by Means of Natural Selection* (Koza 1992) and in U.S. Pat. Nos. 4,935,877 and 5,136,686.

6. Problem of Determining the Architecture of the Overall Program

Before applying genetic programming to a problem, the user must determine the terminals and functions of the genetically evolving programs, a fitness measure by which to compare performance of multiple programs being evolved, parameters and variables for controlling each run (e.g., number of generations to be run), and a result designation method and termination criterion to terminate the process.

Before applying genetic programming to a problem where a multi-part program is to be evolved, it is also necessary to specify the architecture of the program. The architecture of a program consists of the number of result-producing branches (which is usually just one), the number of function-defining branches and the number of arguments possessed by each function-defining branch, and the number and structural characteristics of other specialized branches (if any) that belong to a program. Many programs consist of just one result-producing branch and no other branches. Determining the architecture for an overall program may facilitate or frustrate evolution of the solution to the problem. For example, a 6-dimensional problem may have a natural decomposition into 3-dimensional subproblems. If 3-dimensional subprograms are readily available during the evolutionary process, the problem may be relatively easy to solve by means of the evolutionary process; however, if they are not available, the problem may be difficult or impossible to solve. Thus, the question arises as to how to determine the architecture of the programs that participate in the evolutionary process. The present invention provides a means for determining a suitable architecture dynamically during the run of the evolutionary process by means of new architecture-altering operations.

The existing methods for making these architectural choices include the methods of prospective analysis of the nature of the problem, seemingly sufficient capacity, affordable capacity, and retrospective analysis of the results of actual runs.

Sometimes these architectural choices flow so directly from the nature of the problem that they are virtually mandated. However, in general, there is no way of knowing a priori the architecture of the program corresponding to the solution to the problem.

6.1. Method of Prospective Analysis

Some problems have a known decomposition involving subproblems of known dimensionality. For example, some problems involve finding a computer program (e.g., mathematical expression, composition Of primitive functions and terminals) that produces the observed value of a dependent variable as its output when given the values of the a certain number of independent variables as input. Problems of this type are called problems of symbolic regression, system identification, or simply "black box" problems. In many instances, it may be known that a certain number of the independent variables represent a certain subsystem. In that event, the problem may be decomposable into subproblems based on the known lower dimensionality of the known subsystem.

6.2. Method of Providing Seemingly Sufficient Capacity (Over-Specification)

For many problems, the architectural choices can be made on the basis of providing seemingly sufficient capacity by over-specifying the number of functions and terminals. Over-specification often works to provide the eventual architecture, at the expense of processing time and waste of resources.

6.3. Method of Using Affordable Capacity

Resources are required by each part of a program. The practical reality is that the amount of resources that one can afford to devote to a particular problem will strongly influence or dictate the architectural choice. Often the architectural choices are made on the basis of hoping that the resources that one could afford to devote to the problem will prove to be sufficient to solve the problem.

6.4. Method of Retrospective Analysis

A retrospective analysis of the results of sets of actual runs made with various architectural choices can determine the optimal architectural choice for a given problem. That is, in retrospective analysis, a number of runs of the problem are made with different combinations of the number of functions and terminals, to retrospectively compute the effort required to solve the problem with each such architecture, and to identify the optimal architecture. If one is dealing with a number of related problems, a retrospective analysis of one problem may provide guidance for making the required architectural choice for a similar problem.

What is needed is a process that allows architectures to be created during the genetic process. In other words, it is desirable to create new architectures during the genetic process when solving a problem, such that a population of programs being evolved does not have to contain a program having the architecture of the program designated as a solution to the problem, yet being capable of providing such an architecture while the genetic process is underway.

References Cited

U.S. PATENTS 4,821,333, "Machine learning procedures for generating image domain feature detector structuring elements", issued Apr. 11, 1989, filed Aug. 22, 1986, Gillies.

4,935,877, "Non-Linear Genetic Algorithms for Solving Problems", issued Jun. 19, 1990, filed May 20, 1988, Koza.

4,697,242, "Adaptive Computing System Capable of Learning and Discovery", issued Sep. 29, 1987, filed Jun. 11, 1984, Holland et al.

4,881,178, "Method of Controlling a Classifier System", issued Nov. 14, 1989, filed May 7, 1987, Holland et al.

OTHER PUBLICATIONS

Angeline, P. J., *Evolutionary Algorithms and Emergent Intelligence*, Ph.D. dissertation, Computer Science Department, Ohio State University, 1994.

Angeline, Peter J. and Pollack, Jordan B., "The evolutionary induction of subroutines, *Proceedings of the Fourteenth Annual Conference of the Cognitive Science Society*, Hillsdale, N.J.: Lawrence Earlbaum Associates Inc., 1992, pgs. 236–241.

Angeline, Peter J. and Pollack, Jordan B., "Competitive environments evolve better solutions for complex tasks," in Forrest, Stephanie (editor), *Proceedings of the Fifth International Conference on Genetic Algorithms*, San Mateo, Calif.: Morgan Kaufmann Publishers Inc., 1993, pgs. 264–270.

Axelrod, Robert (Editor), "The Evolution of Strategies in the Iterated Prisoner's Dilemma" In *Genetic Algorithms and Stimulated Annealing*, p. 32, Pittman, London 1987.

Darwin, Charles, 1859, *On the Origin of Species by Means of Natural Selection*, John Murray.

Davis, Lawrence (Editor)—*Genetic Algorithms and Simulated Annealing*, Pitman, London 1987.

De Jong, Kenneth A, "Genetic algorithms: A 10 year perspective," *Proceedings of an International Conference on Genetic Algorithms and Their Applications*, Hillsdale, N.J.: Lawrence Erlbaum Associates, 1985.

De Jong, Kenneth A., "On Using Genetic Algorithms to Search Program Spaces", *Genetic Algorithms and Their Applications: Proceedings of the Second International Conference on Genetic Algorithms*, Hillsdale, N.J.: Lawrence Erlbaum Associates, 1987.

De Jong, Kenneth A, "Learning with Genetic Algorithms: An Overview," *Machine Learning*, 3(2), 121–138, 1988.

Fogel, L. J., Owens, A. J. and Walsh, M. J.—*Artificial Intelligence through Simulated Evolution*, New York: John Wiley 1966.

Fujiki, Cory—*An Evaluation of Holland's Genetic Operators Applied to a Program Generator*, Master of Science Thesis, Department of Computer Science, University of Idaho, 1986.

Goldberg, David E.—*Computer-Aided Gas Pipeline Operation Using Genetic Algorithms and Rule Learning*, (Doctoral Dissertation, University of Michigan, 1983) Dissertation Abstracts International 44(10), 3174B (University Microfilms No. 8402282).

Goldberg, David E., *Genetic Algorithms in Search, Optimization, and Machine Learning*, Reading, Mass.: Addision-Wesley 1989.

Green, Cordell C. et al., *Progress Report on Program-Understanding Systems*, Stanford Artificial Intelligence Laboratory memo AIM-240, Stanford University Computer Science Department, August 1974.

Grefenstette, John J. (Editor)—*Proceedings of an International Conference on Genetic Algorithms and Their Applications*, Pittsburgh, Pa. 1985.

Grefenstette, John J. (Editor)—*Genetic Algorithms and Their Applications: Proceedings of the Second International Conference on Genetic Algorithms*, Lawrence Erlbaum Associates, Hillsdale, N.J. 1987.

Hicklin, Joseph F.—*Application of the Genetic Algorithm to Automatic Program Generation*, Master of Science Thesis Department of Computer Science, University of Idaho, 1986.

Hillis, W. Daniel, "Co-Evolving Parasites Improve Simulated Evolution as an Optimizing Procedure," *Emergent Computation: Self-organizing, Collective, and Cooperative Computing Networks*, edited by S. Forrest, Cambridge, Mass., MIT Press 1990.

Holland, John H.—*Adaptation in Natural and Artificial Systems*, The University of Michigan Press, Ann Arbor, 1975.

Holland, John H. Escaping brittleness: The possibilities of general-purpose learning algorithms applied to parallel rule-based systems. In Michalski, Ryszard S., Carbonell, Jaime G. and Mitchell, Tom M. *Machine Learning: An Artificial Intelligence Approach, Volume II.* P. 593–623. Los altos, Calif.: Morgan Kaufman 1986.

Holland, J. H. "ECHO: Explorations of Evolution in a Minature World." In *Proceedings of the Second Conference on Artificial Life*, edited by C. G. Langton, and J. D. Farmer, J. Doyne, Redwood City, Calif.: Addison-Wesley. 1990. In Press.

Holland, J. H., & Reitman, J. S. (1978), Cognitive systems based on adaptive algorithms, In D. A. Waterman & F. Hayes-Roth (Eds.), *Pattern Directed Inference Systems* (pp. 313–329), New York: Academic Press.

Jefferson, David, Collins, Rob, et. al., "The Genesys System: Evolution as a Theme in Artificial Life," in *Proceedings of the 11th International Joint Conference on Artificial Life*, edited by C. G. Langton and D. Farmer, Redwood City, Calif.: Addison-Wesley, 1990, In Press.

Koza, John R., Hierarchical genetic algorithms operating on populations of computer programs, *Proceedings of the 11th International Joint Conference on Artificial Intelligence(IJCAI)*, San Mateo, Calif.: Morgan Kaufman 1989.

Koza, John R., *Genetic Programming: A Paradigm for Genetically Breeding Populations of Computer Programs to Solve Problems*, Stanford University, Dept. of Computer Science, Report No. STAN-CS-90-1314, June 1990. 1990.

Koza, John R., *Genetic Programming: On the Programming of Computers by Means of Natural Selection*, Cambridge, Mass.: The MIT Press, 1992.

Koza, John R., *Genetic Programming II: Automatic Discovery of Reusable Programs*, Cambridge, Mass.: The MIT Press, 1994.

Lenat, Douglas B. AM: *An Artificial Intelligence Approach to Discovery in Mathematics as Heuristic Search*, PhD Dissertation, Computer Science Department, Stanford University, 1976.

Lenat, Douglas B., "The Role of Heuristics in Learning by Discovery: Three Case Studies," in Michalski, Ryszard S., Carbonell, Jaime G. and Mitchell, Tom M., *Machine Learning: An Artificial Intelligence Approach*, Volume I, pgs. 243–306, Los Altos, Calif.: Morgan Kaufman 1983.

Lindgren, Kristian, Evolutionary phenomena in simple dynamics. In Langton, Christopher, Taylor, Charles, Farmer, J. Doyne, and Rasmussen, Steen (editors). *Artificial Life II, SFI Studies in the Sciences of Complexity*. Volume X. Redwood City, Calif.: Addison-Wesley 1991. Pages 295–312.

Miller, J. H. "The Evolution of Automata in the Repeated Prisoner's Dilemma." In *Two Essays on the Economics of Imperfect Information*. PhD dissertation, Department of Economics, University of Michigan, 1988.

Miller, John H., "The Coevolution of Automata in the Repeated Prisoner's Dilemma", Santa Fe Institute and Carnegie-Mellon University, Document No. 89-003, Oct. 15, 1987.

Ohno, Susumu, *Evolution by Gene Duplication*, New York: Springer-Verlag, 1970.

Schaffer, J. D. (editor), *Proceedings of the 3rd International Conference of Genetic Algorithms*, San Mateo, Calif.: Morgan Kaufman Publishers Inc. 1989.

Smith, Steven F., *A Learning System Based on Genetic Adaptive Algorithms*, PhD dissertation, Pittsburgh: University of Pittsburgh, 1980.

Smith, Steven F., "Flexible learning of problem solving heuristics through adaptive search," *Proceeding of the 8th International Conference on Artificial Intelligence*, Karlsruhe, Germany: Morgan Kaufman 1983.

Tanese, Reiko, *Distributed Genetic Algorithm For Function Optimization*, PhD. dissertation, Department of Electrical Engineering and Computer Science, University of Michigan, 1989.

Wilson, Stewart, W. Hierarchical credit allocation in a classifier system. *Proceedings of the Tenth International Joint Conference on Artificial Intelligence*, 217–220, 1987.

SUMMARY OF THE INVENTION

An apparatus and method for simultaneously evolving the architecture of a multi-part program while solving a problem is described. The present invention includes an apparatus and process for creating an initial population and then evolving that population to generate a result, wherein the architecture of programs in the population are altered as the population evolves. In the present invention, an architecture of a program in the population may be altered by branch duplication, argument duplication, branch deletion, argument deletion, branch creation and/or argument creation.

In one embodiment, the apparatus and process for solving problems using automatic function definition initially creates a population of entities. Each of the entities has sub-entities. At least one of the sub-entities in each entity is invoked externally by the controlling process. At least one of the entities in the population has a sub-entity which is invoked internally. The externally invoked sub-entities are capable of having actions and invocations of sub-entities which are invoked internally, and have access to material provided to the externally invocable sub-entities. Furthermore, in one embodiment, each sub-entity which is invoked internally is also capable of including actions and invocations of internally invocable sub-entities, and each has access to material provided to the externally invocable sub-entity, and material provided to itself. The population is then evolved to generate a solution to the problem.

One use of this embodiment is to automatically discover abstract functional subunits of the problem being solved, e.g. function definitions, so that the problem can be solved more efficiently, by repeatedly invoking these subunits (automatically defined functions) often using different arguments so as to produce a functionally similar effect in each invocation that is specialized by the arguments provided by each respective invocation.

The population in each embodiment is evolved by iterating a series of steps. Each iteration includes externally invoking each entity to produce a result. A value is then assigned to each result and the value is associated with the corresponding entity which produced the result. Next, at least one entity having a relatively high associated value is selected. Then an operation, such as crossover and reproduction, is chosen and performed on the entity (or entities, in the case of crossover) to create a new entity. The new entity is then added to the population, such that the population evolves and generates a solution to the problem.

Many seemingly different problems can be reformulated into a problem requiring discovery of an entity, e.g., a mathematical expression or computer program that produces some desired output for particular inputs. When viewed in this way, the process of solving these seemingly different problems in the computer embodiment becomes equivalent to searching a space of possible mathematical expressions or computer programs for a most fit individual mathematical expression or computer program.

Computer programs have the ability to perform alternative computations conditioned on the outcome of intermediate calculations, to perform computations on variables of many different types, to perform iterations and recursions to achieve the desired result, and to define and subsequently use computed values and sub-programs. This flexibility found in computer programs facilitates the solution to these various different problems.

The process of solving these problems can be reformulated as a search for a most fit individual computer program in the space of possible computer programs. In particular, the search space can conveniently be regarded as the space of LISP "symbolic expressions" (S-expressions) composed of various terminals along with standard arithmetic operations, standard programming operations, standard mathematical functions, and various functions peculiar to the given problem domain. For example, the standard arithmetic functions of addition, subtraction, multiplication, etc., are relevant when we are attempting to construct a mathematical expression that might be the solution to an equation for generating an image. In general, the objects that are manipulated in our attempts to build computer programs are of two broad classes. These objects include functions of various numbers of arguments, such as addition mentioned above, or control structures such as If-Then-Else, Do-Until, etc.; terminals, such as dummy variables, the independent variable(s) in an equation (i.e., the actual variables of the problem) or constants, such as 0, 1, etc.

The program required to solve each of the problems described above tends to emerge from a simulated evolutionary progression using the non-linear genetic process which is referred to herein as "Genetic Programming". This process starts with an initial population of programs (typically randomly generated), each composed of functions and terminals appropriate to the problem domain. When using the automatic function definition mechanism, the programs are generated by superimposing a structure on top of the functions and terminals for the problem domain. The structure sets forth a set of components to automatically define a function or functions, including dummy variables (i.e., formal parameters) for use within the scope of each component. A program is then randomly generated from the functions and terminals, including dummy variables when a function definition is involved.

The fitness of each individual in the population drives the process. Fitness is generally measured over a set of fitness cases (environmental cases).

In data encoding problems, fitness can be measured by the sum of the distances (taken for all the environmental cases) between the point in the solution space (whether real-valued, complex-valued, vector-valued, multiple-valued, Boolean-valued, integer-valued, or symbolic-valued) created by the program for a given set of actual variables of the problem and the correct point in the solution space. In other problems, other fitness measures can be used.

In problems where fitness is the sum of errors (i.e., distances, differences), the closer this sum is to zero, the better the program. If this sum is close to zero, there is a good fit. If this sum attains the closest possible value to zero, there is a best fit. If this sum actually attains the value of zero, there is a perfect fit. The notions of good, best, and perfect fit are well known in the art. Once the desired level of fitness is attained, the iteration of the evolutionary process can be terminated.

The fitness cases are a set of inputs to the program. The fitness cases should be representative of the problem as a whole. For some problems, the set of fitness cases may be exhaustive. For many problems, the set of fitness cases is necessarily a small sampling of the entire problem environment. In that event, the fitness cases (much like the set of test data used by human programmers to debug a program) must be sufficiently representative of the problem as a whole that the program evolved by the evolutionary process can correctly generalize and correctly respond to unseen combinations of inputs.

The initial individual programs in the population typically will have exceedingly poor fitness. Nonetheless, some individuals in the population will be somewhat more fit than others.

Then, a process based on the Darwinian principle of reproduction and survival of the fittest (fitness proportionate reproduction) and the genetic operation of crossover (recombination) is used to create a new population of individuals. In particular, a genetic process of sexual reproduction (crossover) among two parental programs will be used to create offspring programs. At least one of the two participating parental programs will be selected in proportion to fitness. The resulting offspring program(s) will be composed of sub-expressions from their parents.

In addition, other operations such as mutation and permutation, define building blocks (that is, encapsulation) and editing may be used. Architecture altering operations, such as argument duplication, argument deletion, branch duplication, branch deletion, branch creation and argument creation may be used.

Finally, the new population of offspring (i.e. the new generation) will replace the old population of parents and the process will continue.

At each stage of this highly parallel, locally controlled and decentralized process, the state of the process consists only of the current population of individuals. Moreover, the only input to the algorithmic process is the observed fitness of the individuals in the current population in grappling with the problem environment. This process produces a population which, over a period of generations, tends to exhibit increasing average fitness in dealing with its environment, and which, in addition, can robustly (i.e. rapidly and effectively) adapt to changes in the environment. The solution produced by this process at any given time can be viewed as the entire population of distinctive alternatives (typically with improved overall average fitness), or more commonly, as the single best individual in the population found during execution of the run.

The dynamic variability of the size and shape of the computer programs that are developed along the way to a solution is also an essential aspect of the process. In each case, it would be difficult and unnatural to try to specify or restrict the size and shape of the eventual solution in advance. Moreover, the advance specification or restriction of the size and shape of the solution to a problem narrows the window by which the system views the world and might well preclude finding the solution to the problem.

DESCRIPTION OF THE DRAWINGS

The present invention will be understood more fully from the detailed description given below and from the accompanying drawings of the preferred embodiment of the invention, which, however, should not be taken to limit the invention to the specific embodiment but are for explanation and understanding only.

FIG. 1 is a tree diagram representation of a LISP S-expression (program).

FIG. 2 is a tree diagram representation of a LISP S-expression (program).

FIGS. 3a and 3b are flow chart diagrams of the present invention.

FIG. 4 is a tree diagram representation of a crossover operation occurring at internal points.

FIG. 5 is a tree diagram representation of a crossover operation occurring at external points.

FIG. 6 is a tree diagram representation of a crossover operation occurring at an internal and an external point.

FIG. 8 is a block diagram of the parallel processing embodiment of the present invention.

FIG. 9 depicts selected ancestors generated during an example evolutionary process.

FIG. 10 is a tree diagram representation of an S-expression which is a member of the initial population for solving the linear equation problem using the present invention.

FIG. 11 is a block diagram of one embodiment of a computer system of the present invention.

FIG. 12 illustrates a simple entity, namely the symbolic expression in the LISP programming language for the mathematical expression A+B * C.

FIG. 13 illustrates the simple entity in FIG. 12 after application of the "Define Building Block" (encapsulation) operation.

FIG. 14 illustrates the portion of the simple entity in FIG. 12 being represented by the function defined by the "Define Building Block" (encapsulation) operation.

FIG. 15 illustrates an example of an entity under the present invention.

FIG. 17B illustrates the preferred embodiment for performing the crossover operation in conjunction with two example entities having automatically defined functions.

FIG. 18 illustrates an example of an entity according to the present invention.

FIG. 28 depicts another example of a program.

FIG. 31 shows the ancestors of a program tree generated according to the present invention.

Notation and Nomenclature

Figure 7:
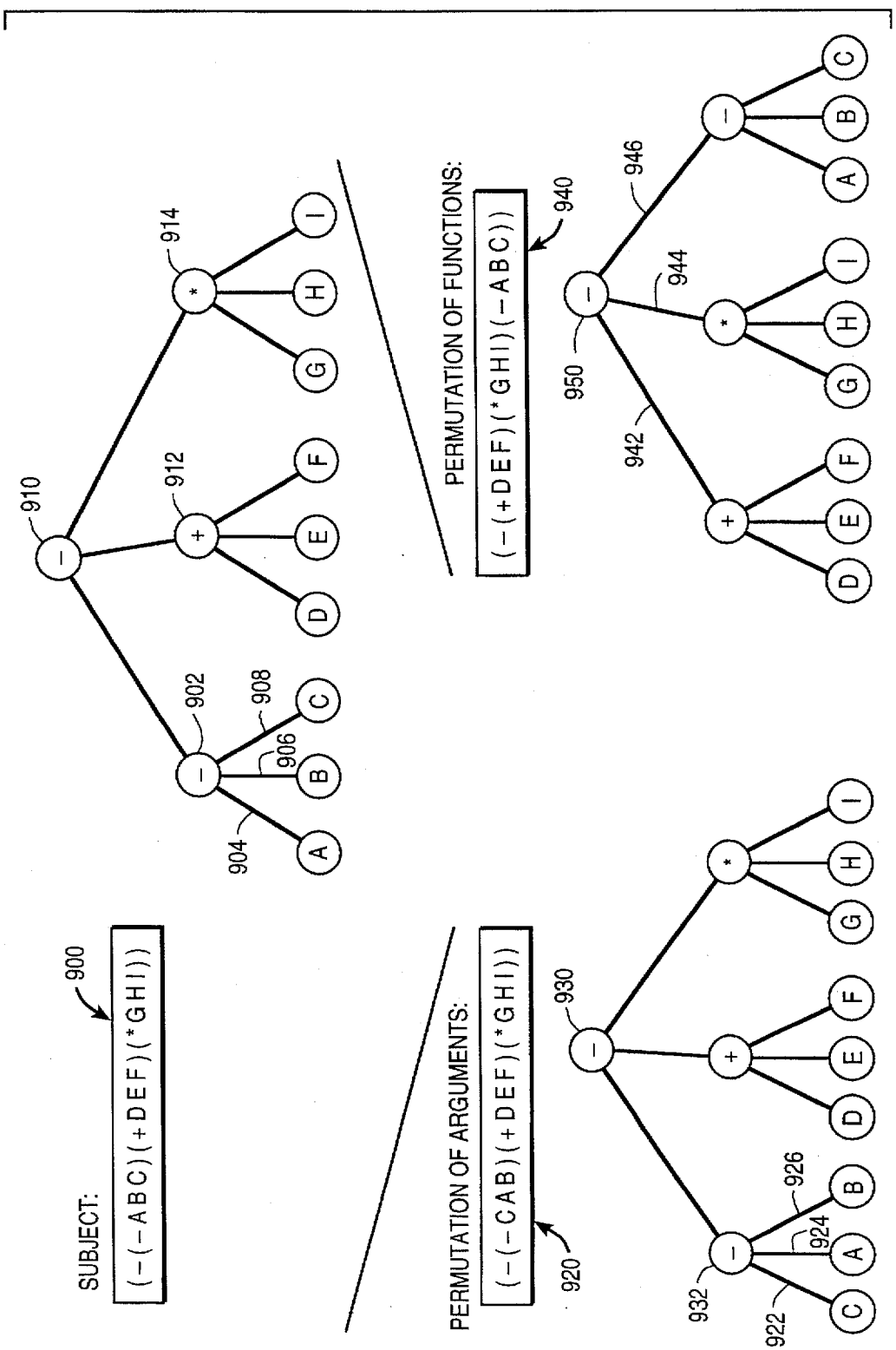
FIG. 7 is a tree diagram representation of a permutation operation.

The following terms are defined as:

ACTION—Actions are the primitive operations in an entity. Actions are often parameterized. If the entities are in the preferred computer embodiment, then an action may be a function, such as "+" or "IF", or a terminal such as "MOVE-LEFT". If the embodiment were to be in the domain of robots, then an action might be an operation by such a robot that applies to something else. For example, an action might be "PICK-UP", where the thing being picked up is specified as an argument to the action. An example of a non-parameterized action might be "MOVE-LEFT". Actions may be invoked using the results of other actions as arguments.

MATERIAL—Material is that which is provided to actions for their execution. This material might consist of externally provided material (the values of the actual variables of the problem), internally provided material (the values of dummy variables), or constants. In the computer embodiment, material is typically comprised of values, such as "TRUE", "FALSE" or 3.5. In an embodiment using robots in manufacturing, the material might be the contents of parts bins or the ingredients for the process. Thus, material encompasses both information and physical objects used in the problem solving process.

FUNCTION—A function is the computer embodiment of an action. We do not use the term in the strict mathematical sense of the word. For example, a function in a particular problem domain, which we will call "MOVE-BLOCK" might be viewed as transforming one state space into another. "MOVE-BLOCK" might cause a block in a simulated world to be moved from one side of a table to the other. This can be viewed as transforming one state space in which the block is on one side of the table into a new state space in which the block is on the other side of the table. Programmers often view this as a process of side-effecting (i.e. changing the values of) state variables. Thus, by "function" we mean any construct that takes zero or more arguments, returns zero or more values, and transforms the arguments and/or side-effects some global or lexical state. Other examples of "function" using this definition could therefore be "+", which takes numbers as its arguments and returns the sum of the arguments, "PRINT" which takes an argument and prints it (to the global environment), "PROGN" which takes program segments as arguments and returns the result of evaluating its last argument after evaluating all of its other arguments in sequence, and so-called non-strict operators such as "IF" which takes program segments as arguments and returns the result of evaluating one of its arguments dependent upon the result of evaluating its "condition" argument. "MOVE-BLOCK" might be, therefore, a function that takes no arguments, returns no values and whose purpose consists of side-effecting the state space of the problem. One could also view "MOVE-BLOCK" as a function that takes an old state space as its argument and returns as its value a new and transformed state space. This definition of "function" therefore subsumes, among others, the programming terms function, operator, procedure, macro, NLAMBDA and Special Form.

PRIMITIVE FUNCTION—A primitive function is a function provided by the user of the present invention for use during the problem-solving process. Primitive functions usually derive from the problem domain or are provided because they are thought to be useful in the problem-solving process. Primitive functions are common to the entire population, though there may be specific limits (established by means of constrained syntactic structures) on which types or categories of functions may be used in certain contexts.

AUTOMATICALLY DEFINED FUNCTION (ADF, DEFINED FUNCTION, DEFUN, FUNCTION DEFINITION, SUBPROGRAM, MODULE, SUBROUTINE)—An automatically defined function is a function whose behavior is evolved during the problem-solving process. ADFs are defined within particular entities in the population and the ADFs defined within a particular entity are used only within that particular entity. Each entity will have at most one definition for an ADF of a particular name, though there may be many different definitions for an ADF of that same name within the population. ADFs are defined in function-defining branches which are internally invocable sub-entities of the overall programmatic entity.

TERMINAL—A terminal is a termination point of an entity (i.e., program in the preferred computer embodiment) when that entity is represented as a tree. A terminal could be, but is not limited to, a constant (such as the number 1.5 or a structured constant value, such as a constant matrix), a variable (such as x, which might be a dummy variable (formal parameter) or an actual variable of the problem), a function of no arguments that performs side-effects on the environment of activation of the entity, a function of no arguments that causes data to be read from a table, database or from some sensor machinery.

DUMMY VARIABLE (FORMAL PARAMETER)—A variable, which is local to the definition of a function. For example, if we define the sine function in the computer embodiment in terms of the Taylor series expansion, a function might be defined in the form:

DEFINE FUNCTION sine (X)=

$$1.0 + X + 0.5X^2 + 0.1667X^3 + 0.04167X^4$$

In this case, the variable X is a dummy variable. When the function so defined is invoked with a specific argument, such as in the call:

$$sine(0.34),$$

the dummy variable X takes on the value of the argument provided to the function (i.e., 0.34 in this case). Thus, this dummy variable is said to have been instantiated with the value 0.34.

A dummy variable is therefore a symbol which takes on the meaning of the specific argument to a function during the execution of that function. A dummy variable has no meaning outside the definition of the function.

ACTUAL VARIABLE OF THE PROBLEM—The actual variables of the problem are variables whose values are defined externally to the problem being solved. These are frequently the independent variables of the problem. For example, if one were evolving a program in the computer embodiment to control a robot, the actual variables of the problem might be the physical coordinates of the robot, i.e. X-POSITION and Y-POSITION. Actual variables of the problem are sometimes called Global Variables.

ARGUMENT—An argument is a specific value which is passed to a function. The value of an argument becomes the specific instantiated value of the associated dummy variable of the function being called (invoked). For example, in the expression:

sine(3*4)

in the computer embodiment, the sine function is called with one argument, namely, the result of the evaluation of the expression 3*4, i.e., 12. In this case, the one dummy variable of the sine function will be invoked with the value 12. Because the sine function requires exactly one such argument in order to instantiate its dummy variable, the sine function is said to take one argument, or is a one-argument function. A function taking n arguments is said to have arity n.

ARGUMENT LIST—The argument list of a function is the ordered set of dummy variables used by that function. In the example above, the sine function has the argument list (X), where "(X)" denotes a list containing the single element "X" and "(X Y)" would be the argument list for a two-argument function, the arguments being X and Y.

BRANCH (COMPONENT, SUB-ENTITY)—A branch is an element of a tree structure and may encompass either a function-defining branch or result-producing branch or other types of specialized branches of an overall entity.

RESULT—PRODUCING BRANCH (MAIN PROGRAM, VALUE-PRODUCING BRANCH, EXTERNALLY-INVOCABLE SUBENTITY)—The branch (subentity) of an overall entity that is externally invoked at the time of execution of the overall entity. This externally invocable subentity of the overall entity may, in turn, invoke one or more internally invocable subentities (e.g., automatically defined functions, function-defining branches). If a value is produced by the execution of the overall entity, the term "value-returning branch" may be used to describe the result-producing branch.

PROGRAM (ENTITY, OVERALL PROGRAM, S-EXPRESSION)—A program comprises an overall programmatic entity.

DETAILED DESCRIPTION OF THE INVENTION

The present invention describes a non-linear genetic process for problem solving. In the following description, numerous specific details are set forth in order to provide a thorough understanding of the present invention. It will be apparent, however, to one skilled in the art that the present invention may be practiced without using these specific details. In other instances, well-known methods and structures have not been described in detail so as not to obscure the present invention.

The present invention operates on a population of entities. The entities possess an ability to produce an objectively observable result. To provide utility, the entities direct their actions toward a constructive end, even if their results do not always serve those ends. The iterative process of the present invention produces a population which tends to accomplish its constructive ends better over time.

The present invention uses a value assigned to the objectively observable result produced by an entity to guide an evolutionary process for solving a problem. Entities are selected from the population in accordance with their value (which we often refer to as "fitness"). They are then retained in the population ("reproduced"), retained with slight random modification ("mutated"), or selected, in groups (typically pairs) to participate in an operation which produces a new offspring entity by combining a portion of each entity in the group (pair). This latter operation is referred to as the recombination or crossover operation.

The iterative steps of activating an entity, observing its results, assigning a value to its observed results, selecting, and then reproducing, mutating, or recombining can take place in a variety of different media. Because of their extreme behavioral plasticity, computers offer an extremely flexible medium for performing the foregoing steps; however, the same steps can be performed in other media.

Although the preferred embodiment uses computer programs as entities, using other types of entities remain within the scope and spirit of the present invention. For example, electrical circuits could provide a population for the iterative process of the present invention. The circuits could reproduce and recombine sub-circuits from two parental circuits until a circuit performing the desired behavior (function) is attained. Additionally, different automobile designs could comprise another population, with elements of the design or sub-processes of manufacture taken as different alleles for crossover and rearrangement. Additionally, a population of mechanical nanomachines could comprise another population. Nanomachines are extremely small (and potentially extremely inexpensive) machines built up from individual atoms and molecules or groups of atoms and molecules that are very much smaller than ordinary mechanical devices. Nanomachines, just like more commonplace larger machines, perform specified actions on available material. For example, a nanomachine could perform a physical action on a quantity of physical material, just as an ordinary large machine performs an action on material. The step of reproducing could then be performed on a nanomachine. Similarly, the step of mutating would be performed on a nanomachine. And, similarly, the step of recombining portions to a group of two or more nanomachines could be performed.

The precise result of the action of a machine depends on both its specified action and on the precise material provided to that machine. For example, if a machine performs the action of crushing, the result of the action of that machine when supplied with glass material is crushed glass, whereas the result of the action of that machine when supplied with plastic material is crushed plastic. If the machine performs the action of heating, shaking, squeezing, or pressing, the machine performs those actions on the particular material supplied to it.

The material supplied to a physical machine (whether of ordinary size or very small size) corresponds to the arguments supplied to a computational structure including the actual variables of the problem. The action of the machine is the same (i.e., heating) regardless of the nature of the particular material on which it is acting (e.g., glass, plastic).

The actions performed by a machine on its material need not be a physical action. For example, if the entity is an electrical machine whose action consists of the action of a primitive electrical component (e.g., a resistor, amplifier, inductor, capacitor, etc.), that machine performs its action on whatever signal (e.g., material) is supplied to it. An amplifier that increases the amplitude of an electrical signal by a factor of three can perform its amplifying action on a weak sine wave signal or a strong sawtooth wave signal.

Hierarchical compositions of machines, each performing a specified action on the particular material supplied to it, can perform certain overall tasks.

Thus, although the following description uses computer programs as entities, the description does not limit the present invention. Further, the use of sequential iteration is only a preferred embodiment. Methods for the use of parallel processing are also presented.

Programs are presented herein using the conventions of the LISP programming language. However, all programs (regardless of the programming language used) consist of applications of functions to arguments. These applications are often presented as a parse tree or program tree. The LISP language illustrates the fact that all programs are repeated applications of functions to arguments in an especially clear way and is therefore used herein for purposes of presenting programs. However, nothing described herein is particular or special to LISP. In fact, actual runs involving the architecture-altering operations of the present invention have been programmed entirely in the C programming language (with no use being made of LISP whatsoever).

The Representation of the Population

The computer languages FORTRAN, COBOL, ALGOL, PL/1, FORTH, PASCAL, C, PROLOG, ADA, BASIC, etc. provide, in general, the ability to write complicated mathematical expressions, recursions, complex data structures, and symbolic expressions. Using any of these languages, one can write symbolic expressions that are executable as computational procedures (or programs) within the language itself. Also, any of these languages can generate symbolic expressions, although often this process is inconvenient and inefficient. In general, most computer languages do not allow arbitrarily complex expressions to be written. Also, most do not delay assigning actual computer memory (and types) in the computer for such expressions until just prior to actual execution of the expression. Such a memory management method is termed dynamic storage allocation.

One existing computer language, however, has all the features discussed above and is generally available in relatively efficient forms on a variety of computers. This language is LISP, and is the computer language of choice for many artificial intelligence applications. Many dialects of the LISP language have been created over the years. A dialect of LISP called "Common LISP" has started to emerge as a standard.

The LISP programming language's basic structure is a list of items (an ordered set of items contained within a pair of parentheses). An important source of LISP's simplicity, generality, and power arises from treating the first element in every list encountered as a function to be executed, termed "evaluated", and treating the remaining elements of the list as arguments to that function. Moreover, unless otherwise indicated, LISP reads, evaluates, and returns a value for each such function it encounters. Thus, in LISP, entire computer programs can appear as merely function invocations within function invocations within yet more function invocations (often called "compositions" of functions and terminals or more simply a "composition" of functions). Applying functions to arguments as encountered controls the flow of LISP programs. In other words, the control structures in LISP are based on the composition of functions.

Within the outermost pair of parentheses in LISP, there may be numerous functions and operators, including functions for performing arithmetic, functions for performing recursions, functions for modifying symbolic expressions, functions for conditionally varying the program flow, and other complex functions. A key feature of LISP is that LISP programs have the same form as the data they manipulate. As the above features indicate, LISP is a functional programming language. LISP is not the only existing functional programming language nor is it the only possible functional programming language. It is, however, the most widely used language in this category and well-suited for the requirements at hand.

In spite of the complex results obtained, LISP can be viewed as being very simple because it simply reads, evaluates, and returns a value for each such function it encounters. This seeming simplicity gives LISP enormous flexibility (including the flexibility to accommodate computational procedures which modify themselves and execute themselves). This enormous flexibility makes LISP the preferred computer language for the present invention.

For example, consider the simple mathematical expression ordinarily written as 5*4-3*2. To evaluate this expression, one must start by first evaluating 5*4. One evaluates 5*4 by performing the function of multiplication (*) on the two arguments (5 and 4). The basic structure in LISP is a list of items (that is, an ordered set of items contained within a set of parentheses). Moreover, unless otherwise indicated, LISP treats the first item in every list encountered as a function and the remaining items in the list as arguments to that function. Thus, LISP represents 5*4 as (*5 4). Here a function (i.e. the multiplication function denoted by *) is the first item of the list and the two arguments to the function (i.e. the two numbers to be multiplied) follow. Similarly, LISP denotes 3*2 as (*3 2). Once these two multiplications are executed (evaluated), the subtraction function then has the two arguments (i.e. 20 and 6). The two values obtained by evaluating these two multiplication functions are treated as arguments to the subtraction function which performs the operation of subtraction, which is (−(*5 4) (* 3 2)). Expressions such as (−(*5 4) (*3 2)) in LISP are called symbolic expressions (S-expressions). Here the function of subtraction (−) is performed on the results previously obtained for (*5 4) and (*3 2). When a simple number or variable is used as the argument of a function (such as the 3 or 2 in the multiplication 3*2), it is called an "atomic" argument. The contrasting situation occurs with a composition of functions when the argument to one function is itself the result of carrying out an earlier (embedded) computation. We can represent increasingly complex mathematical expressions by embedding previous results within new expressions in this manner.

It is helpful to graphically depict a functional programming language's expressions. Functional expressions can be viewed graphically as a tree with labels on the various points of the tree. In particular, any such expression can be viewed as a rooted point-labeled tree in which the internal points of the tree are labeled with functions and the endpoints of the lines radiating downwards from each such internal point is labeled with the arguments to that function. The term "downwards" in connection with rooted-point labeled trees means extending farther away from the root of the tree. The external points of the tree (sometimes called "leafs") are labeled with the terminals. The root of the tree is the particular internal point labeled with the function that is executed last. In a LISP S-expression, the first function is the outer-most LISP function (i.e. the function just inside the outermost left parenthesis of the LISP S-expression).

FIG. 1 illustrates this for LISP using the equation 5*4-3*2. In the ordinary notation of arithmetic shown as equation 100, the function 104 (multiplication) operates on the arguments 102 and 106 (i.e. 5 and 4 respectively) and the function 112 (multiplication) operates on the arguments 110 and 114 (i.e. 3 and 2 respectively). The function 108 (subtraction) then operates on the results of these two functions as its arguments. The function 108 is higher in the hierarchy than the functions 104 and 112.

In FIG. 1, the LISP S-expression 120, (–(*5 4) (*3 2)) is expressed as the function 124 (multiplication) operating on the arguments 126 (the number 5) and 128 (the number 4) and the function 130 (multiplication) operating on the arguments 132 (the number 3) and 134 (the number 2). The function 122 (subtraction) then operates on the results of these two evaluations.

When presented graphically in FIG. 1, the internal point 150 of the tree 130 with root 140 is labeled with the function of multiplication (*) and the external points 156 and 158 of the tree are labeled with the two arguments to the multiplication function (i.e. 5 and 4 respectively). The arguments to a given function (such as the multiplication function denoted by the internal point 150) are found by following the lines 152 and 154 radiating downwards from the internal point 150. Similarly, the internal point 160 of the tree is labeled with the function of multiplication and the external points of the tree 166 and 168 are labeled with the two arguments to the multiplication function (i.e., 3 and 2, respectively). The arguments to the function 160 are found by following the lines 162 and 164 radiating downwards from the internal point 160. The internal point of the tree 140 is labelled with the subtraction function. The arguments to the subtraction function are found by following the lines 142 and 144 radiating downwards from point 140. These arguments turn out to be the results of the previously performed multiplication operations. Arguments may be found at external points (if they are terminals) or at internal points (i.e. when the arguments to one function, such as subtraction here at 140, are the result of previous functions). The internal point 140 is the root of the tree and is labeled with the outermost function (subtraction). Internal point 140 is equivalent to point 122 in the LISP S-expression 120 (i.e., the function just inside the outermost left parenthesis of the LISP S-expression).

The advantage of a computer language such as LISP for performing work of this kind derives from the enormous flexibility arising from repeated applications of this very simple basic structure. The functions available in LISP can include functions other than the simple arithmetic operations of multiplication and subtraction. They include more complex mathematical functions such as square roots, exponentiation, etc; program control functions such as PROGN which allow a series of LISP expressions to be performed in succession; recursions (wherein a function refers to itself in the process of evaluating itself); iterative functions (such as DOTIMES) which cause certain functions to be performed repeatedly (typically with differing arguments); conditional functions [which cause specified alternative functions to be performed if some predicate function is (or is not) satisfied]; and symbolic functions which operate on symbols (instead of numbers).

By way of an example, suppose we want a computer program to begin by printing the symbolic string "HELLO"; then set the variable C to the sum of the variables A and B; and, then print the value of C only when C is greater than 4. In FIG. 2, the LISP S-expression (i.e. program) 700 performs these tasks. The function 701 PROGN allows a series of 3 major steps to be combined together into one program. The first major step of the series involves the function 702 (PRINT) operating on the string terminal 704 ("HELLO"). The second major step involves the function 706 (SETQ) operating on a variable 708 (C) and the result obtained from the function 710 (addition) operating on the arguments 712 (the variable A) and 714 (the variable B). The SETQ function assigns a value (its second argument) to a variable (its first argument). Finally, the third major step involves the conditional function 716 (WHEN) operating on two arguments. The first argument is a predicate function involving the relationship 718 (greater than) operating on the arguments 720 (the variable C) and 722 (the number 4). The second argument is the function 724 (PRINT) operating on the terminal 726 (the variable C).

Graphically, this LISP program (S-expression) can be represented as a tree whose internal points are labeled with functions and where the endpoints of the lines radiating downwards from each such internal point is labeled with the arguments to that function. In this graphical representation, one of the internal points is the root of the tree and the root is labeled with the function that appears just inside the first left parenthesis of the LISP S-expression.

Here, the root of the tree 730 is labeled with the function PROGN. The function PROGN has 3 arguments. The 3 lines 732, 734, and 736 radiating downwards from the internal point 730 (the root) correspond to the 3 arguments of PROGN. The first argument of PROGN is function 738, the PRINT function. It is the endpoint of the first line 732 radiating downwards from internal point 730. The function PRINT has one argument 740. In the case of the PRINT function, it has one argument which it prints. In this case, the argument is the string 740 "HELLO". This string 740 "HELLO" is an atomic argument (terminal) and appears at an external point (leaf) of the tree.

The second argument of PROGN is function 742, the SETQ function. The function SETQ has two arguments 744 and 746. The second argument of SETQ is itself a function 746 (addition) operating on the two arguments 748 (the variable A) and 750 (the variable B). The two arguments 748 and 750 are the variables A and B (terminals). They appear at external points (leafs) of the tree. The first argument of SETQ is 744 (the variable C) which is set to the sum of the values of A and B.

The third argument of PROGN is function 752, the WHEN function. The function WHEN has two arguments, 754 and 756. The first argument of the WHEN function is a predicate function 754 (greater than). The predicate function 754> has two arguments 758 (the value of variable C) and 760 (the number 4). The predicate function 754> returns a value of T (for "True") or NIL (for "False") depending on whether its first argument 758 (the value of the variable C) is greater than its second argument 760 (the number 4). The WHEN function executes its second argument 756 (the PRINT function) if its first argument 754 evaluates as true. The PRINT function 756 has one argument 762 (the numeric value of the variable C). Note that the PRINT function is flexible; it can accommodate a string argument (such as "HELLO" at 740) or a number (such as the value of variable C at 762).

A typical computer configuration is depicted in FIG. 11. It will be understood that while FIG. 11 is useful in providing an overall description of the computer system of the present invention, a number of details of the system are not shown. Referring to FIG. 11, the computer system of the currently preferred computer embodiment generally comprises a bus 100 for communicating information coupled to a processor 101. A random access memory (RAM) 102 (commonly referred to as main memory) is coupled to bus 100 for storing information and instructions for processor 101. A data storage device 103 is also coupled to bus 100 for storing data. Display device 104, such as a cathode ray tube, liquid crystal display, etc., is coupled to bus 100 for displaying information to the computer system user. A data input device 105, including alphanumeric and other key input devices, etc., is coupled to bus 100 for communicating information and command selection to processor 101 and for controlling cursor movement.

After generating a population of computational procedures, these procedures are executed and a value in the environment involved is assigned to the result of the execution. Thus, an important requirement for any implementation of this system is the ability to generate computational procedures (computer programs) and then execute them to produce a result.

Using appropriate representations on a computer having sufficient memory, the present invention can solve problems previously intractable under prior art methods. This disclosure presents a general method and specific examples of the present invention.

Automatically Defined Functions and The Architecture of the Overall Program

Many problem environments have regularities, symmetries, homogeneities, similarities, patterns, and modularities that can be exploited in solving the problem. To exploit these characteristics, one embodiment of the present invention uses automatically defined functions. An automatically defined function (ADF) is a function that is dynamically evolved during a run of genetic programming and which may be called by a calling program (e.g., a main program) that is simultaneously being evolved. Automatically defined functions and automatic function definition can be implemented within the context of genetic programming by establishing a constrained syntactic structure for the individual overall programs in the population.

Each program in the population is a multi-part program that contains one or more function-defining branches (each defining an automatically defined function), one main result-producing branch, and possibly other problem-specific types of branches (such as iteration-performing branches). The automatically defined functions are typically named sequentially as ADF0, ADF1, etc. The result-producing branch typically invokes the automatically defined functions.

A function-defining branch may be allowed to refer hierarchically to any already-defined function. The value returned by the overall program consists of the value returned by the result-producing branch. Actions may be performed by both the function-defining branches and the result-producing branches.

When automatically defined functions are being used, the initial random generation of the population must be created so that each individual overall program in the population has the intended constrained syntactic structure. The result-producing branch (rpb) is a random composition of functions from the function set, $F_{rpb}$, and terminals from the terminal set, $T_{rpb}$. If, for example, the intended constrained syntactic structure calls for one result-producing branch and one function-defining branch, the function-defining branch for ADF0 is a random composition of functions from the function set, $F_{adf0}$, and terminals from the terminal set, $T_{adf0}$.

Before applying genetic programming with automatically defined functions to a problem, it is first necessary to perform at least six major preparatory steps. These steps involve determining:

(1) the set of terminals for each branch,
(2) the set of functions for each branch,
(3) the fitness measure,
(4) the parameters and variables for controlling the run,
(5) the result designation and termination method, and
(6) designating an architecture of the yet-to-be-evolved overall programs in the population.

This sixth major step involves determining:

(a) the number of function-defining branches,
(b) the number of arguments possessed by each function-defining branch, and
(c) if there is more than one function-defining branch, the nature of the hierarchical references (if any) allowed between the function-defining branches. For example, the function-defining of an overall program may be allowed to refer to all other previously-defined (i.e., lower numbered) function-defining branches within the same program.

In general, there is no way of knowing a priori the optimal number of automatically defined functions that will be useful for a given problem, or the optimal number of arguments for each automatically defined function, or the optimal arrangement of hierarchical references among the automatically defined functions. When applying genetic programming with automatically defined functions in such a situation, one could use this knowledge of the problem to choose the known dimensionality as the number of arguments for one of the function-defining branches because one can reasonably anticipate a useful decomposition involving a subproblem of that dimensionality. Also, if it is known that there are a certain number of subsystems, one could use this knowledge of the problem to choose that number as the number of function-defining branches. In practice, exact knowledge of these numbers is not necessary; upper bounds on these numbers can be used to guide the choice of the number of function-defining branches and the number of arguments possessed by each function-defining branch.

Over-specification often works because genetic programming with automatically defined functions exhibits considerable ability to ignore available dummy arguments of an automatically defined functions, to ignore available automatically defined functions, and ignore available opportunities to reference already-defined automatically defined functions.

Resources are required by each additional function-defining branch and each additional argument, especially if the function-defining branches are permitted to invoke one another hierarchically. Thus, the practical reality is the amount of resources that one can afford to devote to a particular problem will strongly influence or dictate the architectural choice. Often the architectural choices are made on the basis of hoping that the resources that one could afford to devote to the problem will prove to be sufficient to solve the problem.

The present invention avoids these limitations by allowing the architecture of programs in the population to be changed as the population is evolved. In this manner, there is no need to prospectively analyze, no need to specify, no need to over specify, and no need to undertake any retrospective analysis of the problem to arrive at the architecture of the program.

Performing Genetic Programming

Genetic programming is a domain independent method that genetically breeds populations of computer programs to solve problems.

In the execution of genetic programming, three genetic operations, referred to as reproduction, crossover, and mutation are used. The present invention also provides new architecture-altering genetic operations as operations. These are described in detail later.

The steps for executing genetic programming are as follows:

(1) Generate an initial random population of computer programs.
(2) Iteratively perform the following sub-steps until the termination criterion has been satisfied:
   (a) Execute each program in the population and assign it (explicitly or implicitly) a fitness value according to how well it solves the problem.
   (b) Select program(s) from the population to participate in the genetic operations in (c) below. The selection of programs to participate in the (i) reproduction and (ii) crossover operations is performed with a probability based on fitness (i.e., the fitter the program, the more likely it is to be selected).
   (c) Create new programs by applying the following genetic operations.
      (i) Reproduction: Copy an existing program to the new population.
      (ii) Crossover. Create new offspring program(s) for the new population by recombining randomly chosen parts of two existing programs.
      (iii) Mutation: Create one new offspring program for the new population by randomly mutating a randomly chosen part of one existing program.
      (iv) Branch duplication: Create one new offspring program for the new population by duplicating one function-defining branch of one existing program and making additional appropriate changes to reflect this change.
      (v) Argument duplication: Create one new offspring program for the new population by duplicating one argument of one function-defining branch of one existing program and making additional appropriate changes to reflect this change.
      (vi) Branch deletion: Create one new offspring program for the new population by deleting one function-defining branch of one existing program and making additional appropriate changes to reflect this change.
      (vii) Argument deletion: Create one new offspring program for the new population by deleting one argument of one function-defining branch of one existing program and making additional appropriate changes to reflect this change.
      (viii) Branch Creation: Create one new offspring program for the new population by adding one new function-defining branch containing a portion of an existing branch and creating a reference tot hat new branch.
      (ix) Argument Creation: Create one new offspring program for the population by adding one new zero-argument function-defining branch representing a new argument.
      (x) Define Building Block (Encapsulation): Create one new offspring program for the population by replacing a subtree of a program with an invocation of a defined function bearing a unique new name and add the subtree to a library that may be accessed by any program in the population.
      (xi) Permutation: Create one new offspring program for the population by permuting the order of the arguments to a function (internal point) of a program.
      (xii) Editing: Create one new offspring program for the population by applying editing rules to a program.

(3) After the termination criterion has been satisfied, the single best computer program in the population produced during the run is designated as the result of the run. This result may be a solution (or approximate solution) to the problem.

Processing Logic of the Preferred Embodiment

FIGS. 3A and 3B are flow charts of the processes of the present invention. The process 1300 starts by the step Create Initial Population 1302 which creates (typically randomly) a population of programs. In one embodiment, the creation of the programs begins with a result-producing main program component. The result-producing main program component is a random composition of the primitive functions of the problem, the actual variables of the problem, and the functions defined within the current individual. Each of the function definitions contained in the present individual are created in the initial random generation and are comprised of the primitive functions of the problem and a specified (possibly zero) number of dummy variables (i.e., formal parameters) which vary in general among the defined functions of the individual. In the most general case, not only the primitive functions of the problem are contained within the function definitions, but also references to other defined functions within the current individuals. Finally, the function definitions can also contain (but usually do not) the actual variables of the problem by which the program is called. It should be noted that although a program is the currently preferred computer embodiment of the entity, the term entity will be used throughout the discussion of FIGS. 3A and 3B.

The process then begins to operate upon the population. If the termination test for the process 1304 is satisfied (for example, by achieving a known best solution to the problem among the population of individuals, by achieving a certain degree of fitness for the population, etc.), the process terminates at End 1301. Otherwise, the process continues to iterate.

The basic iterative loop of the process for the evolving population begins with the step Execute Each Entity 1306 wherein at least one entity is executed. The next step, Assign Values and Associate Values with each Entity 1312, involves assigning a value (fitness) to each result produced by execution, and associating the value with the producing entity. After assigning and associating, Remove Entity(s) with relatively low fitness, step 1314, causes the removal of some of the less fit members of the population (the term "entity(s)" used herein refers to the phrase "entity or entities"). Although not essential, step 1314 improves the average fitness and eases memory requirements by keeping the population within reasonable limits. Step 1316, Select Entity with relatively high fitness values, picks at least one entity to use in the following operation. The selected entity (s) have a relatively high fitness value.

At step 1318, Choose an Operation to Perform, the process determines which operation to begin. Crossover 1320 and Reproduction 1330 are the basic operations performed; however, Permutation 1340 also plays a role. Optionally, the operation of Mutation 1350 or Define Building Block (encapsulation) 1370 may be used. The architecture-altering operations of branch duplication 1390, argument duplication 1391, branch deletion 1392, argument deletion 1393, branch creation 1394, and argument creation 1395 may also be selected. In the present invention, the vast majority of operations are the reproduction and crossover operations.

Note that the same individual may be selected more than once (i.e., replacement is allowed). It should be recognized that there are numerous slight variations of the overall process possible. Some of these variations can be used as a matter of convenience.

Crossover 1320 requires a group of at least two entities (typically two parents), so second entity(s) are picked to mate with at least one selected entity(s). There are various methods for choosing the second parent or parents. Generally, choosing only relatively high fitness individuals is preferable over choosing randomly. Crossover involves mating selected entity(s) with at least one second picked entity(s). For each mating, a crossover point is separately selected at random from among both internal and external points within each parent at Select Crossover Points 1322. Then one or more newly created entities are produced at Perform Crossover 1324 from the mating group using crossover.

Note also no requirement exists that the population be maintained at a constant size. The version of the crossover operation producing two offspring from two parents, referred to herein as two-offspring crossover, has the convenient attribute of maintaining the population at constant size. (Note that the other operations each produce one offspring from one parent so that they too maintain constant population size). On the other hand, if the crossover operation acts on a group of more than two parents, the size of the population may grow. For example, if three parents formed a mating group, each parent could have two crossover points selected for it and there could be 27 possible offspring (3×3×3). Even if the three offspring equivalent to the three original parents are excluded, there would be 24 possible new offspring available. In general, if there are N parents, then N−1 crossover points could be selected for each and there could be $N^N-N$ new offspring available. When an operation produces more offspring than parents, then either the population can be allowed to grow or the population can be trimmed back to a desired (presumably constant) size when the next round of fitness proportionate reproduction takes place.

For the operation of Reproduction 1330, the Selected entity(s) remain unchanged. The preferred method for selecting computational procedures for reproduction is to select them with a probability proportional to their normalized fitness. It is also possible to use tournament selection or other methods of selection.

If the permutation operation is selected then the process continues at Permutation 1340. A permutation point is selected at random in Select Permutation Point 1342 from among the internal points within the selected individual. Then Perform Permutation 1344 is performed, by reordering the selected entity's arguments at the permutation point.

If the mutation option is chosen, Mutation 1350 occurs. The locations of the mutation are picked in Select Mutation Point 1352 for each Selected entity. Perform Mutation 1354 then randomly generates, for each mutation location in each Selected entity, a portion of an entity and inserts it at the mutation point. The portion inserted is typically a sub-entity tree, but may be a single point.

If the Define Building Block (encapsulation) operation 1370 is chosen, a new function is defined by replacing the sub-tree located at the chosen point by a call to the newly encapsulated building block. The body of the newly encapsulated building block is the sub-tree located at the chosen point. The newly encapsulated building blocks can be named DF0, DF1, DF2, DF3, . . . as they are created.

If the branch duplication operation 1390 is selected, a branch portion of the entity is duplicated to create a new sub-entity. References to or associated with the duplicated portion may also be changed to reflect the addition of the duplicated structure. If the argument duplication operation 1391 is selected, an argument portion of the entity is duplicated to create a changed sub-entity. References to or associated with the duplicated portion may also be changed to reflect the addition of the duplicated portion.

If the branch deletion operation 1392 or the argument deletion operation 1393 are selected, either a branch portion or argument portion is deleted from a sub-entity. References to the deleted portion are also changed so that each portion of the entity has meaning.

If the branch creation operation 1394 is selected, an addition of a branch to an entity is made to create a new sub-entity. If the argument creation operation 1395 is selected, an addition of an argument to a subentity is made to create a changed sub-entity.

The editing operation 1380 recursively applies a pre-established set of editing rules to each program in the population. In all problem domains, if any sub-expression has only constant terminals as arguments and only side-effect free functions, the editing operation will evaluate that sub-expression and replace it with the value obtained. The define building block (encapsulation) operation and editing operation are described in more detail below.

Finally, the newly created entities are inserted into the population at 1360 and the process returns to the termination test 1303.

The first step in the iterative process involves activating an entity from the evolving population. Activation means having the entity attempt to accomplish its goal, producing an objective result. In one embodiment, entities are computer programs, so activation requires executing the programs of the population. The second step in the process assigns a fitness value to the objective result, and associates that fitness value with its corresponding entity. For computer programs, the fitness value is generally a number, or a vector, which reflects the program's execution, although the fitness value could be any symbolic, numeric or structured representation used on a computer, provided they can be ordered.

In general, some of the entities will prove to be better than others when a value is assigned to them after their interaction with the "environment" of the problem. The best value (fitness) may be the lowest number (as is the case here where we are measuring the aggregated deviation between a result and a known perfect solution). In other problems, the best value (fitness) may be the highest number (e.g. scoring direct "hits"). The value (fitness) assigned may be a single numerical value or a vector of values, although it is often more convenient that it be a single numerical value. It should be noted that the fitness could also be a symbolic value as long as a partial ordering is established over the set of symbols. Also in many problems, the best value is not known. However, even in such problems, it is known whether lower (or higher) numbers connote better fitness and the best value attained by the process at a given time can be identified.

A useful method for organizing raw fitness values involves normalizing the raw fitness values, then calculating probabilities based on the normalized values. The best raw fitness value is assigned an adjusted fitness of 1, the worst value is assigned an adjusted fitness value of 0, and all intermediate raw fitness values are assigned adjusted fitness values in the range of 0 to 1. The probability of an individual being selected can be determined in one of several ways. One way is that the probability of being selected is determined by the equation:

$$P(i) = \frac{f_i}{\sum_{j=1}^{n} f_j}$$

Where P(i) is the probability of selection for individual i having an adjusted fitness of $f_i$, and n is the total number of entities in the population. Thus, an individual's probability of being selected equals the individual's adjusted fitness value divided by the sum of all the adjusted fitness values of the population. In this way, the normalized fitness values range P (i) between 0 and 1, with a value of 1 associated with the best fitness and a value of 0 associated with the worst, and the sum of all the probabilities equals 1. Note that fitness proportionate reproduction requires activation of all the entities in the evolving population in order to compute the sum of the adjusted fitness values $f_j$ needed in the above calculation.

Another way of selecting an individual is called "tournament selection". In tournament selection, two individuals are randomly selected from the population; their fitness is compared; and, the better of the two individuals is selected. This "tournament" method of selection requires less computer time and does not require the centralized computation of the sum of the adjusted fitness values $f_j$. In effect, this method relies upon the relative ranking of the fitness values, rather than their exact numeric values.

However, if computer time and the centralized computation are not a concern, the "fitness proportionate reproduction" method is generally to be preferred.

It may also be desirable to remove individual computation procedures from the evolving population with relatively poor fitness values. In practice, it may also be convenient to defer this activity briefly until a new generation of individuals is created.

It is a key characteristic of this overall process that the new population of individuals tends to display, over a period of time, increasing average value (fitness) in the environment involved. Moreover, another characteristic of this overall process is that if the environment changes, the new population of individuals will also tend to display, over a period of time, increasing average value (fitness) in the new environment.

At any given time, there is one individual (or more) in every finite population having a single fitness value that is the best amongst that population. Moreover, some environments have a known best fitness value. Examples are when fitness is measured as deviation from a known answer (e.g. a linear equations problem) or number of matches (e.g. a sequence induction problem). Alternatively, a mixed strategy may be used in determining fitness wherein a mix of pure strategies is used instead of a pure optimum strategy.

The present invention's process may occasionally generate an individual whose value (fitness) happens to equal the known best value. Thus, this overall process can produce the best solution to a particular problem. This is an important characteristic of the overall process, but it is only one characteristic. Another important characteristic (and the one which is more closely analogous to nature) is that a population of individuals exists and is maintained which collectively exhibits a tendency to increase its value (fitness) over a period of time. Also, by virtue of the many individuals with good, but not the very best, fitness values the population exhibits the ability to robustly and relatively quickly deal with changes in the environment. Thus, the variety in the population lowers its overall average value (fitness); additionally, the population's variety gives the population an ability to robustly adapt to changes in the environment.

In executing the overall process, it is often convenient to mark the one (or perhaps more) individuals in the population with the best fitness value amongst that population at any given time. Such marked best individuals are then not subject to removal (as parents), but are instead retained in the population from generation to generation as long as they remain the best. This approach prevents loss of the most fit individual in the population and also provides a convenient reference point for analytical purposes. If the problem involved happens to have a known best solution, after a certain number of generations the best individual will often be the known best solution.

The third step involves selecting entities which will be used to perform operations. A number of selection methods exist which tend to select entities of relatively high value. The theoretically most attractive way to select individuals in the population is to do so with a probability proportionate to their fitness values (once so normalized between 0 and 1). Thus, an individual with fitness of 0.95 has 19 times greater chance of being selected than an individual of fitness value 0.05. Occasionally individuals with relatively low fitness values will be selected. This selection will be appropriately rare, but it will occur.

If the distribution of normalized fitness values is reasonably flat, this method is especially workable. However, if the fitness values are heavily skewed (perhaps with most lying near 1.00), then making the selection using a probability that is simply proportionate to normalized fitness will result in the differential advantage of the most fit individuals in the population being relatively small and the operation of the entire process being prolonged. Thus, as a practical matter, selection is done with equal probability among those individuals with relatively high fitness values rather than being made with probability strictly proportionate to normalized fitness. This is typically accomplished by choosing individuals whose fitness lies outside some threshold value.

In connection with selection of individuals on the basis of fitness, we use the phrase "relatively high value" herein to connote either selection based on a probability proportionate to normalized fitness (the preferred approach), tournament selection (the time-saving approach), or selection with equal probability among those individuals having fitness values outside some threshold. In practice, choosing individuals from the best half with equal probability is a simple and practical approach, although fitness proportionate selection is the most justified theoretically.

After completing selection, the fourth step requires choosing an operation. The possible operations include crossover, mutation, and reproduction. In addition, permutation and define building block (encapsulation) operations are available. In one embodiment, the preferred operation is crossover, followed by reproduction, and lastly mutation. One of the architecture altering operations of argument duplication, argument deletion, branch duplication, branch deletion, branch creation or argument creation may be chosen. However, this preference is only a generalization, different preferences may work better with some specific examples. Thus, the choice of operations should mainly be the preferred operation, but that choice should remain flexible to allow for solving differing problems. As will be described below, one operation for introducing new individuals into the population is the crossover operation. To illustrate the crossover operation for this example, a group of two individuals is selected from among the population of individual S-expressions having relatively high fitness values, although it is not necessary to limit the size of the group selected to two. Two is the most familiar case since it is suggestive of sexual reproduction involving a male parent and a female parent. The underlying mathematical process can obtain effective results by "crossing" hereditary information from three or more parents at one time. However, the key advantage of being able to combine traits from different individuals is attained with two parents. In one form, all of the individuals in the group of parents have relatively high fitness values. In its most general form, the requirement is only that at least one of the individuals in the group of parents has a relatively high fitness value. The other parents in the group could be any member of the population. In either case, all mating involves at least one parent with relatively high fitness values.

The remainder of this example problem relates to two-offspring crossover. For purposes of this example problem, assume that a group of two parents with relatively high fitness values has been selected. In two-offspring crossover, the group of parents is now used to create two new individuals. FIG. 4 graphically illustrates a simple example of mating two parents to produce two new offspring for the example problem involving linear equations. It should be noted that there need not be precisely two offspring and some versions of the basic concept here produce only one offspring, such as in one-offspring crossover, or can produce more than two offspring.

Parent 1 is the computational procedure (program) 400:

(−(+(+B1 B2)A11) (*B2 A12))

This computational procedure can also be represented by the rooted point-labeled tree with root 410. Root 410 is the subtraction function and has lines to two arguments, internal nodes 412 and 413. Node 412 is the addition function having lines to internal node 414 and leaf 417 (the variable A11), its arguments. Node 414 is the addition function having lines to leafs 415 and 416 (the variables B1 and B2, respectively). The root 410's second argument, node 413, is the multiplication function having lines to leafs 418 and 419 (the variables B2 and A12, respectively), its two arguments. Sub-tree 411 comprises 413, 418, and 419. Parent 2 is the computational procedure 420, (−(*B1 A22) (−B2 A11)). This computational procedure can also be represented as the rooted point-labeled tree with root 430. Root 430 is the subtraction function and has lines to two arguments, internal node 432 and 434. Node 432 is the multiplication function having lines to arguments at leafs 435 and 436 (the variables B1 and A22, respectively). Node 434 is the subtraction function having lines to arguments at leafs 437 and 438 (the variables B2 and A11, respectively). Tree 421 comprises 430, 432, 435 and 436, which is all of parent 2 except for the root 430's second argument.

Selecting the crossover point for two-offspring crossover starts by counting up the internal and external points of the tree. This entire program tree is considered to be one result-producing branch. The tree with root 410 has 9 points (410, 412, 413, 414, 415, 416, 417, 418, and 419). One of the 9 points (410, 412, 413, 414, 415, 416, 417, 418 and 419) of the tree for parent 1 (that is, the tree with root 410) is chosen at random as the crossover point for parent 1. A uniform probability distribution is used (so that each point has a probability of 1/9 of being selected). In FIG. 4, point 413 is chosen. Point 413 happens to be an internal point of the tree.

Similarly, one of the 7 points (430, 432, 434, 435, 436, 437 and 438) of the tree for parent 2 (that is, the tree with root 430) is chosen at random as the crossover point for parent 2. In FIG. 4, point 434 is chosen. Point 434 happens to be an internal point of the tree. Each of the 7 points has a uniform probability of 1/7 of being chosen.

Offspring 2 is produced by combining some of the traits of parent 1 and some of the traits of parent 2. In particular, offspring 2 is produced by substituting the sub-tree 411 (sub-procedure), beginning at the selected crossover point 413 [namely, (*B2 A12)]of parent 1, into the tree 421 of parent 2 at the selected crossover point 434 of parent 2. The resulting offspring 470 thus contains the sub-procedure 411 (*B2 A12) from parent 1 as a sub-procedure at point 474, which is attached to the second line from root 430 of tree 421. It is otherwise like parent 2 [that is, it has a root labeled with the subtraction function having (*B1 A22) as its first argument]. This particular mating produces the computational procedure 460, (−(*B1 A22) (*B2 A12)), which is the known correct solution for the first variable x1 for a pair of two linear equations in two variables. In other words, the crossover involving parents 1 and 2 (neither of which were the correct solution to the linear equations problem) using the crossover points 413 and 434 happened to produce an offspring with best fitness (i.e., the known correct solution to the problem).

Offspring 1 is produced in a similar fashion by combining some of the traits of parent 1 and some of the traits of parent 2. In this case, the complementary portions of each parent combine. In particular, offspring 1 is produced by substituting the sub-tree (sub-procedure) beginning at the crossover point 434, [(−B2 A11 )] of parent 2, into the tree of parent 1 at the crossover point 413 of parent 1. The resulting offspring 450 thus contains the sub-procedure (−B2 A11) from parent 2 as a sub-procedure at point 454. It is otherwise similar to parent 1. Root 452 is the subtraction function having lines to arguments at internal nodes 442 and 454. Node 442 is the addition function having lines to arguments at internal node 445 and leaf 444 (the variable A11). Internal node 445 is the addition function having lines to arguments at leafs 446 and 448 (the variables B1 and B2, respectively). Node 454 is the subtraction function having lines to arguments at leafs 456 and 458 (the variables B2 and A11, respectively).

If two external points (leafs) of the tree had been chosen as crossover points, the crossover would have proceeded similarly with the labels (i.e. arguments) for the two points being exchanged. FIG. 5 illustrates two-offspring crossover wherein the mating of two parents with crossover occurs only at external points (leafs) for the linear equations example problem. The first parent 500, (−(*A11 A12 A21) B1), is represented by the tree with root 510. Root 510 is the subtraction function having lines to arguments at internal node 515 and leaf 512 (the variable B1). Node 515 is the multiplication function having lines to arguments at leafs 516, 517, and 518 (the variables A11, A12, and A21, respectively). External point (leaf) 512 has been chosen at random as the crossover point for the first parent and contains the variable terminal B1. Note that, for purposes of illustrating the generality of functions, one of the functions (*) has 3 arguments (A11, A12 and A21) in this particular Figure. The second parent 520 is represented by the tree with root 530. Root 530 is the subtraction function having lines to arguments at leafs 534 and 532 (the variables A22 and B2, respectively). External point (leaf) 532 has been chosen as the crossover point for the second parent and contains the variable terminal B2.

The result of the two-offspring crossover operation are two new offspring 540 and 560. The first offspring 540, (−(*A11 A12 A21) B2), is represented by the tree with root 550. Root 550 is the subtraction function having lines to arguments at internal node 545 and leaf 552 (the variable B2). Node 545 is the multiplication function having lines to arguments at leafs 546, 547, and 548 (the variables A11, A12, and A21, respectively). This tree is identical to the tree with root 510 (i.e. parent 1) except that external point (leaf) 552 is now the argument B2 (instead of B1) from parent 2. The second offspring 560, (−A22 B1), is represented by the tree with root 570. Root 570 is the subtraction function having lines to arguments at leafs 574 and 572 (the variables A22 and B1, respectively). This tree is identical to the tree with root 530 (i.e. parent 2) except that external point (leaf) 572 is now the terminal B1 (instead of B2) from parent 1. Thus, the terminals B1 and B2 have been crossed over (exchanged) to produce the two offspring.

FIG. 6 illustrates two-offspring crossover wherein the mating of two parents with crossover occurs at one internal point (i.e. a point labeled with a function) and one external point (i.e. a point labeled with a terminal). The first parent 600, (+(+A11 A12) (*A21 A22)), is represented by a tree with root 610. Root 610 is the addition function having lines to arguments at internal nodes 602 and 612. Node 602 is the addition function having lines to arguments at leafs 604 and 606 (the variables A11 and A12, respectively). Node 612 is the multiplication function having lines to arguments at leafs 614 and 616 (the variables A21 and A22, respectively). Internal point 612 has been chosen as the crossover point for the first parent. The second parent 620, (−(−B1 B2) (*B3 B4)), is represented by a tree with root 630. Root 630 is the subtraction function having lines to arguments at internal nodes 622 and 624. Node 622 is the subtraction function having lines to arguments at leafs 632 and 629 (the variables B1 and B2, respectively). Node 624 is the multiplication function having lines to arguments at 628 and 626 (the variables B3 and B4, respectively). External point 632 has been chosen as the crossover point for the second parent. The result of the two-offspring crossover operation is two new offspring. The first offspring 640, (+(+A11 A12) B1), is represented by the tree with root 650. Root 650 is the addition function having lines to arguments at internal node 654 and leaf 652 (the variable B1). Node 654 is the addition function having lines to arguments at leafs 656 and 658 (the variables A11 and A12, respectively). This tree is identical to the tree with root 610 (i.e. parent 1) except that the second argument 652 of the function+650 (addition) is now the single argument (terminal) B1 from parent 2. The second offspring 660, (−(−(*A21 A22) B2) (*B3 B4)), is represented by the tree with root 670. Root 670 is the subtraction function having lines to arguments at internal nodes 678 and 684. Node 678 is the subtraction function having lines to arguments at internal node 672 and leaf 682 (the variable B2). Node 672 is the multiplication function having lines to arguments at leafs 674 and 676 (the variables A21 and A22, respectively). Node 684 is the multiplication function having lines to arguments at leafs 686 and 688 (the variables B3 and B4, respectively). This tree is identical to the tree with root 630 (i.e. parent 2) except that the internal point 672 (i.e. the first argument 678 of the subtraction function 670) is now a function (multiplication) instead of the variable terminal B1.

Thus, regardless of whether internal or external points are selected as crossover points on the trees of the parents, the result of performing crossover operations is that offspring are produced which contain the traits of the parents. In fact, the offspring resulting from crossover consist only of sub-expressions from their parents. To the extent this is not entirely the case in actual practice, the result can be viewed as having been the result of applying crossover to the parents and then allowing a mutation (random variation) to occur. The crossover operation has the properties of closure and being well-defined.

Occasionally, a given individual may be mated with itself. In the conventional genetic algorithm involving binary strings, two-offspring crossover with identical parents merely creates two copies of the original individual. When computational procedures (programs) are involved, an individual mating with itself generally produces two different individuals because the crossover points are independently chosen for each parent (unless the crossover points selected happen to be the same).

The three examples of mating with two-offspring crossover were presented above in terms of the graphical representation of the computational procedures. Graphical representations are especially suited to demonstrating the "cut and paste" character of the crossover operation. In addition, the graphical method of representation is a general way of representing functions and the objects they operate on (whether computational procedures or machines) and is also not inherently associated with any particular programming language or any particular mode of implementation. As previously discussed, the computer language LISP may be one of any number of programming languages used to actually implement these processes on a computer.

In FIG. 6, the mating of two parents with two-offspring crossover occurring at one internal point and one external point is illustrated. FIG. 6 will be referred to in the following discussion since it encompasses the principles involved in both FIGS. 4 and 5. Parent I in FIG. 6 was the LISP computational procedure (+(+A11 A12) (*A21 A22)) and parent 2 in FIG. 6 was the LISP computational procedure (−(−B1 B2) (*B3 B4)). Using LISP computational procedures (S-expressions), the mating of the two parents is implemented in the following way.

First, the number of functions and terminals in the LISP S-expression 600 in FIG. 6 are counted. For LISP S-expression 600, there are 3 functions (i.e. 2 occurrences of+and 1 occurrence of *) and there are 4 terminals (i.e. A11, A12, A21 and A22). The total count is 7. This counting can be easily performed in LISP in a variety of well-known ways. One especially simple way makes use of such basic LISP functions as CAR and CDR, which are built into the microcode of microprocessor chips that are especially designed to handle LISP. The CAR function in LISP allows one to examine the first item of any list. Here the first item in computational procedure 600 is the first+function (i.e. the addition function appearing just inside the outermost left parenthesis). The "+" is identified as a function and included in the overall count. Meanwhile, the CDR function eliminates the first item of the list by returning a list comprising all but the first item. Thus, the remainder of the computational procedure (which is now smaller than the original computational procedure 600 by the first element+) can be subjected to similar handling in a recursive way.

Secondly, having counted the number of functions and terminals in the computational procedure 600, a random number generator is called to select a number between 1 and 7. Typically, a uniform probability distribution (i.e. probability of 1/7 for each of the 7 possibilities) is used here (and elsewhere herein). Such random number generators are well-known in the art and often included in a package of utility functions provided by computer manufacturers to users of their computers. If the random number generator selects the integer 5, then the multiplication function * (shown graphically at point 612) would be chosen as the crossover point for parent 1. This identification is most simply accomplished by numbering the functions and terminals in the same order as the counting function encountered them (although any ordering might be used for this purpose). In particular, the crossover point is the first element of the sub-list (*A21 A22). This sub-list is the third element of the list 600. Note that in LISP, a computational procedure is represented by a list—an ordered set of items found inside a pair of parentheses.

Similarly, the functions and terminals in computational procedure 620 can be counted. The count for parent 2 would thus also be 7. In this example, the terminal B1 is selected as the crossover point for parent 2. This terminal happens to be in the second top-level element of the list 620— namely, the sub-list (−B1 B2). In fact, B1 is the second element of this second top-level element of list 620.

The third step involves finding the "crossover fragment" for each parent. When the crossover point for a given parent is a terminal, then the "crossover fragment" for that parent is simply the terminal. Thus, for example, the crossover fragment for parent 2 is the terminal B1. On the other hand, when the crossover point for a given parent is a function, then the "crossover fragment" for that parent is the entire list of which the function is the first element. Thus, for example, the crossover fragment for parent 1 is the entire list 692, which is (*A21 A22). By producing a "crossover fragment", portions of each parent combine to produce offspring.

In the above case, the "crossover fragment" list has no sub-lists. However, if this list contained a sub-list (that is, an argument that was itself a function of other arguments), then it is carried along also. This point about sub-lists can be easily illustrated by supposing that the first element of list 600 had been chosen as the crossover point (instead of the multiplication * function). This first element is the function+. Then the crossover fragment associated with this crossover point is the entire original list 600—that is, the list consisting of the function+and the 2 sub-lists (+A11 A12) and (*A21 A22).

The fourth step is to produce offspring 1. Offspring 1 is produced by allowing parent 1 to perform the role of the "base" ("female") parent and parent 2 to perform the role of the "impregnating" ("male") parent. In general, an offspring is produced within the female parent by replacing the crossover fragment of the female parent with the crossover fragment of the male parent. In particular, the crossover fragment 692 of the female parent [the entire list (*A21 A22)] is replaced within the female parent by the crossover fragment 691 of the male parent (the terminal B1). The resulting offspring 1 (640) is:

(+(+A11 A12) B1)).

The fifth step is to produce offspring 2. Offspring 2 is produced by allowing parent 2 to perform the role of the "base" ("female") parent and parent 1 to perform the role of the "impregnating" ("male") parent. In particular, the crossover fragment 691 of the female parent (the variable terminal B1) is replaced by the crossover fragment 692 of the male parent, which is the list (*A21 A22). The resulting offspring 2 (660) is thus: (−(−(* A21 A22) B2) (*B3 B4).

Thus, using two-offspring crossover, two parents can produce two offspring. In some variations of the process, only one offspring is produced from a designated male-female pair, such as in one-offspring crossover. In this implementation of the crossover process, each offspring is composed of genetic material that came from both its male parent and its female parent. The genetic material of both parents generally finds its way into each offspring in both the two-offspring and the one-offspring crossover. In some embodiments there are further restrictions placed on the structure of the entities (programs) created. Each point in the tree representing an entity has associated with it both a type and a category. An example of a particular type might be "arithmetic function." Because arithmetic functions, such as "+" are capable of operating only on numeric values, any time an entity is created, it is specified that it includes a function of the type "arithmetic function". The creation process is then constrained so that the arguments that are created for this function must be compatible. That is, they must be of a type such as "arithmetic function" or "numeric value." A function such as "NOT" can not be used as an argument to the function "+" because "NOT" is of the type "Boolean function." Trees that have constraints on the types of functions and terminals that can appear are referred to herein as having a syntactically constrained structure. Trees are created in a manner that imposes this syntactic structure and the syntactic structure is preserved during the evolutionary process by the use of structure-preserving crossover, that is crossover that is constrained so that only objects of compatible (often the same) type can be crossed over. This syntactic structure can take the form of complex rules of construction, as is the case in the recursive process of genetic programming of the present invention, or it might simply take the form of requiring that the root of the tree always be labeled with a certain function, such as LIST, which returns a list composed of the values of its arguments. In this latter case, there would be two types of points in the entity, namely the "root point" type and the "any other point" type.

The second way in which the points in the trees are identified is by their category. Categories are used in the automatically defined function mechanism of the present invention to identify the meaning given to certain subtrees in the context of the functions being defined. Just as there is a process of structure-preserving crossover that preserves any syntactically imposed structure in the entities, there is also a process of category-preserving crossover that makes sure that crossover always operates between components of compatible categories.

Thus, when performing crossover and using the automatic function definition mechanism of the present invention, crossover is required to preserve both the category and the syntactic structure of the entities in question.

For the operation of reproduction, one computational procedure with relatively high fitness is selected from among the computational procedures in the population. This computational procedure is retained in the population unchanged. One method for selecting computational procedures for reproduction is to select them with a probability proportional to their normalized fitness. In other words, there is survival and reproduction of the fittest amongst the computational procedures in the population. One consequence of the reproduction operation is that individuals in the population with relatively low fitness values are progressively removed from the population.

It should be noted that the reproduction operation introduces nothing new into the population. If only reproduction operations were performed, no new individuals would be created. In fact, if only reproduction occurred, there would be progressively fewer and fewer different individuals in the population (although the average fitness of the population would tend to increase). The reproduction operation has the properties of closure and being well-defined.

Reproduction of the fittest and crossover are the basic operations for varying and improving the population of individual computational procedures. In addition, there is a permutation operation. Permutation operates on a single subject and produces a single computational procedure. The permutation operation has the properties of closure and being well-defined. FIG. 7 illustrates the permutation operation on a computational procedure.

The permutation operation is also performed on an individual in the population with relatively good fitness. One purpose of permutation is to introduce a new order among existing sub-procedures of a given computational procedure (possibly allowing some new possibility for adaptation to emerge). However, the chances of this happening are relatively remote (just as the chance of a random mutation producing a mutant with high fitness is remote).

In FIG. 7, the subject computational procedure 900, (-(-A B C) (+D E F) (*G H I)), is represented by a tree with root 910. Root 910 is the subtraction function and has lines to arguments at internal nodes 902, 912 and 914. Node 902 is the subtraction function and has lines to arguments at leafs 904, 906 and 908 (the variables A, B, and C, respectively). Node 912 is the addition function and has lines to arguments at leafs with the variables D, E, and F. Node 914 is the multiplication function and has lines to arguments at leafs with the variables G, H, and I. Only internal points are selected for the permutation operation. To accomplish this, the internal points are counted and one of them is chosen at random from among the possibilities (typically using a uniform probability distribution). The tree with root 910 has four internal points (910, 902, 912, and 914). Once the permutation point is chosen, all the lines radiating downwards from that point are permuted (i.e. re-ordered) at random. If there are K lines radiating from a given permutation point, then there are K-factorial possible permutations. Thus, if K is 3 (as it is for internal point 902), then there are six possible permutations (i.e. 3 times 2 times 1) possible at the permutation point 902.

One of the six possible permutations is chosen at random using a uniform probability distribution over the six possibilities. One of the six possible permutations of three items permutes the items A, B, C to C, A, B. Suppose this one was chosen. The computational procedure 920, (-(-C A B) (+D E F) (*G H I)), is represented by the tree with root 930; it is the tree that results when this particular permutation is applied to the tree with root 910 using the permutation point 902. In this new tree 930, the first line 922 radiating from the internal point 932 ends with the label C (instead of A as at 904). The second line 924 radiating from internal point 932 ends with the label A (instead of B as at 906). The third line 926 radiating from internal point 932 ends with label B (instead of C as at 908). The second and third lines from 930 have the same arguments as the second and third lines from root 910. Thus, the permutation of A,B,C to C,A,B at permutation point 902 has been effected. If a particular permutation happens to exactly reverse the order of items, it is called an inversion.

If internal point 910 had been chosen as the permutation point, the computational procedure 940, (-(+D E F) (*G H I) (-A B C)), represented by the tree having root 950 could be the result. In this tree, the first line 942 radiating downwards from root 950 ends with the label+(addition). The second line 944 radiating downwards from internal point 950 ends with the label * (multiplication). The third line 946 radiating downwards from internal point 950 ends with the label—(subtraction). Thus, the three items –,+, * from tree 910 are permuted into the new order+, *, –. Each function has the same arguments as in the corresponding sub-tree from the tree with root 910. If one views the permutation operation as operating on the lines radiating downwards from the chosen point of permutation, there is no fundamental difference between the permutation of arguments illustrated by 20 and the permutation of functions illustrated by 940. The two are included here for the sake of illustration. Clearly also by the same mechanism, any combination of functions and terminals can be permutated.

Another possible step is mutation. The mutation operation alters a randomly selected point within an individual. It has the properties of closure and being well defined. Mutation, if performed at all, is performed on only a tiny fraction of alleles in a tiny fraction of entities in the population. It may be performed on randomly selected individuals in the population having a relatively high fitness. The purpose of mutation is not to accidently create a mutant individual with extremely high fitness and thereby improve the population (although there is a very remote possibility that this may happen). Mutation does, however, perform one role which is occasionally useful—namely, it provides a way to introduce (or reintroduce) new genetic material into the population.

Generally, with even a modestly sized population, all the possible gene values (alleles) will be represented somewhere in the population. This is almost certainly going to be the case in the initial population if it is at least modestly sized and if it is generated at random. In fact, a potential pitfall of priming an initial population with good individuals (especially if 100% of the initial population comes from priming) is the possibility of accidently limiting the search possibilities to only a portion of the potential search space. However, in the course of removing individuals with low fitness, there is a remote possibility that particular alleles may actually disappear completely from a population. There is also a remote possibility that later, the vanished alleles may become necessary to achieve the next level of advance in fitness. To forestall this remote conjunction of possibilities, the mutation operation may prove useful. By randomly altering an allele in a tiny number of randomly chosen individuals from time to time, the mutation operation may reintroduce a vanished allele back into a population.

The define building block (encapsulation) operation is a means for automatically identifying potentially useful "building blocks" while the process is running. The define building block operation, commonly referred to as encapsulation, is an asexual operation in that it operates on only one parental S-expression. The individual is selected in a manner proportional to normalized fitness. The operation selects a function (internal) point of the LISP S-expression at random. The result of this operation is one offspring S-expression and one new definition. The define building block (encapsulation) operation defines a new function to represent the building block and by replacing the sub-tree located at the chosen point by a call to the newly encapsulated building block. The body of the newly encapsulated building block is the sub-tree located at the chosen point. In one embodiment, the newly encapsulated building blocks are named DF0, DF1, DF2, DF3, . . . as they are created. It should be noted that the define building block (encapsulation) operation is different from the automatically defined function mechanism of present invention.

For the first occasion when a new function is defined on a given run, "(DF0)" is inserted at the point selected in the LISP S-expression. The newly encapsulated building block may then be compiled to improve efficiency. The function set of the problem is then augmented to include the new function so that, if mutation is being used, the arbitrary new sub-tree grown at the selected point might include a call to the newly encapsulated building block.

The define building block (encapsulation) operation involves a function using already instantiated variables, such that the newly defined building block is inserted as a value. An example of the defined building block operation (i.e., encapsulation) is shown in conjunction with FIGS. 12–14. Referring to FIG. 12, a simple entity is shown, namely the symbolic expression in the LISP programming language for the mathematical expression A+B*C. In LISP, this mathematical expression would be written as (+A (*B C)). FIG. 12 shows the graphical representation of this LISP symbolic expression, namely the tree with root 1900.

In this example, the define building block (encapsulation) operation works by first selecting a point typically by using a uniform probability distribution. Suppose that the point 1910 is selected. The sub-tree (sub-expression, sub-list) starting at point 1910 is then replaced by a call to the function DF0. The function in FIG. 12 has no explicit arguments. Thus, the tree with root 1900 is replaced by the tree with root 1912, as shown in FIG. 13. The new tree has the function (DF0) at point 1914, in lieu of the sub-tree starting at 1910. In LISP, the new S-expression is (+A (DF0)).

At the same time, a function DF0 is created. Its definition is shown in FIG. 14. Its definition consists of the operations shown in the tree with root 1920. In LISP, the function might be written as (DEFUN DF0( )

(*B C))

In implementing this operation on a computer, the sub-tree calling for the multiplication of B and C is first defined and may then be compiled during the execution of the overall run. The LISP programming language facilitates the compilation of functions during the execution of an overall run; however, the same functionality is available in other programming languages.

The effect of this replacement is that the selected sub-tree is no longer subject to the potentially disruptive effects of crossover because it is now an individual single point. The newly defined building block is now indivisible. The new encapsulation is a potential "building block" for future generations and may proliferate in the population based on fitness. Once defined, the body of the newly created building block (i.e., (*B C) in the example above) is never changed.

Also, once defined, the definition of a newly created building block is kept separate (in what may be called a "library") from the individuals in the population.

The editing operation provides a means to edit S-expressions as the process is running. The editing operation may be applied after the new population is created through the action of the other operations. It may be controlled by a pair of frequency parameters which specify whether it is applied on every generation or merely a certain subset of the generations and also to a fraction of the population. The editing operation is an asexual operation in that it operates on only one parental S-expression. The result of this operation is one offspring S-expression. The editing operation, if it is used at all, is typically applied to every individual S-expression in the population.

The editing operation recursively applies a pre-established set of editing rules to each S-expression in the population. First, in all problem domains, if any sub-expression has only constant terminals and side-effect free functions, the editing operation can evaluate that sub-expression and replace it with the value obtained. In addition, the editing operation applies particular sets of rules that apply to various problem domains, including rules for numeric domains, rules for Boolean domains, etc. In numeric problem domains, for example, the set of editing rules would typically include a rule that inserts zero whenever a sub-expression is subtracted from an identical sub-expression and a rule that inserts a zero whenever a sub-expression is multiplied by zero. Moreover, in a numeric problem domain, an editing rule may be included whereby the expression (*X 1) would be replaced with X. In Boolean problem domains, the set of editing rules typically would include a rule that inserts X in place of (AND X X), (OR X X), or (NOT (NOT X)).

Editing primarily serves to simplify programs. It can also improve performance by reducing the vulnerability of an program to disruption due to crossover at points within a potentially collapsible, non-parsimonious, but useful sub-expression. For example, if an example program contains a sub-expression such as (NOT (NOT X)), which is susceptible to editing down to a more parsimonious sub-expression (i.e. X), a crossover in the middle of this sub-expression would produce exactly the opposite Boolean result. The editing operation prevents that kind of crossover from occurring by condensing the sub-expression.

Note that, for each operation described above, the original parent program is unchanged by the operation. The original unaltered parental program may participate in additional genetic operations during the current generation, including replication (fitness proportionate reproduction), crossover (recombination), mutation, permutation, editing, or the define building block (encapsulation) operation.

Finally, the results of the chosen operation are added to the population. When new individual programmatic or other types of entities are created by any operation, they are added to the existing population of individuals. The process of executing the new computational procedures to produce a result and then assigning a value to the results can be immediately performed. Thus, if the next step terminates the iterative process, the newly created computational procedures will have a fitness value.

Note that in the above discussion the genetic process is described in terms of an iteration of steps controlled by the external controller of the process. These steps are driven by the fitness measure as determined by the external process. This does not have to be the case. Fitness can be "implicit" in the sense that it is not measured by some explicit external process, but rather is simply a function of the ability of the entity in question to survive. Entities that are more likely to survive have more chance to breed and hence their genes have a higher probability of propagating through time. This form of fitness measure is what occurs in nature. Such an implicit fitness mechanism can also be accomplished within the present invention by allowing the entities to be self activating, i.e., active.

Parallel Processing

The process of the present invention can benefit greatly from parallel operation. By using parallel processing, the overall rate of activity rises in almost direct proportion to the number of activities performed simultaneously. This is beneficial since it can reduce the overall run time of the genetic programming system and thereby make the solution of hard problems tractable.

The present invention can benefit from parallel operation in several ways that apply equally to conventional genetic algorithms involving fixed length character strings and non-linear genetic processes involving hierarchical structures that can vary in size and shape.

First, for example, each of the genetic operations (crossover, reproduction, etc.) can be simultaneously performed in parallel on different entities in the population. If the entities are computer programs, parallel processing is accomplished by a computing machine having multiple operating units (control and arithmetic) capable of simultaneously working on entities from the population. In this case, the overall rate of activity rises in almost direct proportion to the number of activities (i.e. genetic operations) performed simultaneously in parallel.

Secondly, the determination of the fitness of a given individual in the population is often, by far, the most resource intensive part of the operation of the process. If the entities are computer programs, the calculation of fitness often consumes the most computer time. When this is the case, the determination of fitness for each individual can be performed simultaneously in parallel for every entity in the population. In this instance, the overall rate of activity rises in almost direct proportion to the number of activities (i.e. time-consuming fitness calculations) performed simultaneously in parallel.

Thirdly, the entire process can be performed simultaneously in parallel. Since the process has random steps, it is possible that different solutions can emerge from different runs. These different solutions can be compared and the best one adopted as the solution to the problem. In this case, the overall rate of activity rises in almost direct proportion to the number of activities (i.e. entire runs) performed simultaneously in parallel.

In addition, pipeline parallelism can be used. That is, each of the major steps of the process can be performed by different processors. A given individual can be passed down the pipeline so that each step of the process is performed by a different processor for that particular individual.

FIG. 8 is a block diagram depicting parallel processing of the present invention using two sub-populations each having two operating units. Sub-population $P_1$ 1410 is coupled to operating units $U_{11}$ 1411 and $U_{12}$ 1422. Sub-population $P_2$ 1420 is coupled to operating units $U_{21}$ 1421 and $U_{22}$ 1422. Communications channel 1480 couples all four operating units. FIG. 8 illustrates two sub-populations each with two operating units; however, in general, there can be an arbitrary number of sub-populations and arbitrary number of operating units involved.

Two types of parallel activity can occur. In the first type, each of the operations (crossover, reproduction, permutation, etc.) are performed simultaneously in parallel on different entities (or different groups of entities for crossover) selected from a given population of individuals. If the entities are computer programs, parallel processing is accomplished by a computing machine having multiple operating units (control and arithmetic) capable of simultaneously working on entities selected from the computer's memory.

To show this first type of parallel processing, consider operating units $U_{11}$ 1411 and $U_{12}$ 1412 which are coupled to sub-population $P_1$ 1410. Each operating unit can access the sub-population to select entities for the operations based on their relative fitness, followed by performing the operation, adding new programs, and the rest of the iterative process simultaneously.

The second type of parallel processing involves simultaneously occurring activity in two or more different sub-populations. To show this type of parallel processing, consider sub-population $P_1$ 1410 and sub-population $P_2$ 1420. While $P_1$'s two operating units operate on $P_1$, $P_2$'s two operating units operate on P2. Both types of parallelism are highly efficient because very little information need be communicated along the communication channel 1430. In addition, each operating unit need perform only a few very simple activities in response to the information received from the communications channel 1430.

Communication and coordination is performed by communications channel 1930, which couples all the operating units associated with the various sub-populations. In a computer, the communication channel may be a communication bus.

To illustrate the efficiency of parallel processing, let us suppose that selection is performed using probabilities proportionate to fitness. The computation of this probability for a particular individual typically requires two pieces of information—namely, the value (fitness) assigned to the result of executing the particular individual and the total of all such values for all individuals in the entire population. Typically this calculation is performed by dividing the individual's assigned value (fitness) by the total for the entire population. Once the total has been computed for the initial entire population, the total is easily modified by incrementing it for each newly created individual and by debiting it for each individual that is removed.

This simple computation can be performed by each operating unit whenever it receives information via the communications channel 1430 about any insertion or removal of an individual in the population. Similarly, each operating unit must transmit information along the communications channel 1430 to all other operating units whenever it inserts or removes any individual from the sub-population which it accesses. The message consists of the increment (in the case of an insertion) or the decrement (in the case of a removal) in the total value (fitness) of the population. Note that these messages are relatively short and require very little effort to send and act on in comparison to the considerably larger effort needed to perform the iterative process. Because processing messages is relatively minor in comparison to performing the genetic algorithm, the overall rate of activity in this parallel configuration rises almost in direct proportion to the number of activities being performed in parallel. In the case of computer programs, the benefits of parallel activity (using parallel operating units accessing parallel sub-populations) is manifested in terms of a rate of overall computer processing activity, rising almost in direct proportion to the number of parallel activities. That is, the amount of computation performed per unit of time rises almost in direct proportion to the number of parallel activities.

From time to time, the communications channel is also used to exchange large groups of individuals between the sub-populations so that each sub-population receives new genetic material that have achieved relatively high values of fitness from other sub-populations. These occasional transmissions of information add to the administrative overhead of a parallel system; however, because they occur only occasionally (i.e. after many generations of activity confined to the sub-populations), they have only a minor effect on the overall efficiency of the parallel configuration.

Parallelism at the run level is comparatively easy to implement. Each processor is assigned one or more full runs for the maximum number of generations G to be run. The overall result is the best result of all the runs from all the independent processors. If the choice of the maximum number of generations to be run on each independent run is done reasonably well, only one or two processors will solve the problem within the allowed number of generations G. The overall result is then simply the result produced by the one successful processor or the better of the two results from the two successful processors. If the process of determining the overall result were automated, it would involve an extremely small amount of bandwidth for communication between the processors (i.e., one message from each processor containing the result of each independent run). In fact, determination of the overall result may be done manually on the back of an envelope. Before expending massive efforts on parallelization of genetic methods at levels lower than the run level, the user is well advised to recall the advisability of making multiple independent runs (rather than one long run) and to consider the possibility that the best use of the capabilities of a coarse- or medium-grained parallel computer is to simply make multiple independent runs on the various processors.

Computer Programs and the Evolutionary Process

Many seemingly different problems in artificial intelligence, symbolic processing, and machine learning can be viewed as requiring discovery of a computer program that produces some desired output for particular inputs. When viewed in this way, the process of solving these seemingly different problems becomes equivalent to searching a space of possible computer programs for a most fit individual computer program. This most fit individual computer program can be found by applying the techniques of the present invention described herein, in which a population of hierarchical entities of various sizes and shapes, such as computer programs, is genetically bred.

This invention is useful for solving problems which present themselves under at least seven different names, namely, the problems of symbolic function identification, symbolic regression, empirical discovery, modeling, induction, and forecasting.

Depending on the terminology of the particular field of interest, the "computer program" may be called a robotic action plan, a strategy, a decision tree, an econometric model, state transition equations, a transfer function, a mathematical expression, or perhaps merely a composition of functions. Similarly, the "inputs" to the "computer program" may be called sensor values, state variables, independent variables, attributes of an object, or perhaps merely, the arguments to a function. However, regardless of different terminology used, the underlying common problem is discovery of a computer program that produces some desired output value when presented with particular inputs.

Symbolic function identification requires finding a function in symbolic form that fits given data points. In other words, symbolic function identification requires finding a function that produces the values of the dependent variable (s) for given values of the independent variable(s). This problem is also called symbolic regression, empirical discovery, induction, modeling, or forecasting. The function that describes the system can then be used to construct a model of the process. The model of the process can then be used in forecasting future values of the variables of the system. In particular, forecasting is done by setting the independent variables to values outside the domain of values of the original given data points. Typically, time is the independent variable in forecasting problems.

Regardless of the name, these problems require finding a function in symbolic form that fits the given values of the dependent variable(s) associated with the particular given values of the independent variable(s).

While conventional linear, quadratic, or higher order polynomial regression requires merely finding the numeric coefficients for a function of a pre-specified functional form, symbolic regression involves finding both the appropriate functional form and the appropriate numeric coefficients.

The non-linear genetic algorithm is described herein, referred to also as Genetic Programming, by specifying (1) the nature of the structures that undergo adaptation in this process, (2) the search space of the structures, (3) the initial structures, (4) the environment, (5) the fitness function which evaluates the structures in their interaction with the environment, (6) the operations that are performed to modify the structures, (7) the procedure for using the information available at each step of the process to select the operations and structures to be modified, (8) the state (memory) of the algorithmic system at each point in time, and (9) the method for terminating the process and identifying its output.

The structures that undergo adaptation in the process are hierarchically structured computer programs whose size and shape can dynamically change during the process. This is in contrast to the one-dimensional linear strings (whether of fixed or variable length) of characters (or other objects) used in conventional genetic algorithms.

Various programming languages (e.g. FORTH) might be suitable for accomplishing the work described in this invention. However, the LISP programming language (first developed by John McCarthy in the 1950's) is especially well-suited for handling hierarchies, recursion, logical functions, compositions of functions, self-modifying computer programs, self-executing computer programs, iterations, and complex structures whose size and shape is dynamically determined (rather than predetermined in advance). The LISP programming language is especially appropriate when the structures to be manipulated are hierarchical structures. Moreover, both programs and data have the same form in LISP.

The set of possible programs for a particular domain of interest depends on the functions and terminals that are available in the domain. The possible programs are those that can be composed recursively from the available set of n functions $F=\{f_1, f_2, \ldots, f_n\}$ and the available set of m terminals $T=\{t_1, t_2, \ldots, t_m\}$. Each particular function f in F takes a specified number $z(f)$ of arguments $b_1, b_2, \ldots, b_z(f)$.

Note that Polish (prefix) form is used to represent the application of a function to its arguments in the LISP programming language. Thus, for example, (+1 2) evaluates to 3. In Common LISP, any argument can itself be an S-expression so that, for example, (+1(*2 3)) evaluates to 7. The S-expression (+1 2(IF (>TIME 10)3 4)) demonstrates the function > being applied to the variable terminal TIME and the constant terminal 10. The subexpression (>TIME 10) then evaluates to either T (True) or NIL, and this value becomes the first argument of the "function" IF. The function IF returns either its second argument (the constant terminal 3) or the third argument (the constant terminal 4) according to whether the first argument is T or NIL, respectively. The entire S-expression thus evaluates to either 6 or 7.

The search space for non-linear genetic algorithms is the space of valid programs that can be recursively created by compositions of the available functions and available terminals for the problem. This search space can, equivalently, be viewed as the hyperspace of rooted point-labeled trees in the plane having internal points labeled with the available functions and external points (leaves) labeled with the available terminals.

The process of generating the initial random population begins by selecting one of the functions from the set F at random to be the root of the tree. Whenever a point is labeled with a function (that takes k arguments), then k lines are created to radiate out from the point. Then for each line so created, an element is selected at random from the entire combined set C, where C is the set of functions and terminals for the problem, to be the label for the endpoint of that line. If a terminal is chosen to be the label for any point, the process is then complete for that portion of the tree. If a function is chosen to be the label for any such point, the process continues. The probability distribution over the terminals and functions in the combined set C and the number of arguments required for each function determines an average size for the trees generated by this process. In this invention, this distribution is typically a uniform random probability distribution over the entire set C (with the exception of the root of the tree where the selection is limited to just the functions in F); however, it is possible to bias the initial population for a particular problem with a non-uniform distribution or with entire seeded individuals that might be useful in solving the particular problem at hand.

Each individual in a population is assigned a fitness value as a result of its interaction with the environment. Fitness is the driving force of Darwinian natural selection and genetic algorithms.

The environment is a set of cases which provide a basis for evaluating particular programs.

For many problems, the "raw fitness" of any program is the sum of the distances (taken over all the environmental cases) between the corresponding point in the solution space (whether real-valued, complex-valued, vector-valued, symbolic-valued, Boolean-valued, or integer-valued) for each of the values returned by the program for a given set of arguments and the correct points in the solution space.

If the solution space is integer-valued or real-valued, the sum of distances is the sum of absolute values of the differences between the numbers involved. In particular, the raw fitness r(h,t) of an individual program h in the population of size M at any generational time step t is:

$$r(h,t) = \sum_{j=1}^{N_e} |V(h,j) - S(j)|$$

where V(h,j) is the value returned by the program h for environmental case j (of $N_e$ environmental cases) and where S(j) is the correct value for environmental case j.

If the solution space is Boolean-valued, the sum of distances is the number of mismatches. If the solution space is symbolic-valued, the sum of distances is, similarly, the number of mismatches. If the solution space is complex-valued, vector-valued, or multiple-valued, the sum of the distances is the sum over the various components. Either the sum of the absolute values of the distances or the Euclidean distance (square root of the sum of the squares of the distances) can be used. The closer this sum of distances is to zero, the better the program.

The raw fitness value can be converted so that a lower numerical value is always a better value. This converted raw fitness value is referred to as the standardized fitness. For a particular problem wherein a lesser value of raw fitness is better, the standardized fitness equals the raw fitness for that problem. In the currently preferred embodiment, it is convenient to make the best value of standardized fitness equal to 0. If this is not the case, the standardized fitness can be made so by subtracting or adding a constant.

Each raw fitness value may then be adjusted (scaled) to produce an adjusted fitness measure a(h,t). The "adjusted fitness" value is $$a(h,t) = 1/(1+r(h,t)),$$

where r(h,t) is the raw fitness for individual h at time t. Unlike raw fitness, the adjusted fitness is larger for better individuals in the population. Moreover, the adjusted fitness lies between 0 and 1.

Each such adjusted fitness value a(h,t) is then normalized. The "normalized fitness" value n(h,t) is $$n(h,t) = a(h,t) / \sum_{j=1}^{M} a(j,t)$$

where M is the population. The normalized fitness not only ranges between 0 and 1 and is larger for better individuals in the population, but the sum of the normalized fitness values is 1. Thus, normalized fitness can be viewed as a probability value.

The raw fitness, standardized fitness, adjusted fitness and normalized fitness can be computed in several alternative ways. In the currently preferred embodiment, the normalized fitness should ideally, however, (i) range between 0 and 1, (ii) be larger for better individuals in the population, and (iii) the sum of the normalized fitness values should be 1.

If the solution space is integer-valued or real-valued, the sum of squares of distances can, alternatively, be used to measure fitness (thereby increasing the influence of more distant points). It is also possible for the fitness function to consider factors in addition to correctness (e.g. efficiency of the program, parsimony of the program, compliance with the initial conditions of a differential equation, successfully reaching a sub-goal, etc.) It is also possible to compute the fitness function using a sampling of the possible environmental cases (including possibly a sampling that varies from generation to generation to minimize the possible bias resulting from such sampling within any one generation).

The two primary operations for modifying the structures undergoing adaptation are Darwinian reproduction and crossover (recombination). In addition to the two primary genetic operations of fitness proportionate reproduction and crossover, there are other secondary operations for modifying the structures undergoing adaptation. They are mutation, permutation, editing, and the define building block (encapsulation) operation. Furthermore, there are the architecture-altering operations of branch duplication, argument duplication, branch deletion, argument deletion, branch creation, and argument creation.

The operation of fitness proportionate reproduction for genetic programming is the basic engine of Darwinian reproduction and survival of the fittest. It is an asexual operation in that it operates on only one parental entity. The result of this operation is one offspring. In this operation, if si (t) is an individual in the population at generation t with fitness value f $(s_i(t))$, it will be copied into the next generation with probability:

$$f(s_i(t)) / \sum_{j=1}^{M} f(s_j(t))$$

The crossover (recombination) operation for non-linear genetic algorithms (i.e., genetic programming) is a sexual operation that starts with two parental entities. At least one of the parents is typically chosen from the population with a probability based on its respective normalized fitness. The result of the two-offspring crossover operation is two offspring programs, while the result of the one-offspring crossover operation is only one offspring program (as discussed later). The following discussion describes the two-offspring crossover operation.

Every LISP S-expression (program, entity) can be depicted graphically as a rooted point-labeled tree in a plane whose internal points are labeled with functions, whose external points (leaves) are labeled with terminals, and whose root is labeled with the function appearing just inside the outermost left parenthesis. The operation begins by randomly and independently selecting one point in each parent using a specified probability distribution (discussed below). Note that the number of points in the two parents typically are not equal. As will be seen, the crossover operation is well-defined for any two S-expressions. That is, for any two S-expressions and any two crossover points, the resulting offspring are always valid LISP S-expressions. Offspring contain some traits from each parent.

In two-offspring crossover, the "crossover fragment" is produced by deleting the crossover fragment of the first parent from the first parent, and then impregnating the crossover fragment of the second parent at the crossover point of the first parent. In producing this first offspring the first parent acts as the base parent (the female parent) and the second parent acts as the impregnating parent (the male parent). The second offspring is produced in a symmetric manner.

Note also that because entire sub-trees are swapped, this genetic crossover (recombination) operation produces valid LISP S-expressions (programs) as offspring, regardless of which point is selected in either parent.

Note that as the root of one tree happens to be selected as the crossover point, the crossover operation will insert that entire parent into the second tree at the crossover point of the second parent. In addition, the sub-tree from the second parent will, in this case, then become the second offspring. If the roots of both parents happen to be chosen as the crossover points, the crossover operation simply degenerates to an instance of fitness proportionate reproduction.

Note that as an individual mates with itself, the two resulting offspring will generally be different (if the crossover points selected are different).

Note that if a terminal is located at the crossover point selected in both parents, the crossover operation merely swaps these terminals from tree to tree. Similarly, if a terminal is located at the crossover point in precisely one parent, then the sub-tree from the second parent is inserted at the location of the terminal in the first parent, and the terminal from the first parent is inserted at the location of the sub-tree of the second parent. In this case, the crossover operation often has the effect of increasing the depth of one tree and decreasing the depth of the second tree. A non-uniform probability distribution allocating about 90% of the crossover points equally amongst the internal (function) points of each tree and 10% of the crossover points equally amongst the external (terminal) points of each tree is advantageous.

This non-uniform probability distribution promotes the recombining of larger structures than would be the case with a uniform distribution (which may do an inordinate amount of mere swapping of terminals from tree to tree in a manner more akin to point mutation than true crossover).

The basic principle of crossover is that part of one parent, and part of another parent, are recombined to produce the offspring. Thus, other variations on the basic crossover operation may be advantageous.

The mutation operation provides a means for introducing small random mutations into the population. The mutation operation is an asexual operation in that it operates on only one parental program. The individual is selected in a manner proportional to normalized fitness. The result of this operation is one offspring entity. The mutation operation selects a point of the entity at random. The point of insertion can be an internal (function) or external (terminal) point of the tree. This operation removes whatever is currently at the selected point and inserts a randomly generated sub-tree at the randomly selected point of a given tree. When an entity having automatically defined functions is subject to the mutation operation, the tree grown at the selected point is limited with respect to the allowable functions and terminals which can appear. This limit is similar to the limit the crossover operation is subject to with entities having automatically defined functions in that the only allowable functions and terminals are those which have meaning at the mutation point in the entity. This operation is controlled by a parameter which specifies the maximum depth for the newly created and inserted sub-tree. A special case of this operation involves inserting only a single terminal (i.e. a sub-tree of depth 0) at a randomly selected point of the tree. The mutation operation potentially can be beneficial in reintroducing diversity in a population that may be tending to prematurely converge.

The define building block operation, known commonly as encapsulation, is a means for identifying potentially useful "building blocks" while the algorithm is running. The define building block operation is an asexual operation in that it operates on only one parental program. The individual is selected in a manner proportional to normalized fitness. The operation selects a function (internal) point of the program at random. The result of this operation is one offspring program and one new definition. The define building block operation works by defining a new function of no arguments and by replacing the sub-tree located at the chosen point with a call to the newly encapsulated building block. The body of the newly defined function is the sub-tree located at the chosen point. The newly encapsulated building blocks are named DF0, DF1, DF2, DF3, . . . .

For the first occasion when a new function is defined on a given run, "(DF0)" is inserted at the point selected in the program. The newly defined function is then compiled. Thereafter, it is never changed during the run. The function set of the problem is then augmented to include the new function so that, if mutation is being used, the arbitrary new sub-tree grown at the selected point might include a call to the newly defined function.

Note that, for each operation described above, the original parent program is unchanged by the operation. Moreover, since the selection of the parental program is in proportion to fitness, the original unaltered parental program may participate in additional genetic operations during the current generation, including fitness proportionate reproduction, crossover (recombination), mutation, permutation, editing, or the define building block (encapsulation) operation.

The state of the non-linear genetic algorithm system at any stage in the process (as with genetic algorithms in general) consists only of the current population of individuals in the population. There is no additional memory, centralized bookkeeping, or administration to guide the adaptive process.

The algorithm is controlled by various parameters, including three major parameters, namely the population size, the number of individuals in the population undergoing fitness proportionate reproduction, and the number of individuals in the population undergoing crossover.

In general, population size is the parameter that must be adjusted to accommodate the complexity of the problem at hand. A larger population is, in the absence of any other consideration, better at producing a solution to the problem at hand than a smaller population. However, as the population size is increased, there may be decreasing benefits in relation to the increased amount of resources needed. In one embodiment, two-offspring crossover is performed on 90% of the population. That is, if the population size is 300, then 135 pairs of individuals (270 individuals) from each generation are selected (with reselection allowed) from the population with a probability equal to their normalized adjusted fitness. Fitness proportionate reproduction is typically performed on 10% of the population on each generation. That is, 30 individuals from each generation are selected (with reselection allowed) from the population of 300 with a probability equal to their normalized adjusted fitness. Note that the parents remain in the population and can often repeatedly participate in other operations during the current generation. That is, the selection of parents is done with replacement (i.e. reselection) allowed. Mutation and permutation are used very sparingly. Their use at a rate of 1 per generation would be acceptable for many problems.

Several minor parameters are used to control the computer implementation of the algorithm. In all of the examples described herein, a maximum depth of 17 was established for entities produced by crossover. This limit prevented large amounts of computer time being expended on a few extremely large (and usually highly unfit) individual entities. Of course, if we could execute all the individual entities in parallel (as nature does) in a manner such that the infeasibility of one individual in the population does not proportionately jeopardize the resources needed by the population as a whole, we would not need this kind of limit. Thus, if a crossover between two parents would create an individual whose depth exceeded this limit, the crossover operation is simply aborted. In effect, the contemplated crossover operation is replaced with fitness proportionate reproduction for the two parents. Similarly, a maximum depth of 6 was established for the random individuals generated for generation 0. Note that these limits are not necessary. They are merely a convenient and effective way to limit the use of resources (which is especially important with serial machinery).

The solution produced by this process at any given time can be viewed as the entire population of disjunctive alternatives (presumably with improved overall average fitness), or more commonly, as the single best individual in the population during the run. The process can be terminated when either a specified total number of generations have been run or when some performance criterion is satisfied. For example, if a solution can be recognized if it is discovered, the algorithm can be terminated at that time and the single best individual can be considered as the output of the algorithm.

We now summarize below the major steps necessary for using genetic programming.

The first major step is to identify the appropriate set of variable and constant terminals for the problem. For some problems, this identification may be simple and straightforward. For example, in the symbolic regression problem with one independent variable, the single necessary variable terminal in the problem corresponds to the single independent variable of the problem. The difficulty in identifying an appropriate set of actual variables of the problem for a particular problem, if any, usually arises from the inherent difficulty (common to all science) of correctly identifying variables which have explanatory power for the problem at hand. For example, one would not be able to discover Kepler's Third Law if one were given only the color of the surface of the planets.

Constant terminals, if required at all, can enter a problem in two ways: One way is to use the constant creation procedure described herein. The second way for constant terminals to enter a problem is by explicitly including them.

For example, one might include $\pi$ in a particular problem where there is a possibility that this particular constant would be useful. Of course, if one failed to include $\pi$ in such a problem, genetic programming would probably succeed in creating it (albeit at a certain cost in computational resources).

The second major step is to identify the appropriate set of functions for the problem. For real-valued domains, the obvious function set might be $\{+, -, *, \%\}$ (where % is the protected division function that returns 0 when division by zero is attempted). In a Boolean function learning domain, for example, a set of functions such as $\{AND, OR, NOT, IF\}$ might be the choice. This set is certainly sufficient for any Boolean function learning problem since it is computationally complete. Moreover, this set is convenient in that it tends to produce easily understood logical expressions. Of course, the function set might consist of NAND alone, and in some domains (e.g. design of semiconductor logic networks), this might be a natural choice.

If the problem involves economics (where growth rates and averages often play a role), the function set might also include the exponential, logarithmic, and moving average functions in addition to the four basic arithmetic operations. Similarly, the SIN and COS functions might be useful additions to the function set for some problems.

Some functions may be added to the function set merely because they might possibly facilitate a solution (even though the same result could be obtained without them). For example, one might include a squaring function in certain problems even though the same result could be attained without this function (albeit at a certain cost in computational resources).

Sometimes, the consequence of failing to include a potentially useful function is that one gets a rough approximation to the missing function. For example, if the SIN, COS or EXP function were missing from a function set, one might get the first one or two terms of the Taylor power series expansion of those functions in a solution in lieu of the missing function.

In any case, the set of functions must be chosen and/or defined so that the value of any composition of the available functions or terminals that might be encountered as arguments to a function is valid. Thus, if division is to be used, the division function should be modified so that division by zero is well-defined. The result of a division by zero could be defined to be zero, a very large constant, or a new value; such as ":infinity". Note that, in Common LISP, one could define the result of a division by zero as the keyword value ":infinity". Then each of the other functions in the function set must be well-defined if this ":infinity" value happens to be the value of one of its arguments. Similarly, if square root is one of the available functions, it could either by an especially defined real-valued version that takes the square root of the absolute value of the argument or it could be LISP's complex-valued square root function. If logical functions are to be mixed with numerical functions, then a real-valued logic should be used. For example, the greater-than function GT can be defined so as to assume the real value 1.0 if the comparison relation was satisfied and the real value 0.0 otherwise.

Note that the number of arguments must be specified for each function. In some cases, this specification is obvious or even mandatory (e.g. the Boolean NOT function, the square root function). However, in some cases (e.g. IF, multiplication), there is some latitude as to the number of arguments. One might, for example, include a particular function in the function set with differing numbers of arguments. The IF function with two arguments, for example, is the IF-THEN function, whereas the IF function with three arguments is the IF-THEN-ELSE function. The multiplication function with three arguments might facilitate the emergence of certain cross product terms, although the same result could be achieved with repeated multiplication function with two arguments. It maybe useful to include the PROGN ("program") function of Common LISP with varying number of arguments in a function set to act as a connective between the unknown number of steps that may be needed to solve the problem.

The choice of the set of available functions, of course, directly affects the character of the solutions that can be attained. The set of available functions forms a basis for generating potential solutions. For example, if one were trying to do symbolic regression on the simple absolute value function on the interval [−1, +1] and the function set contained the IF-THEN-ELSE function and a (unary) subtraction function, one might obtain a solution in the familiar form of a conditional test on x that returns either x or −x. On the other hand, if the function set contained COS, COS3 (i.e. cosine of 3 times the argument), COS5 (i.e. cosine of 5 times the argument) instead of the IF-THEN-ELSE function, one might obtain a solution in the form of a Fourier series approximation to the absolute value function. Similarly, if the Σ summation operator were not available in a real-valued problem for which the solution was an exponential, one would probably see the first couple of polynomial terms of the Taylor series in the solution instead of $e^x$.

The third major step is construction of the fitness function, i.e. the function that, given an entity in the population, activates the entity and returns its value (fitness). For most problems, the fitness function is constructed in a simple, natural, and straightforward way as the sum of the distances (taken over all the environmental cases) between the point in the solution space returned by the program for a given set of actual variables of the problem and the correct point in the solution space. In general, the only issue is the minor issue of whether to use the absolute value of the difference or the square of the difference in computing the distance. However, the fitness function can sometimes be somewhat more complicated.

The fourth major step is the selection of the major and minor parameters of the algorithm and a decision on whether to use any of the secondary genetic operations. Often, the selection of the population size is the most important choice. In general, the larger the population the better. But, the improvement due to a larger population may not be proportional to the increased computational resources required.

Finally, the fifth major step is the selection of a termination criterion and solution identification procedure. The approach to termination depends on the problem. In many cases, the termination criterion may be implicitly selected by merely selecting a fixed number of generations for running the algorithm. For many problems, one can recognize a solution to the problem when one sees it. Examples are problems where the sum of differences becomes zero (or, acceptably close to zero, if the problem is in a real-valued domain). However, for some problems (such as problems where no exact mathematical solution is known), one cannot necessarily recognize a solution when one sees it (although one can recognize that the current result is better than any previous result or that the current solution is in the neighborhood of some estimate to the solution). The solution identification procedure is often simply a matter of identifying the best single individual of some generation where the termination criterion is satisfied as the solution to the problem.

Note that the architecture does not have to be selected since it is being evolved simultaneously with the solution. Note also the process described herein may be used to obtain useful approximations, in functional form, of the solution to difficult or intractable problems. The result may only be a good fit or good approximation to the solution of the problem.

There are numerous opportunities to use domain specific heuristic knowledge in connection with genetic programming. First, it may be useful to include domain specific heuristic knowledge in creating the initial random population. This might include inserting sub-programs believed to be useful for solving the problem at hand. This might also include using a probability distribution other than the uniform distribution to initially select the functions and terminals when the initial random individuals are recursively generated. Secondly, domain specific heuristic knowledge may be helpful in over-selecting or under-selecting of certain points in the computer programs for the crossover operation. This may even include protecting certain points from selection for crossover under certain circumstances or requiring certain points to be selected for crossover under certain circumstances. Thirdly, domain specific heuristic knowledge may be useful in varying the parameters of the run based on information gained during the run. Fourth, domain specific heuristic knowledge can be used in the selection of the set of available functions and terminals for the problem so that this set is not merely minimally sufficient to solve the problem, but so that the set of available functions and terminals actively facilitates solution of the problem.

Because the process described herein involves executing and modifying computer programs in non-standard ways and because these computer programs were either originally generated at random or created genetically, a number of practical computer implementation issues come to the forefront.

First, it should be noted that if the experimenter chooses to use the Common LISP function EVAL to activate individual LISP S-expressions while measuring their fitness, the evaluation will work correctly only if all of the actual variables of the problem appearing in the given S-expressions are proclaimed to be special (global) variables.

Secondly, an efficient implementation of the crossover operation in LISP uses the COPY-TREE and RPLACA functions in LISP. First, the COPY-TREE function is used to make a copy of each parent. Then, the RPLACA function is used to destructively change the pointer of the CONS cell of the copy of one parent at its crossover point so that it points to the crossover fragment (sub-tree) of the copy of the other parent. Then, the RPLACA function is used to destructively change the pointer of the CONS cell of the copy of second parent at its crossover point so that it points to the crossover fragment (sub-tree) of the copy of the first parent. After destructively changing the pointers in the copies, the resulting altered copies become the offspring. The original parents remain in the population and can often repeatedly participate in other operations during the current generation. That is, the selection of parents is done with replacement (i.e., reselection) allowed.

Third, because the process described herein involves executing randomly generated computer programs, the individuals in the initial random population as well as the individuals produced in later generations of the process often have sub-expressions which evaluate to astronomically large numbers or very small numbers. When the range is integral, the BIGNUM mode is automatically used in the Common LISP programming language. In this mode, integer numbers can grow arbitrarily large (limited only by the virtual address space of the machine). Thus, the potential growth in size of the integers produced by the randomly generated S-expressions presents no problem, as a practical matter. On the other hand, when the range is real-valued, floating point overflows or underflows will frequently occur. In problems involving such floating point variables, it is therefore a practical necessity to wrap the entire algorithm in error handlers that accommodate every possible kind of floating point underflow and overflow applicable to the particular computer involved or alternatively to define each of the functions in the function set to obviate such concerns.

Fourth, it is important to note that this non-linear genetic algorithm is probabilistic in the following four different ways: (a) the initial population is typically generated entirely at random from the available functions and terminals; (b) both parental individuals participating in the crossover operation are chosen at random (typically, at least one individual is chosen randomly proportionate to fitness and the other is chosen either randomly proportionate to fitness or simply at random using a uniform probability distribution); (c) the crossover points within each parent are selected at random (using a uniform probability distribution); and (d) the individuals undergoing the operation of fitness proportionate reproduction are chosen randomly in proportion to normalized fitness. Thus, in implementing genetic algorithms on a computer, it is important to have an effective randomizer that is capable of producing the numerous random integers and probability values needed by the algorithm. Many randomizers originally written for the purpose of generating random floating point numbers are not suitable for this purpose. A randomizer with 3 independent seeds was used here. It is also convenient, for experimental purposes, to have the option of seeding the randomizer so that interesting runs can potentially be replicated (e.g. perhaps with additional details displayed, such as an audit trail).

Fifth, for all but the simplest problems, the overwhelming majority of computer time is consumed by the evaluation of fitness of the individuals (rather than, as one might suppose, the actual genetic operations or other administrative aspects of the program). For some problems, fine-grained parallel computers, and "data parallelism" techniques may be advantageous. When the fitness calculation consumes the overwhelming majority of computer time, then fine-grained parallel computers (as compared to coarse-grained parallel computers) and the techniques of "data parallelism" confer no particular advantage. The problem may simply be parallelized by handling the environmental cases in parallel. Similarly, if this concentration exists, ones efforts at optimization must necessarily be focused almost entirely on the relatively small number of lines of code that are used to compute fitness (over the various environmental cases of the particular problem). One highly effective way to optimize the fitness calculation is to create a look-up table of S-expressions that have been previously encountered so that their fitness need not be recomputed. This hash table can span both generations and runs (provided the environmental cases remain the same). Note that the technique of look-up tables may be, however, inconsistent with the technique of changing the environmental cases on every generation so as to minimize the possible bias of a small sampling of environment cases. The technique works best on problems for which, for whatever reason, genetic diversity is low.

Sixth, many problems involve time-consuming transcendental functions (e.g. EXP, SIN, COS) that are computed via Taylor power series. In such problems, both the initial randomly-generated individuals and the later genetically-created individuals in the population often contain multiple occurrences of these functions within a single individual. A considerable amount of computer time can be saved by evaluating these functions via table look-up, rather than direct computation.

Seventh, an informative and interactive interface is an invaluable tool in carrying out computer experiments in the field of machine learning.

Accordingly, the computer program used herein has extensive interactivity, including three full-color graphs, a "hits histogram", a "fitness histogram" (in deciles of numerical fitness values), a window showing the best single program of the current generation in both graphical and symbolic form, three scrolling windows, and three non-scrolling windows (with various mouse-sensitive points for inspecting progress of the program while it is executing). The three color graphs provide a variety of information about the run in progress.

A first graph dynamically tracks the average normalized fitness of the population. This graph also tracks the number of "hits" for the best single individual of each generation for problems where exact matches are possible (or the number of "near hits" for real-valued numerical problems). This number of "hits" or "near hits" is not used by the genetic algorithm in any way. The algorithm uses only the fitness values computed from the sum of the distances described above. Nonetheless, the number of "hits" or "near hits" has proved to be extremely valuable for monitoring the overall progress of the algorithm.

A second graph dynamically tracks the average raw fitness of the population for each generation, the raw fitness of the best individual in the population, and the raw fitness of the worst individual in the population for each generation. This graph also displays the average raw fitness of the initial random population as a baseline.

A third graph is used only in a subset of the problems. This graph dynamically graphs the "target" function and the best individual program from the current generation. The best program changes with each generation. The horizontal axis of this graph is the domain of the problem area and the vertical axis is the range of the target function. In the case of symbolic integration and symbolic differentiation problems, the graph of the integral or derivative of the current best program is added to this third graph as an additional item.

A "hits histogram" showing the number of individuals in the population with a particular number of "hits" (or "near hits", for numerical problems) provides a particularly informative and dramatic view of the learning process. At the initial random generation, the bulk of the population appears at the far left of the histogram (with perhaps 0 or 1 hits). Then, after a few generations, the bulk of the population typically starts shifting gradually from left to right in the histogram. As learning takes place, this undulating "slinky" movement from left to right continues during the run. Finally, in the late stages of a run, individuals representing a perfect solution to the problem may start appearing at the far right of the histogram. Complete convergence occurs when 100% of the population becomes concentrated at the far right of the histogram (although one usually does not run the algorithm to that point). Premature convergence can often be readily identified from the histogram as a concentration of the population at one single-sub-optimal number of hits. In contrast, normal progress towards a solution and towards convergence is typically indicated by a broad "flowing" distribution of individuals over many different numbers of hits in the histogram.

In addition, a "fitness histogram" showing the number of individuals in the population having a fitness lying on a particular numerical range of fitness values provides another informative view of the learning process. This histogram uses the actual fitness values representing the sum of the distances described above and is presented in deciles over the range of such fitness values. Note that this "fitness histogram" is based on the sum of distances, while the "hits histogram" is a count of the integral number of "hits" (or "near hits").

The eighth tool which could be utilized in optimizing genetic programming is visualization. In visualization, graphical representations are created of the behavior of various individuals from the population so that they can be animated at the time of creating, writing, debugging, and solving the problem.

Ninth, a variety of time savings techniques are available which save computer time while performing genetic programming. A vast majority of computer time when performing genetic programming is consumed by the calculation of fitness. Depending on the problem, the calculation of fitness can be lessened in one or more of the following ways.

One time savings technique can be utilized when the reproduction operation is chosen. When the reproduction operation is used, as it is on 10 percent of the population on every generation in one embodiment, there is no need to compute the fitness of a reproduced individual anew for the next generation (provided the user is not varying the fitness cases from generation to generation). Reproduced individuals can be flagged so that their fitness will not be recomputed in the new generation. This simple strategy of caching the already computed fitness values can speed up problem solving by the percentage of time the reproduction operation is used.

A second time savings technique can be employed where, in some problems, the values of all the state variables of the system stabilize under various circumstances. If this occurs in a problem when the functions have no side-effects, then it is not necessary to continue the simulation after the point of stabilization. The fitness may then merely be either the fitness accumulated up to that point or some simple adjustment to it.

A third time savings technique can be utilized when some trajectories through the state space of the problem are unacceptable for some reason exogenous to the mathematical calculation. If this is the case, a test for such unacceptable trajectories should be made so that the simulation of the system can be truncated as early as possible.

A fourth time savings technique can also be used if there are only a small number of possible combinations of values of the state variables of the system. In this case, a look-up table can be created and used in lieu of direct function evaluation. For example, for a two-dimensional cellular automation involving Boolean state transition functions operating in a von Neumann neighborhood at a distance of one unit, there are only $2^5=32$ possible combinations of inputs. Once the table is filled, a look-up can replace the activation of the individual for each cell on each time step. The saving is especially great for complicated individual programs containing a large number of points.

A fifth time savings technique can be implemented in some problems that involve complex intermediate calculations which can be simplified if one carefully considers the granularity of the data actually required to adequately solve the problem. For example, the calculation of sonar distances from a simulated robot to the walls of the room in which it operates involve complex and time-consuming trigonometric calculations. However, the nature of such robotics problems is such that there is often no need for great precision in these sonar distances (sensor values). Consequently, a 100 by 100 grid can be overlaid on the room creating 10,000 small squares in the room. When a robot is in a particular square, the 12 sonar distances can be reported as if the robot were at a midpoint of the square. Thus, a table of size 10,000 by N (where N is the number of sonar services) can be computed, placed in a file, and used forever after for this problem.

Another time savings technique can be employed in many problems where very little precision is required in the values of the four state variables. Typically, a single precision floating-point number in LISP occupies two words of storage because of the tag bits required by LISP. The first word containing a pointer to the second word which actually contains the number. When very little precision is required for the floating-point numbers in a particular problem, the short-float data type can be used. In the short-float data type, the floating-point exponent and mantissa are sufficiently short so that they, along with the tag bits, fit into a single word of storage (i.e., usually 32 bits). This data type is faster and obviates consing. The short float data type is available on many implementations of LISP. Similar short float data types are available in other programming languages.

Yet another time savings technique can be utilized in problems for which the individual programs are especially complicated or for which the individual programs must be evaluated over an especially large number of fitness cases, a considerable amount of computer time may be saved by compiling each individual program. If this is done, the programs should be compiled into a temporary memory area, if possible, so that garbage collection can be programmatically invoked when the compiled versions of the programs are no longer needed. Many LISP systems cons new functions into a static memory area which, because it is not subject to garbage collection, will become clogged with unneeded function objects. Care must be taken to circumvent this behavior.

The eighth time saving tool is for the unusual case where a particular problem has a fitness evaluation which does not consume the vast majority of the computer time, the "roulette wheel" used in fitness proportionate operation when implemented in its most obvious way is an $O(M^2)$ algorithm. When the population is large, it may consume a surprising amount of computer time. This function can be optimized with a simple indexing scheme.

The Automatic Function Definition Mechanism

The present invention includes a process for creating an initial population and then evolving that population to generate a result. In one embodiment of the present invention, the process creates an initial population of entities. Each of the entities may be a computer program. In one embodiment, each entity in the population has at least one internally invocable sub-entity and at least one externally invocable sub-entity, even though the number of sub-entities within each entity may vary from entity to entity. The internally invoked sub-entities are those which are called or executed by another sub-entity in the entity itself. The sub-entity which invokes the internally invocable sub-entities can be either an externally invocable sub-entity or another internally invocable sub-entity. Any number of these internally invoked sub-entities may be contained in any individual entity.

The externally invoked sub-entities are those which are executed or activated by the controller of the process itself. These externally invoked sub-entities are capable of containing actions and invocations of internally invoked sub-entities. They have access to material provided to the externally invoked sub-entity by the controller of the process. In the currently preferred embodiment, each of the externally invoked sub-entities can include a hierarchical arrangement of terminals, primitive functions and invocations of internally invoked sub-entities. The externally invoked sub-entities are also referred to as result-producing components or branches, where the result produced can be in the form of a value, set of values or a side-effect produced either directly or indirectly upon execution of the result-producing component (branch). Any number of these externally invoked sub-entities (i.e., result-producing components or branches) may be contained in any individual entity. In this manner, multiple values can be returned and multiple side effects can be performed. However, in one embodiment, there is only one result-producing branch.

Each internally invoked sub-entity is capable of including actions and invocations of internally invocable sub-entities. Furthermore, each internally invoked sub-entity may have access to the material provided to the externally invocable sub-entity. In one embodiment, the internally invoked sub-entities can comprise hierarchical arrangements of terminals, primitive functions and invocations of internally invoked sub-entities and a set of dummy variables (i.e., formal parameters) which are structured to form a function definition. In one embodiment, the function definitions are referred to as the function defining components or branches of the entity. These automatically defined functions can also reference or call other defined functions.

The population of entities, including both externally invoked and internally invoked sub-entities, is evolved to generate a solution to the problem. During the evolution caused by the present invention, specific operations (such as crossover or reproduction), used to promote evolution, act upon the sub-entities of the population. Also during evolution, each of the entities in the population are executed (e.g., activated) by the controller of the process. During execution, each of the externally invoked sub-entities within each entity is invoked. In doing so, the externally invoked sub-entities can call (execute) internally invoked sub-entities, thereby producing some form of result (e.g., numeric value, side-effect, etc.). Thus, the externally invoked sub-entity (e.g., result-producing component) calls upon the internally invoked sub-entities (as well as the specific material/information provided, i.e., actual variables of the problem), or other functions provided, to ultimately generate a solution to the problem. This evolutionary process using externally invoked (result-producing) sub-entities which can be dependent on the influence, value and/or effect of internally invoked (function defining) sub-entities is referred to as the automatically defined function mechanism of the present invention.

More specifically, the automatic defined function (ADF) mechanism of the present invention allows one or more functions with arguments to be defined dynamically during the evolutionary process. The value(s) returned from a call to an automatically defined function (if any) depend on the current value of the arguments at the time of execution. Defining a function in terms of dummy variables (formal parameters) allows the function to be evaluated with particular instantiations of those dummy variables. Using an automatically defined function with different instantiations, thus, obviates the tedious writing or discovery of numerous sections of essentially similar code. In addition, ADFs improve the understandability of a program and highlight common calculations. Moreover, defining and making multiple uses of a function divides a problem hierarchically. As the problem increases in size and complexity, decomposition of a problem through ADFs becomes increasingly important for solving problems. Thus, using ADFs allows a solution to be generated for a problem which is evolved to contain not only those functions and terminals initially provided, but also the definitions of functions that are dynamically discovered that are found useful during the evolution of a solution.

It should be noted that the automatic function definition mechanism is different than assigning values to settable variables using an assignment operator or encapsulating a function using the define building block (encapsulation) operation, with particular actual variables of the problem. These operations utilize the actual variables of the problem, or values derived from them instead of dummy variables, and have values that are determined strictly by the time that the variable was set or by the current values of the actual variables of the problem or the state of the problem. The value of any of these is independent of the context of its use. In contrast, the result of a call to an automatically defined function is as a whole determined precisely by the context of its use, i.e., its arguments and any computations relating to them performed by the ADF.

The idea of automatic function definition has its roots in the ability of a problem to be decomposed into a set of similar, but smaller, problems. For instance, the Boolean even-parity function of k Boolean arguments returns T (True) if an even number of its arguments are T, and otherwise returns NIL (False). Similarly, the odd-parity function of/<Boolean arguments returns T (True) if an odd number of its arguments are T, and otherwise returns NIL (False). For example, the even-4-parity function can be represented using the even-2-parity function, also known as the equivalence function EQV or the not-exclusive-or function (NXOR) or can be represented using the odd-2-Parity Function, also known as the Exclusive-OR (XOR) Function. It should be noted that the user does not need to know or have any knowledge that such a specific decomposition exists; it is the present invention that determines that this is possible, finding the symmetries and regularities of the problem and parameterizing representations of those symmetries and regularities to allow their composition into the eventual solution of the problem.

In one embodiment, automatic function definitions are achieved by establishing a constrained syntactic structure for the entity, wherein the overall entity contains both function definitions (comprising dummy variables), which are referred to in general as internally invoked sub-entities, and calls to the functions so defined from the result producing (e.g., externally invoked) sub-entities. The function definitions are comprised of functions from the original function set, dummy variables and possibly references to the actual variables of the problem and other functions that have been automatically defined. In the currently preferred embodiment, an individual containing automatically defined functions are defined in a cascading structure, wherein some of the defined functions are defined in terms of others. The cascading structure is much like a main computer program calling subroutines during its execution, including where some of these subroutines might call upon each other.

Specifically, in one embodiment, the constrained syntactic structure consists of a program with two sets of components: the first set includes function-defining components and the second set includes result-producing components. It should be noted that the present invention is not limited to any specific number of function-defining components or any specific number of result-producing components. Any number of function-defining components and result-producing components can be provided. Note that the term "result producing component" is used in its broadest sense. Any such component could return any number of values or it could perform side effects on the environment during its evaluation.

For example, the structure employed by the present invention might include two function-defining components and one result-producing component. The first function-defining component might specify a two-argument function definition, while the second function-defining component might specify a three-argument function definition. The result-producing component would compute the value returned by the overall entity when the external controller of the process invokes the result-producing component. This result-producing component is composed, in general, of the actual variables of the problem, constants, the functions in the primitive function set and any automatically defined functions created by the function-defining components. In this case, the defined functions would be the two-argument and three-argument automatically defined functions. In one embodiment, these two automatically defined functions are uniformly and consistently referred to as ADF0 and ADF1. In one embodiment, an automatically defined function is defined in terms of dummy variables, referred to consistently as ARG0, ARG1, ARG2, ARG3, .... When an automatically defined function is called, its dummy variables are instantiated with the current actual values of the arguments. These current values are obtained by evaluation of the expressions in the calling sub-entity. For example, an automatically defined function ADF0 might be called with the values of variables D0 and D1 on one occasion [i.e., (ADF0 D0 D1)], with the values of variable D1 and the expression (OR D0 D1) on another occasion [i.e., (ADF0 D1 (OR D0 D1))], and with two identical variables as arguments, such as D0 and D0, on yet another occasion [i.e., (ADF0 D0 D0). In one embodiment, the automatically defined function is defined once, although it may be called numerous times.

The number of arguments used in each function definition can be selected based on the user's knowledge of the problem or the total amount of computer resources available. In one embodiment, the automatic function definitions are not created with more than n arguments, where n is the number of actual variables of the problem in the terminal set of the problem.

It is possible for a function definition to have no arguments. One example is a function defined by an expression of only constant values. The define building block operation (i.e., encapsulation) differs from the automatically defined function mechanism in that the define building block (encapsulation) operation causes the removal of a sub-tree in the population and the saving (in what may be called a "library") of that sub-tree without further change for later use. It should be reiterated that automatic function definitions may change continuously as part of the computational structure that represents an entity (individual). A second example of an automatic function definition with no arguments is where the result produced is a value dependent on constant values and actual variables of the problem which the function has access to without being passed to the function. A third example exists where there are no explicit arguments, but side-effects are performed as a result, such as moving a robot.

Therefore, the size, shape and content of the function-defining components is not specified in advance nor is it specified how the result-producing components call upon the defined functions. Instead, the present invention, driven by the fitness measure, cause the evolution of the necessary size, shape and content of the solution to the problem.

The result-producing component and the function defining components are each capable of returning multiple values to whatever invoked them. In fact, each component in the entity can return multiple values. In the case where the actions within any sub-entity result in the performing of side effects, the sub-entity might return no values.

The evolutionary process operates on a population of entities. Each individual entity in the population consists of sub-entities. Each individual has at least one result-producing sub-entity. There is at least one individual entity in the population that has at least one function-defining sub-entity, and, most commonly, every entity in the population has at least one sub-entity. Depending on the problem, each individual entity in the population may contain more than one result-producing sub-entity.

The problem-solving process of the present invention starts with an initial random population of entities. Each of these entities is created in a random way consistent with the nature of the problem.

In general, the number of result-producing sub-entities is usually fixed for a particular problem since each entity in the population is expected to produce certain results when it is invoked by external controller of process.

If more than one result is to be produced, then each entity in the population could have more than one result-producing sub-entity.

If there are n actual variables of the problem, then it is almost always satisfactory to have no more than n dummy variables available to any one function-defining sub-entity. There can be function-defining sub-entities with zero dummy variables (such sub-entities can define a non-parameterized value useful in solving the problem). Similarly, there can be function-defining sub-entities with one, two, ..., n dummy variables.

Function-defining sub-entities with one dummy variable are especially common in computer programming. It should be noted that even though a certain number of dummy variables is chosen, there is no requirement that any or all of the dummy variables be used in a particular function definition.

When Boolean problems are involved, arguments can take on only the two values of T (True) and NIL (False). Thus, for Boolean valued problems, function-defining sub-entities with no dummy variables are only capable of defining one of the two Boolean constants (T and NIL) and function-defining sub-entities with one dummy variable are only capable of defining one of the four possible Boolean functions of one argument (two of which are constant-valued functions). Thus, for the special situation of Boolean problems, it is sufficient to consider only function-defining sub-entities with 2, ..., n dummy variables.

The number of different function-defining sub-entities with a particular number of dummy variables that may be useful for a particular problem varies with the problem. A practical approach is to provide an equal number of each. Limitations on computational resources may suggest having one of each.

Thus, for a Boolean problem involving four arguments, function-defining sub-entities with two, ..., n-1 dummy variables might represent a practical choice. Specifically, as discussed later, for the problem of evolving the Boolean even-4-parity function, we would have two function-defining sub-entities (one with two dummy variables and one with three dummy variables) along with one result-producing sub-entity. Later, we also show the flexibility of this technique by solving the problem with two function definitions each of three arguments.

The function-defining sub-entity with two dummy variables ADF0 is a composition of the dummy variables ARG0 and ARG1, the four actual variables of the problem D0, D1, D2, D3 from the terminal set $T_4$, and the functions AND, OR, NAND, and NOR from the function set $F_b$. For simplicity of explanation, recursion is not used in this example. Also the other automatically defined function (i.e., ADF1) is not included in the function set for ADF0. However, ADF0 can be included in the function set for ADF1. Therefore, ADF1 could call upon ADF0 in a cascading manner. Thus, a hierarchy of entities exists, wherein any function could be defined, such as ADF1, in terms of other automatic function definitions, such as ADF0. Note that this hierarchy does not change the fact that the result-producing components can have access to all of the defined functions.

Thus, the function-defining sub-entity with three dummy variables ADF1 is a composition of the dummy variables ARG0, ARG1, and ARG2, the four actual variables of the problem D0, D1, D2, D3 from the terminal set $T_4$, the functions AND, OR, NAND, and NOR from the function set $F_b$, and the automatically defined function ADF0.

Although the actual variables of the problem D0, D1, D2, D3 can appear in the function-defining sub-entities, their presence may reduce the evolutionary pressure toward the very generalization which automatic function definition is designed to promote. Thus, in one embodiment and in the examples herein, the actual variables of the problem do not appear in the function-defining sub-entities.

The definitions of the automatically defined functions (ADFs) and the result-producing sub-entities are evolved by genetic programming during a run. During evolution, appropriate result-producing sub-entities are created that call the automatically defined functions (ADFs) that are just defined. The evolution of this dual structure consisting of both automatic function definitions and function calls is caused by the evolutionary process using only the fitness measure working in conjunction with natural selection and genetic operations.

In one embodiment, the creation of the individuals (i.e., programs) begins with the result-producing main program components. Each result-producing main program component is a random composition of the primitive functions of the problem, the actual variables of the problem, and references to some or all of the functions defined within the current entity (i.e., program). Each of the function definitions contained in the present individual are created in the initial random generation and are comprised of the primitive functions of the problem and a specified number of dummy variables (i.e., formal parameters) which may vary in general among the defined functions of the individual. In the most general case, not only the primitive functions of the problem are contained within the function definitions, but also references to other defined functions within the current individual.

The ADF mechanism defines the structure of the function definitions, such that other functions are defined with functions and terminals, wherein some of the terminals are dummy variables. In one embodiment, the number of components for each structure is defined before the initial population is evolved. It should be noted that this could be done automatically and/or dynamically. Also specified is the number of arguments each function definition component has. For instance, ADF0 may be specified as having three arguments; ADF1 may be specified as having five arguments, etc. The arguments have given names, such as ARG0, ARG1, ARG2, etc. Thus, at the beginning of the run, the "tree" for the main program components and each function definition component ADF0, ADF1, etc. are built. Once the population of such entities has been constructed, the present invention causes evolution to occur using crossover, mutation, etc. in conjunction with the overall problem solving process.

An example of an entity 1501 of the present invention is shown in FIG. 15. Referring to FIG. 15, one component of entity 1501 is the internally invoked sub-entity automatically defined function ADF0 1502. Another component is automatically defined function ADF1 1503. Another component is the externally invoked sub-entity result-producing main program component 1504.

In one embodiment, the syntactic rules of construction for the individual programs, are as follows: one implementation of the ADF mechanism is a tree structure. In one embodiment, the root of the tree is a place holder for the totality of the entity. In the above example, the structure would have 3 (i.e., 2+1) components. In this instance, the function PROGN is used to root all of the components together. The PROGN function has a number of arguments equal to the sum of the number of automatically defined functions plus one. In the currently preferred embodiment, the root is always labelled with the PROGN function. In this example, the PROGN function is simply the connective "glue" that holds together the two function-defining components and the result-producing component. The first function-defining component 1502 (ADF0) of the entity rooted in the currently preferred embodiment by the PROGN is a composition of functions from the function set and terminals from the set of dummy variables for defining a function of two arguments, namely ARG0 and ARG1 as well as some extra machinery necessary to make a complete and legal function definition. Furthermore, the second function-defining component 1503 (ADF1) of the entity rooted by the PROGN is a composition of functions from the function set and the terminals from the set of three dummy variables for defining a function of three arguments, namely the set of ARG0, ARG1 and ARG2 along with similar function defining machinery. It should be noted that these dummy variables (formal parameters) are instantiated with the values of the corresponding argument sub-trees in the invoking sub-entities when the ADF is called. Thus, ARG0 and ARG1 in ADF0 are different from ARG0 and ARG1 in ADF1 and, in general, the dummy variables to each of these ADFs will be instantiated with different values each time the ADF is called. The third component, the result-producing main component 1504 is a composition of actual variables of the problem from the terminal set, as well as functions from the function set, the two-argument function ADF0 defined by the first component 1502, and the three-argument function ADF1 defined by the second component 1503.

The function-defining components are not limited to using a specific number of arguments. It is not required that the function-defining branch use all the available dummy variables. Thus, in the example above, it is possible for the second function defining component 1503 to define what amounts to a two-argument function, rather than a three-argument function, by ignoring one of the three available dummy variables. The number could be, for example, n, where n is the number of actual variables of the problem in the terminal set of the problem. The evolutionary process implemented by the present invention decides how many of the available dummy variables in a particular function definition are actually used. In some problems, knowledge about the problem domain might suggest the selection of a different number of arguments.

The function-defining components do not interact directly with the external controller of the process. Thus, in the example above, the first function-defining component 1502 and the second function-defining component 1503 do not interact directly with the external controller of the process. They are merely components which may or may not be called upon by the result-producing component 1504 (or each other). At its discretion, result-producing component 1504 may call one, two or none of the automatically defined functions from the function defining components any number of times. The results produced by the entire entity are the values returned or actions taken (e.g., side effects) either directly or indirectly by the result-producing component 1504. The results are produced by executing, or activating, the entire program (i.e., the entity). The result-producing components act as the "main program" to activate the entity in the currently preferred embodiment.

Figure 16:
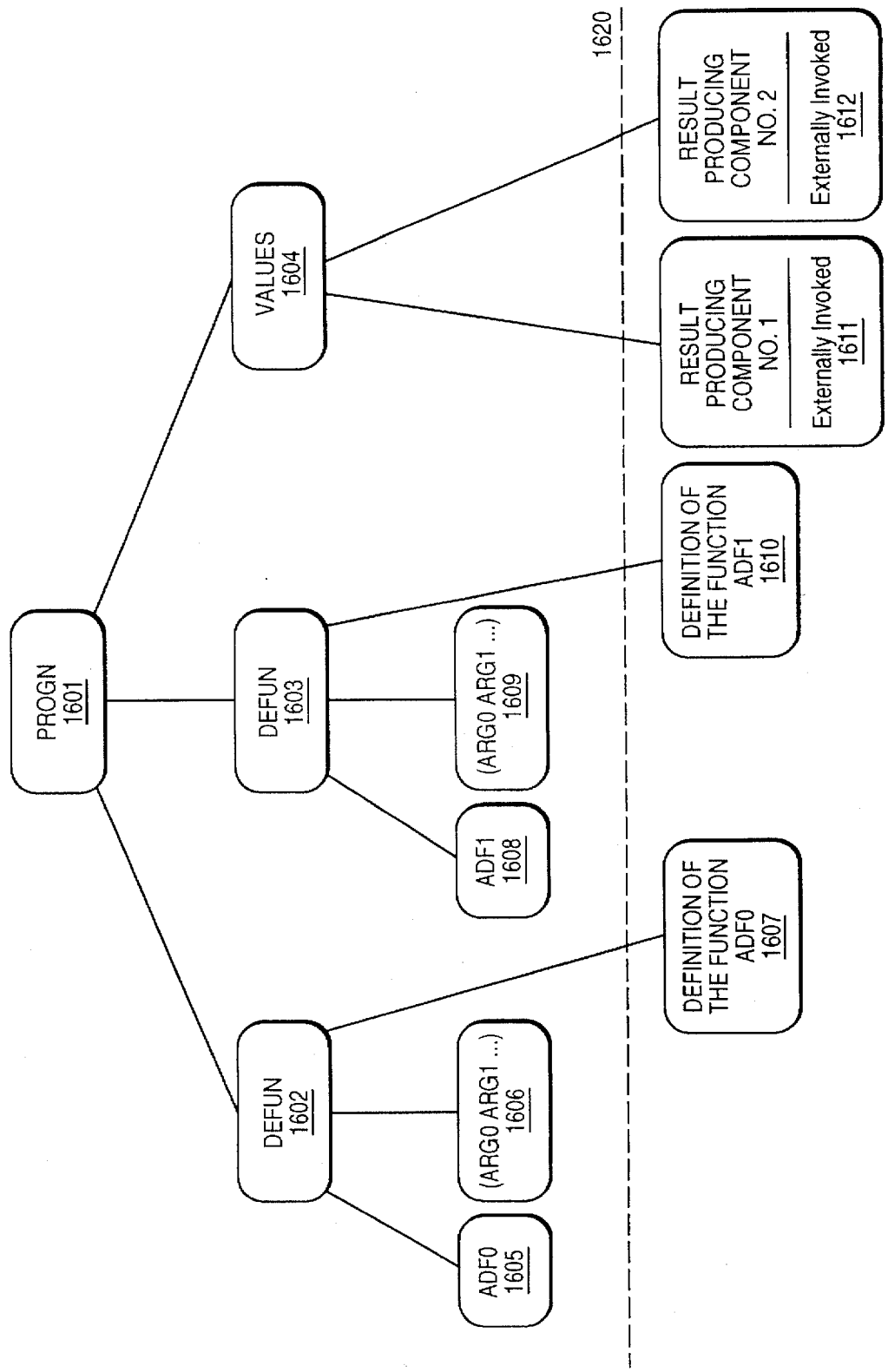
FIG. 16 illustrates one embodiment of the structure of an example entity in the population.

FIG. 16 shows the tree structure employed by one embodiment of the present invention to represent an entity. Referring to FIG. 16, the entity has two function definitions and two result-producing components. It should be noted that the number of function definitions and the number of result-producing branches is variable. The number chosen in FIG. 16 is purely exemplary. ADF0 is rooted by DEFUN 1602. The sub-tree rooted by DEFUN 1602 denotes a function definition which has a name ADF0 as identified in 1605, an argument list (ARG0 ARG1 . . . ) 1606, and a definition of the function ADF0 1607 in terms of arguments 1606. ADF1 is represented by DEFUN 1603. The sub-tree rooted by DEFUN 1603 denotes a function definition which has a name ADF1 as identified in 1608, an argument list (ARG0 ARG1 . . . ) 1609, and a definition of the function ADF1 1610 in terms of arguments 1609. The two result-producing components, 1611 and 161 2 are externally invoked by the external controller and return values to the VALUES function 1604. In the currently preferred embodiment, the VALUES function is similar to the function by the same name in the programming language LISP with the exception that it accepts all values returned from each result-producing component. All of the components, i.e. DEFUN 1602, DEFUN 1603 and VALUES 1604, are grouped in a set by the PROGN placeholder function 1601. PROGN allows the branches to execute in sequence. However, the sub-entities within the entity are not in an order. Each of the defined functions can be invoked as needed and all are available simultaneously. It should be noted that FIG. 16 includes line 1620. Line 1620 designates which portions of the entity are susceptible to structure modifying evolutionary operations, such as crossover and mutation. Such operations can only occur on portions of the entity below line 1620. Those portions above line 1620 are immune from being the subject of these operations.

In order to generate the tree depicted in FIG. 16, a template is used. The template contains all of the information above dotted line 1620. The number of arguments specified in the argument lists is set by the template. In this example, argument lists 1606 and 1607 would be set to indicate that the arguments available for each of the function definitions 1607 and 1610 respectively are the list (ARG0 ARG1) and the list (ARG0 ARG1 ARG2), respectively. Also the number of result-producing components is set. In the example, two result-producing components, 1611 and 1612, are specified. With the template setup complete, each of the function definitions, such as 1607 and 1610 in the example, and the result-producing components, such as 1611 and 1612 in the example, are generated in the normal recursive manner from the available functions and terminals.

Although the structure of the entities in the population is described as being that of a PROGN function rooting a set of function definitions and a set of result producing branches rooted by a VALUES function, one might choose not to implement such a system in this manner. The evaluation of the fitness of the entities in the population often requires the repeated activation of an entity over a number of fitness cases, i.e. different states of the environment or different values for the actual variables of the problem. If these entities are activated, they would result in the correct behavior but would be inefficient because of the repeated and unnecessary redefinition of the automatically defined functions. Thus, in one embodiment, it is preferable to allow the controller of the process to execute the definitions of the functions once and then to iterate over the invocation of the result-producing branch(es) without the redefinition of the automatically defined functions in order to activate the entity.

It is also often the case that the definitions of the automatically defined functions can result in very inefficient and expensive computation. The cost of invoking such a function is made even more onerous by there being a large number of fitness cases to test and by hierarchical references by inefficient functions to other inefficient functions. It is possible to optimize the process by transforming the automatically defined functions into a more efficient form. This transformation can take the form of source code optimization similar to the editing step described, compilation into more machine intelligible instructions or sometimes reducing the behavior of the function to a look-up table. This optimization process may itself be expensive but is often most worthwhile because it is repeatedly used.

Furthermore, expense often may be saved in this transformation process by transferring into any entities created in a new generation the transformed form of any automatically defined function for any such function whose definition is not changed by crossover or mutation.

The automatic function definition mechanism of the present invention operates by first generating a random set of computer programs composed of randomly created defined function components and result-producing components. Since a constrained syntactic structure is involved, it first creates the initial random population so that every individual computer program in the population has the required syntactic structure. Then, the evolutionary process performs operations on the structures, such as crossover where crossover in this embodiment is "category preserving" crossover. Category-preserving crossover is implemented by allowing the selection of the crossover point in the first parent to be restricted only in that it may not lie within the crossover protected part of the entity that is used as the template for the structure of the entity and then requiring that the crossover point of the second parent belong to the same category as the already-selected crossover point of the first parent.

Two definitions of "category" may be used. The first definition of "category" is that the two points are the same category if (1) they are both in result-producing branches, or (2) they are in function-defining branches whose argument list consists of precisely the same dummy variables and which refer to the same set of automatically defined functions. The second definition is less restrictive and is that the crossover point in the parent into which the insertion is to made is of the same category as the fragment to be inserted if every argument in the crossover fragment that is to be inserted has a meaning in the place where it is about to be inserted. In practice, if the crossover fragment that is about to be inserted contains only primitive functions from the function set $F_b$ and actual variables of the problem from the terminal set $T_4$ (i.e., D0, D1, D2, and D3), but contains no dummy variables, then it has meaning anywhere (assuming that the actual variables of the problem are permitted anywhere). If there are any dummy variables in the crossover fragment that is about to be inserted, those dummy variables must all be in the argument list of the sub-entity where it is about to be inserted. Similarly, any references to automatically defined functions in the crossover fragment to be inserted must be defined in the sub-entity into which it is to be inserted. This means, for example, that if there are dummy variables in the crossover fragment that is about to be inserted, the subentity cannot be a result-producing sub-entity (since result-producing subentities do not have dummy variables).

In the example of the even-4-parity function with one two-argument ADF and one three-argument ADF, the second definition of category means that a crossover fragment containing ARG0 or ARG1 can be inserted into either ADF0 and ADF1 (but not the result-producing sub-entity). In addition, it means that a crossover fragment containing dummy variables ARG2 (which appears only in ADF1) can only be inserted into ADF1; it cannot be inserted into ADF0 or the result-producing sub-entity. A crossover fragment containing no dummy variables (whether from ADF0, ADF1, or the result-producing sub-entity) has meaning everywhere.

As shown, the second definition is somewhat more difficult to implement. An example of category-preserving crossover is described in conjunction with FIG. 17A. In the following examples, only a single offspring is generates. It should be noted that the crossover operation is usually conducted in pairs. When genetic programming is used without ADFs, the crossover fragments are typically swapped between the selected individuals. However, because of the rules of category preserving crossover, in general one fragment cannot be swapped indiscriminately for the other. In one embodiment, the second fragment is selected until its category is acceptable in the context of the place into which it is to be replaced. This means that to achieve a crossover for the second parent an iterative search for an acceptable fragment is also performed. Sometimes it is not possible to find a point with the desired category, in which case the crossover aborts and reproduction occurs instead.

Figure 17A:
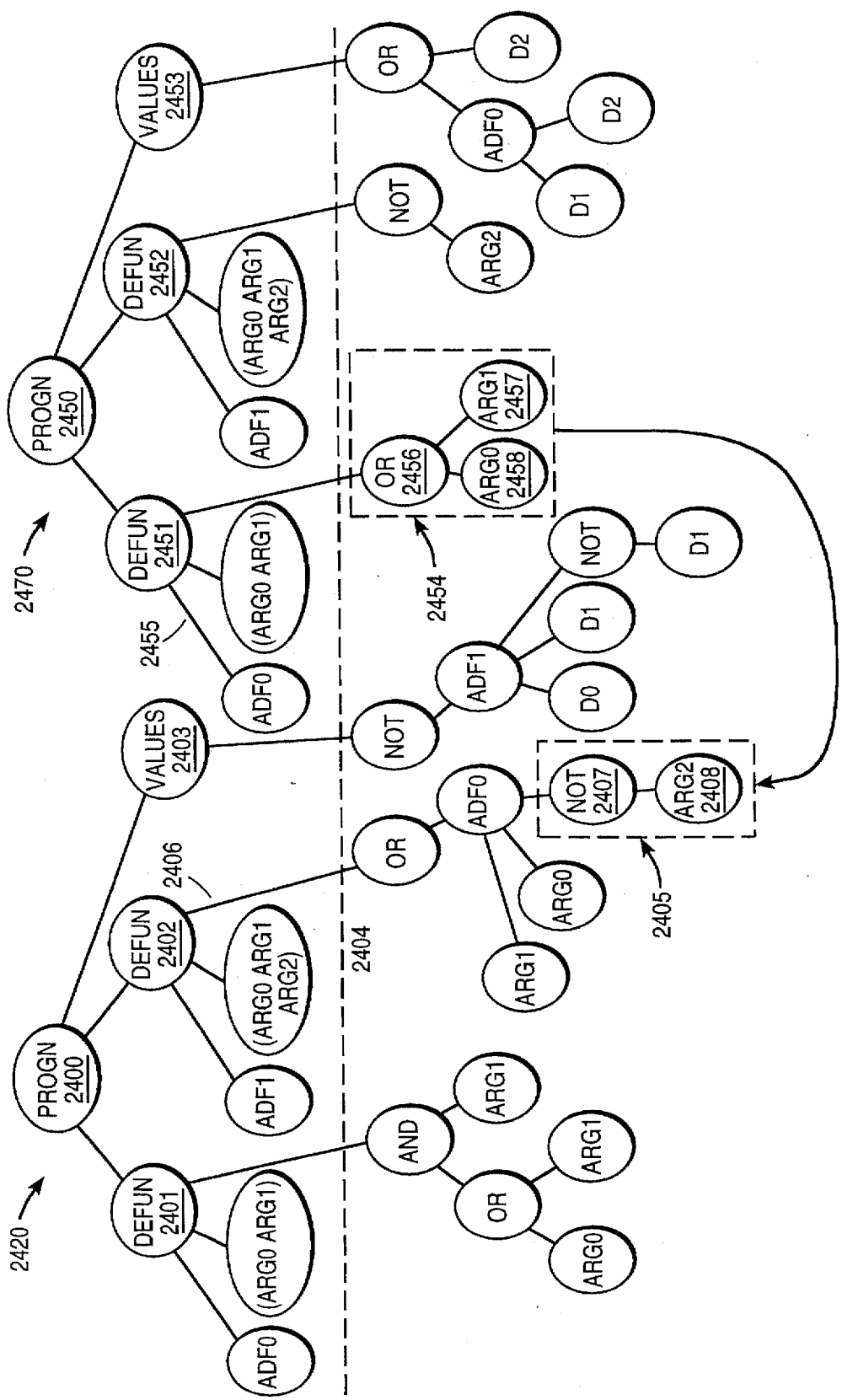
FIG. 17A illustrates an example of the crossover operation in conjunction with two example entities having automatically defined functions.

Referring to FIG. 17A, two entities 2420 and 2470 are shown as trees rooted by PROGN 2400 and 2450 respectively. Each of entities 2420 and 2470 have two automatically defined functions. Entity 2420 has DEFUN 2401 and DEFUN 2402 which root defined functions ADF0 and ADF1 respectively for entity 2420, while entity 2470 has DEFUN 2451 and 2452 which refer to defined functions named ADF0 and ADF1 respectively for entity 2470. Each entity 2420 and 2470 has one result-producing branch (i.e., component). Entity 2420 includes result-producing branch 2403 and entity 2450 has result-producing branch 2453. Note line 2490 is the line which designates which portions of the two entities are susceptible to structure modifying operations. As depicted in FIG. 17A, the crossover operation is performed by first selecting entity 2420 as being the selected entity (i.e., the first parent) and selecting a point in entity 2420 using a uniform probability distribution. The selected point in the entity tree is that point which is rooted at NOT operator 2407. The portion of entity 2420 rooted by NOT operator 2407, as indicated by box 2405, is deleted when a crossover fragment from entity 2470 is inserted. The crossover point chosen in this case in entity 2470 is the sub-tree rooted at OR function 2456, referred to as crossover fragment 2454. Thus, crossover fragment 2454 comprising a Boolean OR operation 2456 with arguments ARG0 2458 and ARG1 2457 replaces the portion of the function definition 2402 marked by box 2405, consisting of NOT operator 2407 with its argument ARG2 2408. Note that the arguments ARG0 and ARG1 from crossover fragment 2454 have meaning in the function definition 2402 since the argument list 2406 clearly specifies the existence of ARG0 and ARG1. However, note that if the crossover operation is attempted in the other direction wherein an attempt is made to crossover selected boxed portion 2405 consisting of NOT operator 2407 with its argument ARG2 2408 into the location of crossover fragment 2454 the crossover cannot be performed. Upon review of the argument list 2455 of DEFUN 2451, the argument ARG2 has not been defined. Therefore, it has no meaning in the context of ADF0 rooted at 2451. Therefore, this crossover action can not be accomplished. It should also be noted that, as long as the second parent crossover portion has meaning at the point where it is inserted in the first parent, any point of crossover may be selected and considered of the same category. In one embodiment, if a suitable point is not found (e.g., the portion rooted at the chosen crossover point has no meaning), then the crossover operation is aborted.

In the current example, the problem of selecting the second parent is eliminated by choosing a point of the same category in the corresponding component of the second parent. An example of crossover is shown in conjunction with FIG. 17B. Referring to FIG. 17B, two entities 2520 and 2570 are shown rooted by PROGN functions 2500 and 2550 respectively. Each of entities 2520 and 2570 have two automatically defined functions. Entity 2520 has function definitions rooted by DEFUN 2501 and DEFUN 2502 which refer to defined functions ADF0 and ADF1 respectively for entity 2520, while entity 2570 has function definitions rooted by DEFUN 2551 and 2552 which refer to defined functions ADF0 and ADF1 respectively for entity 2570. Each entity 2520 and 2570 has one result-producing branch (i.e., component). Entity 2520 includes the result-producing branch rooted at 2513 and entity 2570 has a result-producing branch rooted at 2563.

As depicted in FIG. 17B, the crossover operation is performed by first selecting entity 2520 as being the selected entity (i.e., the first parent) and selecting a point in entity 2520 using a uniform probability distribution. The selected point in the entity tree is the point rooted at NOT operator 2505. The portion of entity 2520 rooted by NOT operator 2505, as indicated by box 2504, is deleted when a crossover fragment from entity 2570 is inserted. The point at which the crossover fragment is chosen, in this case, is in a portion of the result-producing branch 2563 at a point rooting a call to ADF0 2555, contained in box 2554. Thus, both locations chosen for crossover are in the result-producing branches. As long as the crossover fragment has meaning with respect to its contemplated point of insertion, i.e., all of the primitive functions, terminals and calls to function definitions in this case have meaning in the result-producing branch rooted at 2513, then the crossover operation is allowed. Specifically, the two-argument ADF0 2555 has meaning when inserted in lieu of (NOT D1) at 2505.

A similar restriction is placed on the mutation operation, such that any added mutated structure has to have meaning in terms of the location at which the structure is to be added. For example, if the mutation point were selected inside a result-producing sub-entity, the sub-tree inserted at the mutation point would involve primitive functions from the function set of the problem, defined functions available to the result-producing sub-entity, and actual variables (terminals) of the problem. On the other hand, if the mutation point were selected inside a function-defining sub-entity having an argument list containing, say ARG0 and ARG1 (but not ARG2), the sub-tree inserted at the mutation point would involve primitive functions from the function set of the problem, defined functions available to the particular function-defining sub-entity, and actual variables (terminals) of the problem as well as ARG0 as ARG1.

It is beneficial to allow automatically defined functions to call other automatically defined functions. This allows the hierarchical decomposition of the problem into a lattice of function applications. In its most general form, allowing automatically defined functions to invoke other such functions would result in recursive references. For simplicity of explanation, in the examples shown, recursive references between the automatically defined functions are not allowed. Because genetically produced entities are frequently erroneous solutions to the problem, the possibility of infinite recursion must be anticipated if any automatically defined function is to be allowed to reference itself (either directly or indirectly through others). It is simpler not to have to add any extra mechanism to avoid this error condition. If recursion is not used, either of two methods for the simple avoidance of recursive references may be used. The first method is simple to implement and is the one used in the preferred embodiment. The second method is the more general solution to the problem but is currently more expensive to perform with currently available computational machinery.

The first method is simply to avoid recursions by allowing references to automatically defined functions in a manner which we can view as a "left-to-right" cascade of function definitions. For example, ADF0 can be defined such that it may not reference any automatically defined functions, ADF1 can then be defined so that it may reference only ADF0. Then ADF2 can be defined so that it may reference only ADF0 and ADF1 and so on. It is simple to see that the worst case of hierarchical nesting of calls to automatically defined functions will be that of ADF2 calling ADF1 which in turn calls ADF0. It is not possible in this arrangement to arrive at a cyclic dependency and hence a recursion. This arrangement is simple to implement and is that used in the examples shown here.

The second method involves checking the transitive closure of the functional dependencies being expressed by an entity. Let us consider an entity whose automatic function definitions contain no cyclic references. This can easily be achieved when the entity is created by the same graph traversal as is involved in the procedure below. From there on, the definition of the term "to have meaning" is clarified such that the transitive closure of the paths from function calls through the function definitions and any function calls made therein for the crossover fragment that is to be inserted in the entity must allow no cyclic references. Thus, the graph of function calls when followed through function definitions must be a directed acyclic graph. Graph traversal algorithms are well known in the art to determine the possible existence of cyclic dependencies. This method is simple to implement, but is computationally more expensive.

Thus, the present invention allows automatic function definitions by the use of a constrained syntactic structure for the automatic discovery of a set of function definitions along with a set of result-producing program components any of which can call upon any combination of the defined functions to solve a problem. The automatic function definition mechanism enhances the performance of genetic programming in problem solving. Moreover, automatic function definition enables genetic programming to readily solve a variety of problems.

Thus, the idea of creating a constrained syntactic structure for automatically generating a set of function definitions along with one or more final value-returning branches which can call upon any combination of the defined functions to solve the problem is shown above. Neither the size, shape nor content of the function defining branches have to be specified nor are the result-producing branches specified. Instead, the evolutionary process, using natural selection and genetics, driven by the fitness measure, causes the evolution of the necessary size, shape, and content of the solution to the problem. Furthermore, in using hierarchical automatic function definition, each program in the population containing a fixed number of function-defining branches could define an arbitrary function involving an identical number of arguments and be defined in terms of previously defined functions. The result-producing branches of the program then has access to the defined functions to help in solving the problem.

More than one result-producing branch can exist with automatic function definition or hierarchical automatic function definition. Thus, more than one value can be returned by an individual program and each of these values may, in fact, be a collection of values. Actual variables of the problem domain can appear in the function-defining branches with automatic function definition or hierarchical automatic function definition, just as do their dummy variables.

Architecture-Altering Genetic Operations

The architecture-altering genetic operations of the present invention are described below.

BRANCH DUPLICATION

The operation of branch duplication duplicates one of the branches of a program. In one embodiment, the steps in the operation of branch duplication are as follows:

(1) Select a program from the population to participate in this operation.

(2) Pick one of the function-defining branches of the selected program as the branch-to-be-duplicated. If the selected program has only one function-defining branch, that branch is automatically picked. If the selected program has no function-defining branches (or already has the maximum number of branches established for the problem at hand), this operation is aborted and no action is performed on this occasion.

(3) Add a uniquely-named new function-defining branch to the selected program, thus increasing, by one, the number of function-defining branches in the selected program. The new function-defining branch has the same argument list and the same body as the branch-to-be-duplicated.

(4) For each occurrence of an invocation of the branch-to-be-duplicated anywhere in the selected program (e.g., the result-producing branch or other branch that may invoke the branch-to-be-duplicated), choose either to leave that invocation unchanged or to replace that invocation with an invocation of the new branch. If the choice is to make the replacement of the name, the arguments in the invocation of the new branch remain identical to the arguments of the existing invocation. In one embodiment, this choice is performed at random using a uniform probability distribution (i.e., leaving the occurrence unchanged with 50% probability and replacing the occurrence with the new name with 50% probability); however, this choice may be made with a non-uniform probability distribution or a non-random way if user has knowledge about the particular problem domain involved.

In an embodiment of the invention, the step of selecting a program is performed on the basis of fitness, so that a program that is more fit has a greater probability of being selected to participate in the operation than a less fit program. Fitness is often measured explicitly. When this is the case, a copy is usually first made of the selected program and the operation is then performed on the copy. Meanwhile, the unchanged original program remains in the population and is therefore available to be selected again on the basis of its fitness. Fitness need not be measured explicitly. Instead, the fact that an entity exhibits performance that exceeds a certain minimum threshold may be viewed as survival of the entity in the environment. In that event, the step of selecting a program may be performed at random using a uniform probability distribution among all surviving entities in the population at a particular time. This choice may also be made with a non-uniform probability distribution or a non-random way using knowledge about the particular problem domain involved.

The problem of learning the Boolean even-parity function is used for purposes of illustration; however, the techniques described are applicable to a wide variety of different problems. The Boolean even-k-parity function takes k Boolean arguments, D0, D1, D2, and so forth (up to a total of k arguments). Each argument can take on the value T (true or 1) or NIL (false or 0). The even-k-parity function returns a single value (and performs no side effects). It returns T if an even number of its Boolean arguments are T, but otherwise returns NIL. Parity functions are often used to check the accuracy of stored or transmitted binary data in computers because a change in the value of any one of its arguments always changes (toggles) the value of the function.

The arguments (terminals) in this problem are Boolean; that is, they take on one of two possible values: true (often denoted by T or 1) or false (often denoted by NIL or 0). The problem is to discover, by means of an evolutionary process, a program that mimics the behavior of the Boolean even-k-parity problem for every combination of its Boolean inputs. For example, the Boolean even-3-parity function takes three Boolean arguments, D0, D1, and D2. The eight rows of the table below show the eight possible combinations of Boolean values (i.e., 0 and 1) that may be assumed by three Boolean arguments. The last column of the table shows the value of the Boolean even-3-parity function for each combination of values of D0, D1, and D2.

| D2 | D1 | D0 | Even-3-parity |
|---|---|---|---|
| 0 | 0 | 0 | 1 |
| 0 | 0 | 1 | 0 |
| 0 | 1 | 0 | 0 |
| 0 | 1 | 1 | 1 |
| 1 | 0 | 0 | 0 |
| 1 | 0 | 1 | 1 |
| 1 | 1 | 0 | 1 |
| 1 | 1 | 1 | 0 |

Other parity functions will be discussed herein. For example, the even-5-parity function takes five Boolean arguments, D0, D1, D2, D3, and D4. There are 32 possible combinations of values that may be assumed by five Boolean arguments. The 2-parity functions take two arguments. The odd-parity function returns 1 if an odd number of its arguments are 1, but returns 0 otherwise.

Because of this sensitivity to its inputs, the parity function is difficult to learn using automated learning techniques and is often used as a benchmark in the fields of machine learning and artificial intelligence. The programs to be discovered are to be composed of the Boolean functions AND, OR, NAND, and NOR. The functions AND, OR, NAND, and NOR each take two Boolean arguments and return one Boolean value as their output. These particular functions produce no side-effects (i.e., changes in state of a system); they merely produce an output value when given two input values. The techniques described herein also apply to side-effecting functions.

Figure 19:
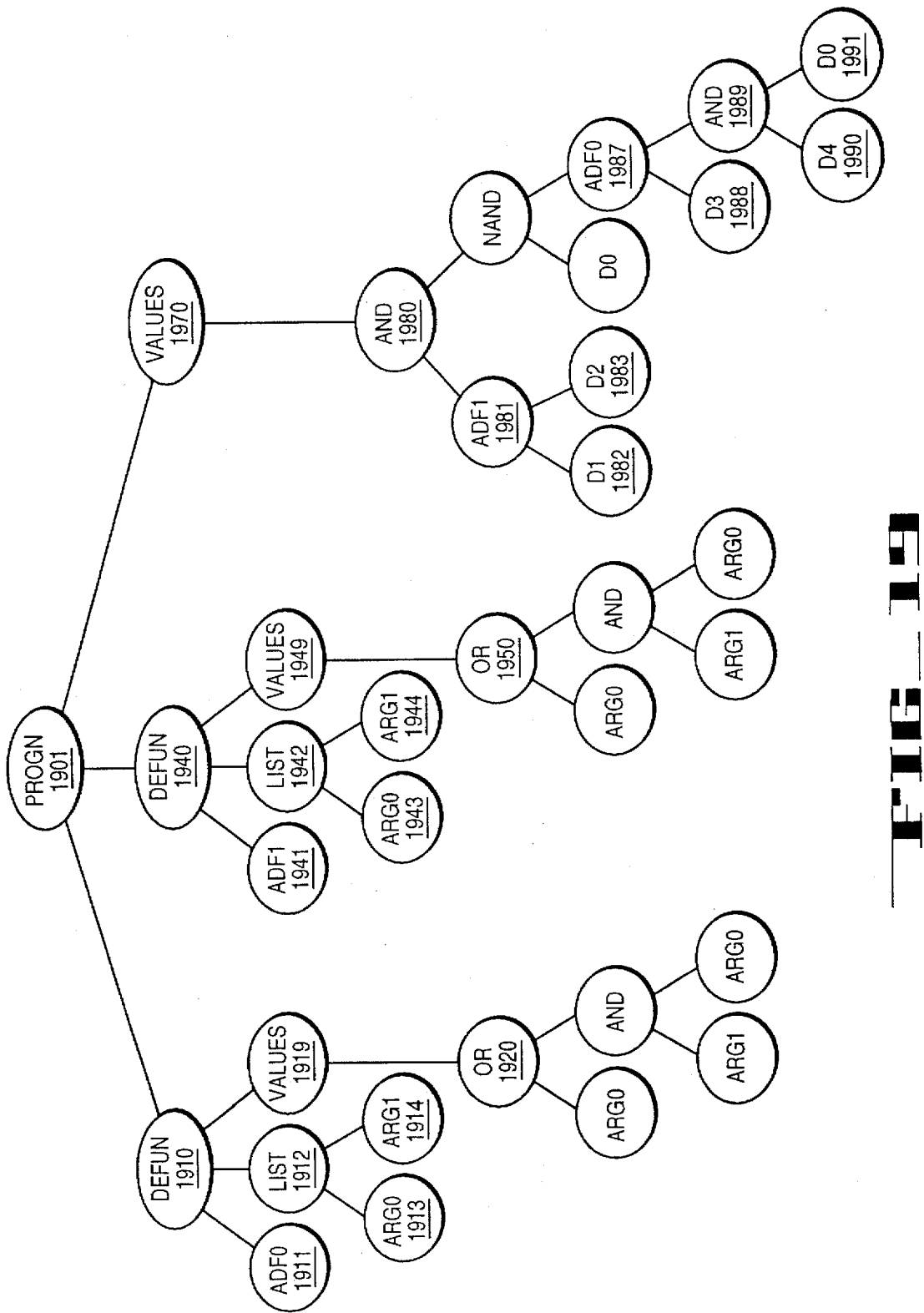
FIG. 19 illustrates the effect of the operation of branch duplication.

FIGS. 18 and 19 are used to illustrate the operation of branch duplication. In FIG. 18, the overall program has one function-defining branch and one result-producing branch. The two branches are coupled by PROGN 1801. The DEFUN 1810 indicates the beginning of the one function-defining branch. The VALUES function 1870 indicates the beginning of the one result-producing branch.

The function-defining branch defines an automatically defined function whose name is ADF0 at 1811. The argument list for ADF0 begins at the LIST function 1812. In this illustrative Figure, ADF0 possesses two dummy arguments (formal parameters) ARG0 1813 and ARG1 1814. The VALUES function 1819 of this function-defining branch gathers the value produced by the body of ADF0 as the return value of ADF0. The body (work) of the function begins with the OR 1820 and includes the one function (AND 1822) and three terminals (i.e., ARG0 1821, ARG1 1823, and ARG0 1824) below OR 1820. The body of the function-defining branch may be composed of the Boolean (logical) functions AND, OR, NAND, and NOR and the dummy arguments ARG0 and ARG1 (i.e., the two arguments in the argument list at LIST 1812). In particular, the function OR appears at 1820 with ARG0 1821 as one of its arguments and AND 1822 as the beginning of its other argument. The terminals ARG0 1824 and ARG1 1823 emanate from AND 1822.

Dummy arguments are defined only within their respective branch. It is not necessary that each branch contain an instance of each of its possible ingredients. As it happens, the functions NAND and NOR do not appear in this particular illustrative function-defining branch.

The result-producing (main) branch begins at the VALUES function 1870. VALUES 1870 gathers the value produced by the body of the result-producing branch as the return value of overall program coupled together by PROGN 1801. The body of the result-producing branch may be composed of AND, OR, NAND, and NOR, the now-defined automatically defined function, ADF0, and the five actual variables of the problem. If the Boolean even-5-parity function is being considered, the five actual variables of the problem are D0, D1, D2, D3, and D4. Dummy arguments (such as ARG0 and ARG1) do not appear in the result-producing branch. The actual variables of the problem, D0, D1, D2, D3, and D4, do not typically appear in the function-defining branches in most problems (although they are sometimes permitted to be there). The body of result-producing branch begins at AND 1880. Within the body of the result-producing branch, the function AND 1880 takes arguments beginning at ADF0 1881 and the function NAND 1885. Actual variables D1 1882 and D2 1883 emanate from automatically defined function ADF0 1881. Actual variables D0 1886 and ADF0 1887 emanate from the function NAND 1885. Actual variable D3 1888 and function AND 1889 emanate from the automatically defined function ADF0 1887. Actual variables D4 1890 and D0 1891 emanate from the function AND 1889. As it happens, the function OR and NOR do not appear in this particular result-producing branch.

The connective function PROGN in the Common LISP language evaluates each of its arguments sequentially and returns the result of evaluating its last argument. PROGN acts as a connective glue for the two branches of this overall program. The PROGN 1801 starts by evaluating its first argument, namely the first function-defining branch beginning at DEFUN 1810. When a DEFUN is evaluated, the function involved becomes defined. In LISP, when a DEFUN is evaluated, the DEFUN returns the name of the function just defined (i.e., ADF0 here). Since the PROGN returns only the result of the evaluation of its last argument, the value returned by DEFUN 810 (i.e., the name, ADF0) will be lost (inconsequentially). The PROGN 1801 now evaluates the second branch of the overall program, namely the result-producing branch beginning at VALUES 1870. The result-producing branch invokes the now-defined function ADF0 at 1881 and 1887 and performs various other functions in its body. Since this result-producing branch is the last (second) argument of the PROGN 1801, the value returned by the overall two-branch program consists of the numerical value returned by the VALUES 1870 associated with the result-producing branch.

Other programming languages handle function-defining subprograms (sometimes called subroutines, subprograms, procedures, subfunctions, in-line functions, defined functions, DEFUNs, or modules) in different ways. However, regardless of the differences, the overall objective is to enable a main result-producing part of an overall program to invoke function-defining branches (and to also allow some function-defining branches to invoke other already-defined function-defining branches belonging to the same overall program).

The argument map describes the architecture of a multi-part program in terms of the number of its function-defining branches and the number of arguments that they each possess. The argument map of the set of automatically defined functions belonging to an overall program is the list containing the number of arguments possessed by each automatically defined function in the program. If a program has only one automatically defined function, its argument map takes the form {i}, where i is the number of arguments possessed by its one automatically defined function. If a program has, for example, two automatically defined functions, its argument map takes the form {i, j}, where i is the number of arguments possessed by its first automatically defined function and j is the number of arguments possessed by its second automatically defined function. The argument map for the overall two-branch program of FIG. 18 is {2} because there is one function-defining branch and that function-defining branch takes two arguments (as indicated by ARG0 1813 and ARG1 1814). The argument map would be {2} even if one of these two arguments did not actually appear below VALUES 1819.

The operation of branch duplication can now be illustrated with the program in FIG. 18. Since the program in FIG. 18 has only one 5 function-defining branch, the sole function-defining branch (defining ADF0) of this program is picked as the branch-to-be-duplicated. ADF0 takes two dummy arguments, namely ARG0 1813 and ARG1 1814.

FIG. 19 shows that the effect of the operation of branch duplication. The function-defining branch 1810 (also shown as 1910) defining ADF0 is duplicated. The copy is added to the selected overall program at DEFUN 1940, thereby giving the new overall program PROGN 1901 three branches: a first function-defining branch starting at DEFUN 1910 (corresponding to DEFUN 1810 in FIG. 18), a new second function-branch starting at DEFUN 1940, and a result-producing branch starting at VALUES 1970 (corresponding to VALUES 1870 in FIG. 18). The copy is given the unique new name of ADF1 at 1941. The argument list of the new function-defining branch 1940 has the argument list consisting of LIST 1942, ARG0 1943 and ARG1 1944. This argument list is the same as the argument list of the first function-defining branch, namely LIST 1812 (shown as 1912 in FIG. 19), ARG0 1813 (shown as 1913 in FIG. 19), and ARG1 1814 (shown as 1914 in FIG. 19). The body of the new function-defining branch starting with VALUES 1949 and OR 1950 is the same as the body of the first function-defining branch starting at VALUES 1819 (shown as 1919 in FIG. 9) and OR 1820 (shown as 1920 in FIG. 19).

There are two occurrences of invocations of the branch-to-be-duplicated, ADF0, in the result-producing branch 1870 (shown as 1970 in FIG. 19) of the selected program, namely ADF0 at 1881 (shown as 1981) and 1887 (shown as 1987). For each of these two occurrences, a random choice is made to either leave the occurrence of ADF0 unchanged or to replace it with the newly created ADF1. For the first invocation of ADF0 at 1981, the choice is randomly made to replace ADF0 with the name, ADF1, of the newly created function-defining branch. The arguments for the invocation of ADF1 am D1 1982 and D2 1983. That is, they are identical to the arguments D1 1882 and D2 1883 for the invocation of ADF0 at 1881 as part of the original program in FIG. 18. For the second invocation of ADF0 at 1887, the choice is randomly made to leave ADF0 unchanged. Again, the arguments for the invocation of ADF0 1987 are D3 1988 and (AND D4 D0) at 1989, 1990, and 1991. These arguments are identical to the arguments D3 1888 and (AND D4 D0) at 1889, 1890, and 1891 in FIG. 18. In this example, the argument map of the original overall program was {2} in FIG. 18 and the argument map of the new overall program in FIG. 19 is {2, 2}.

Because the duplicated new function-defining branch is identical to the previously existing function-defining branch (except for its name at 1941) and because it is invoked with the same arguments, the effect of this operation is to leave unchanged the value(s) returned and action(s) performed by the selected program. Therefore, if the programs in FIGS. 18 and 19 were to be executed at this time with the same inputs, they would produce identical results. The result is semantically equivalent. The two programs are, of course, structurally (syntactically) different. However, subsequent genetic operations may alter one or both of these currently identical function-defining branches, this operation enables subsequent changes to lead to a divergence in structure and behavior. In other words, after subsequent genetic operations (e.g., crossover, mutation, etc.) have been performed on either or both of the branches of the programs in FIG. 19, the results produced may no longer be identical.

The operation of branch duplication as defined above always produces a syntactically valid program. In the event that one or more branches of an overall program were constructed in accordance with some specified constrained syntactic structure, these constraints will also be satisfied in the program produced by this operation (and the other operations subsequently described herein).

ARGUMENT DUPLICATION

The operation of argument duplication duplicates one of the arguments in one of the automatically defined functions of a program. In one embodiment, the steps in the operation of argument duplication are as follows:

(1) Select a program from the population to participate in this operation.

(2) Pick one of the function-defining branches of the selected program. If the selected program has only one function-defining branch, that branch is automatically chosen. If the selected program has no function-defining branches, this operation is aborted and no action is performed on this occasion.

(3) Choose one of the arguments of the picked function-defining branch of the selected program as the argument-to-be-duplicated. If the picked function-defining branch has no arguments (or already has the maximum number established for the problem at hand), this operation is aborted and no action is performed on this occasion.

(4) Add a uniquely-named new argument to the argument list of the picked function-defining branch of the selected program, thus increasing, by one, the number of arguments in its argument list.

(5) For each occurrence of the argument-to-be-duplicated anywhere in the body of picked function-defining branch of the selected program, choose either to leave that occurrence unchanged or to replace that occurrence with the new argument. In one embodiment, this choice is performed at random using a uniform probability distribution (i.e., leaving the occurrence unchanged with 50% probability and replacing the occurrence with the new argument with 50% probability); however, this choice may be made with a non-uniform probability distribution or a non-random way if the user has knowledge about the particular problem domain involved.

(6) For each occurrence of an invocation of the picked function-defining branch anywhere in the selected program (e.g., the result-producing branch or other branch that may invoke the picked function-defining branch), identify the argument sub-tree in that invocation corresponding to the argument-to-be-duplicated and duplicate that argument sub-tree in that invocation, thereby increasing, by one, the number of arguments in the invocation.

Because the function-defining branch containing the duplicated argument is invoked with an identical copy of the previously existing argument, the effect of this operation is to leave unchanged the value(s) returned and action(s) performed by the selected program. However, subsequent genetic operations may alter one or both of these currently identical arguments so that subsequent changes may lead to a divergence in structure and behavior.

Figure 20:
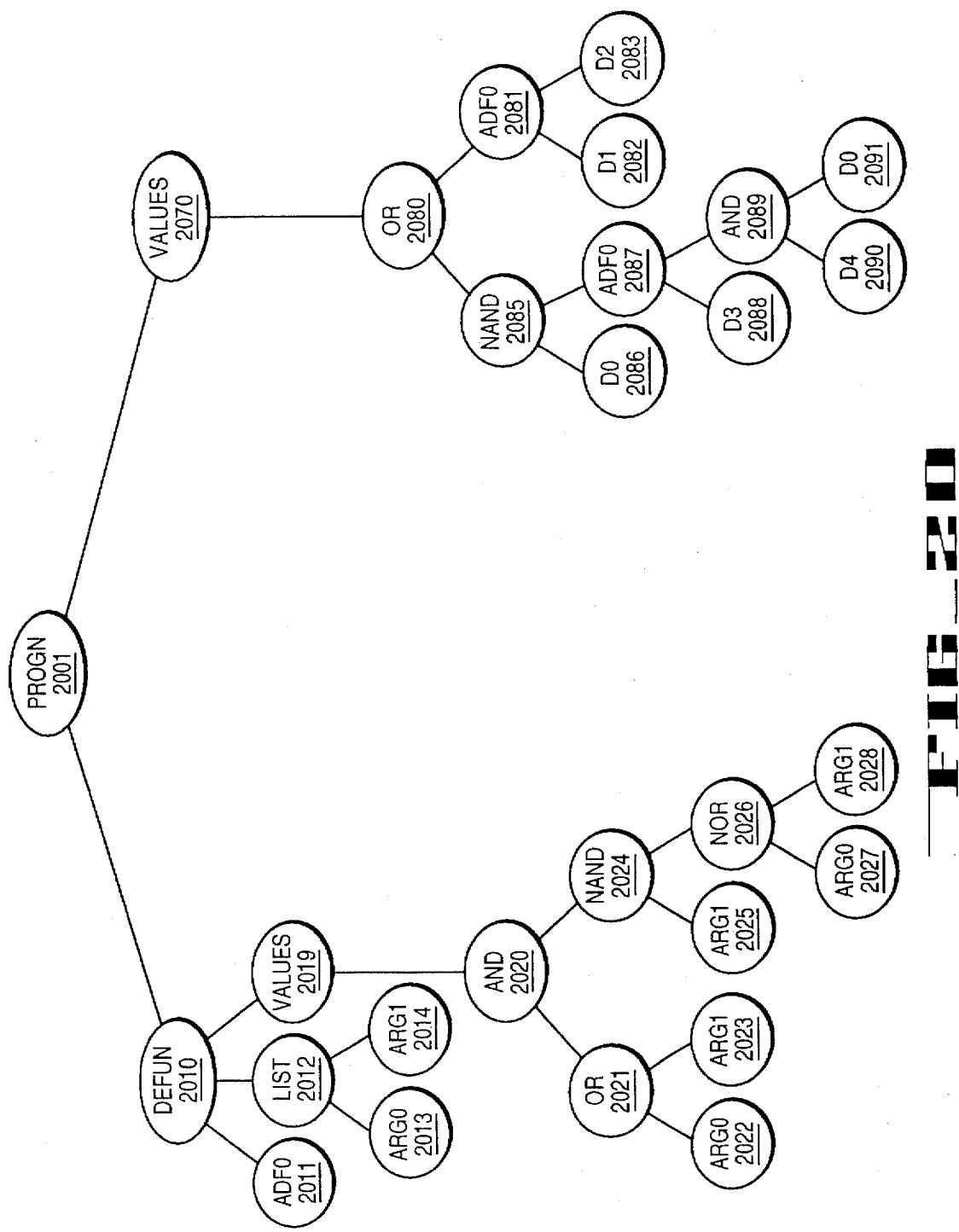
FIG. 20 illustrates an example of an entity according to the present invention.
Figure 21:
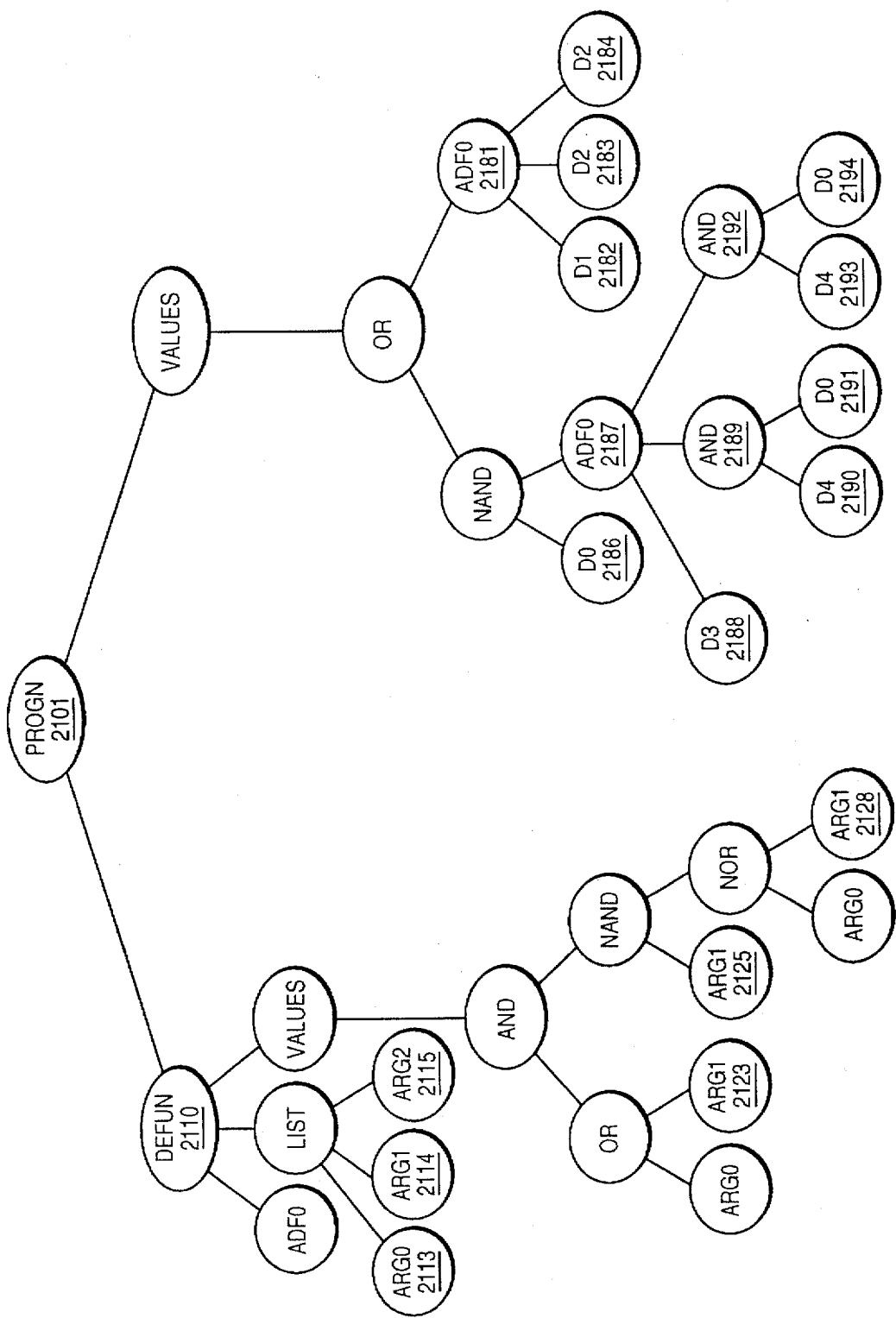
FIG. 21 illustrates the result of the operation of argument duplication on the structure in FIG. 20.

FIGS. 20 and 21 are used to illustrate the operation of argument duplication. In FIG. 20, the program has one function-defining branch and one result-producing branch. The two branches are connected by PROGN 2001. The DEFUN 2010 indicates the beginning of the first function-defining branch. The VALUES 2070 indicates the beginning of the result-producing branch.

The first function-defining branch defines an automatically defined function whose name is ADF0 at 2011. The argument list for ADF0 begins at LIST 2012. In this illustrative Figure, ADF0 possesses two dummy arguments (formal parameters), namely ARG0 2013 and ARG1 2014. The VALUES 2019 gathers the value, if any, produced by the body (work) of ADF0 as the return value of ADF0. The body of ADF0 begins with AND 2020 and includes all the functions and terminals below AND 2020. The body of ADF0 is composed of the Boolean (logical) functions AND, OR, NAND, and NOR and the dummy arguments (terminals) ARG0 and ARG1. Specifically, OR 2021 and NAND 2024 emanate from AND 2020. ARG0 2022 and ARG1 2023 emanate from the function OR 2021. ARG1 2025 and the function NOR 2026 emanate from the function NAND 2024, and ARG0 2027 and ARG1 2028 emanate from the function NOR 2026.

The result-producing (main) branch begins at VALUES 2070. VALUES 2070 gathers the value, if any, produced by the body of the result-producing branch as the return value of overall program coupled together by PROGN 2001. The body of result-producing branch is composed of AND, OR, NAND, and NOR and the now-defined automatically defined function ADF0 and the five actual variables of the problem, D0, D1, D2, D3, and D4. The body of result-producing branch begins at OR 2080. Within the body of the result-producing branch, the function OR appears at 2080 with branches to the function NAND 2085 and automatically-defined function ADF0 2081. Actual variables D1 2082 and D2 2083 emanate from ADF0 2081. D0 2089, also one of the actual variables of the problem, and the now-defined automatically defined function ADF0 2087 emanate from the function NAND 2085. The actual variable D3 2088 and the function AND 2089 emanate from ADF0 2087, and the actual variable D4 2090 and D0 2091 emanate from the function AND 2089.

The operation of argument duplication can now be illustrated with the program in FIG. 20. Since the program in FIG. 20 has only one function-defining branch, the sole function-defining branch (defining ADF0) of this program is picked. ADF0 takes two dummy arguments, namely ARG0 2013 and ARG2 2014. Now suppose that ARG1 2014 in FIG. 20 (also shown as 2114 in FIG. 21) is chosen as the argument-to-be-duplicated from this picked branch.

FIG. 21 shows the effect of the operation of argument duplication. The argument list of ADF0 has been changed by adding a uniquely-named new argument, ARG2 at 2115, thereby increasing the size of this argument list from two to three. There are three occurrences of the argument-to-be-duplicated, ARG1, in the body of the picked function-defining branch of the selected program, namely at 2023, 2025, and 2028 in FIG. 20. For each of these three occurrences, a random choice is made to either leave the occurrence of ARG1 unchanged or to replace it with the newly created argument, ARG2. FIG. 21 shows that the choice was in favor of a replacement for the first and third occurrences of ARG1. Consequently, ARG2 now appears at 2123 and 2128 while ARG1 remains unchanged at 2125.

There are two occurrences of an invocation of the selected function-defining branch ADF0 in this selected program in the result-producing branch at 2081 and 2087. In the first invocation of ADF0 at 2081, the variable D2 2083 corresponds to the argument-to-be-duplicated because it is the second argument of ADF0 2081 and because it was the second argument ARG1 2014 that was the argument-to-be-duplicated. In the second invocation of ADF0 at 2087, the entire argument sub-tree consisting of AND 2089, D4 2090, and D0 2091 (which is written "(AND D4 D0)" in LISP) corresponds to the argument-to-be-duplicated.

ADF0 2181 and 2187 now each take three arguments, instead of only two. For the first invocation of ADF0 at 2181, D2 2083 has been duplicated so that D2 now appears at both 2183 and 2184. For the second invocation of ADF0 at 2187, the entire argument sub-tree (AND D4 D0) has been duplicated so that it appears at both 2189, 2190, and 2191 as well as 2192, 2193, and 2194. Because ADF0 is invoked with identical copies of the previously existing arguments (i.e., D2 2083 and the argument sub-tree (AND D4 D0) at 2089, 2090, and 2091), the effect of this operation is to leave unchanged the value(s) returned and action(s) performed by the selected program. In this example, the argument map of the original overall program was {2} in FIG. 20 and the argument map of the new overall program in FIG. 21 is {3} because ADF0 now has three arguments.

The operation of argument duplication as defined above always produces a syntactically valid program. In the event that one or more branches of an overall program were constructed in accordance with some specified constrained syntactic structure, these constraints will also be satisfied in the program produced by this operation and the other operations described herein. Neither argument duplication nor branch duplication (previously described) have any immediate effect on the value(s) returned and action(s) performed by the selected program. The operation of argument duplication as defined above does not have any immediate effect on the value(s) returned and the action(s) performed by the selected program. However, subsequent operations may alter the argument that is created by this operation and may therefore lead to some later divergence in structure and behavior.

ARGUMENT DELETION

The operation of argument deletion deletes one of the arguments to one of the automatically defined functions of a program. In one embodiment, the steps in the operation of argument deletion are as follows:

(1) Select a program from the population to participate in this operation.

(2) Pick one of the function-defining branches of the selected program. If the selected program has only one function-defining branch, that branch is automatically picked. If the selected program has no function-defining branches, this operation is aborted and no action is performed on this occasion.

(3) Choose one of the arguments of the picked function-defining branch of the selected program as the argument-to-be-deleted. If the picked function-defining branch no arguments (or already has only the minimum number of arguments established for the problem at hand), this operation is aborted and no action is performed on this occasion.

(4) Delete the argument-to-be-deleted from the argument list of the picked function-defining branch of the selected program, thus decreasing, by one, the number of arguments in the argument list.

(5) For each occurrence of an invocation of the picked function-defining branch anywhere in the selected program (e.g., the result-producing branch or other branch that may invoke the picked function-defining branch), delete the argument sub-tree in that invocation corresponding to the argument-to-be-deleted, thereby decreasing, by one, the number of arguments in the invocation.

(6) For each occurrence of the argument-to-be-deleted anywhere in the body of picked function-defining branch of the selected program, replace the argument-to-be-deleted with a surviving argument (described below)

Figure 23:
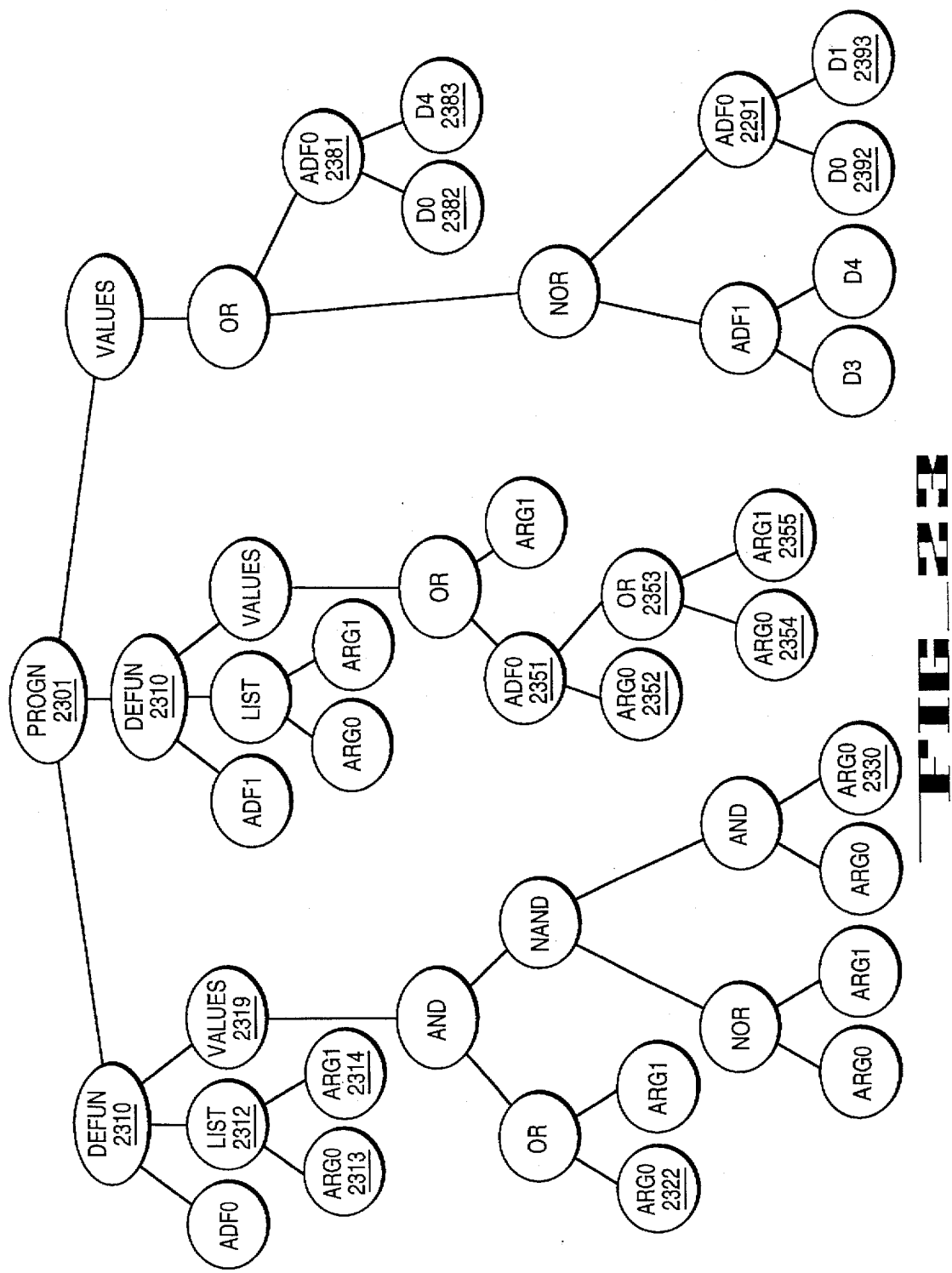
FIG. 23 illustrates the results of the operation of argument deletion on the structure in FIG. 22.
Figure 22H:
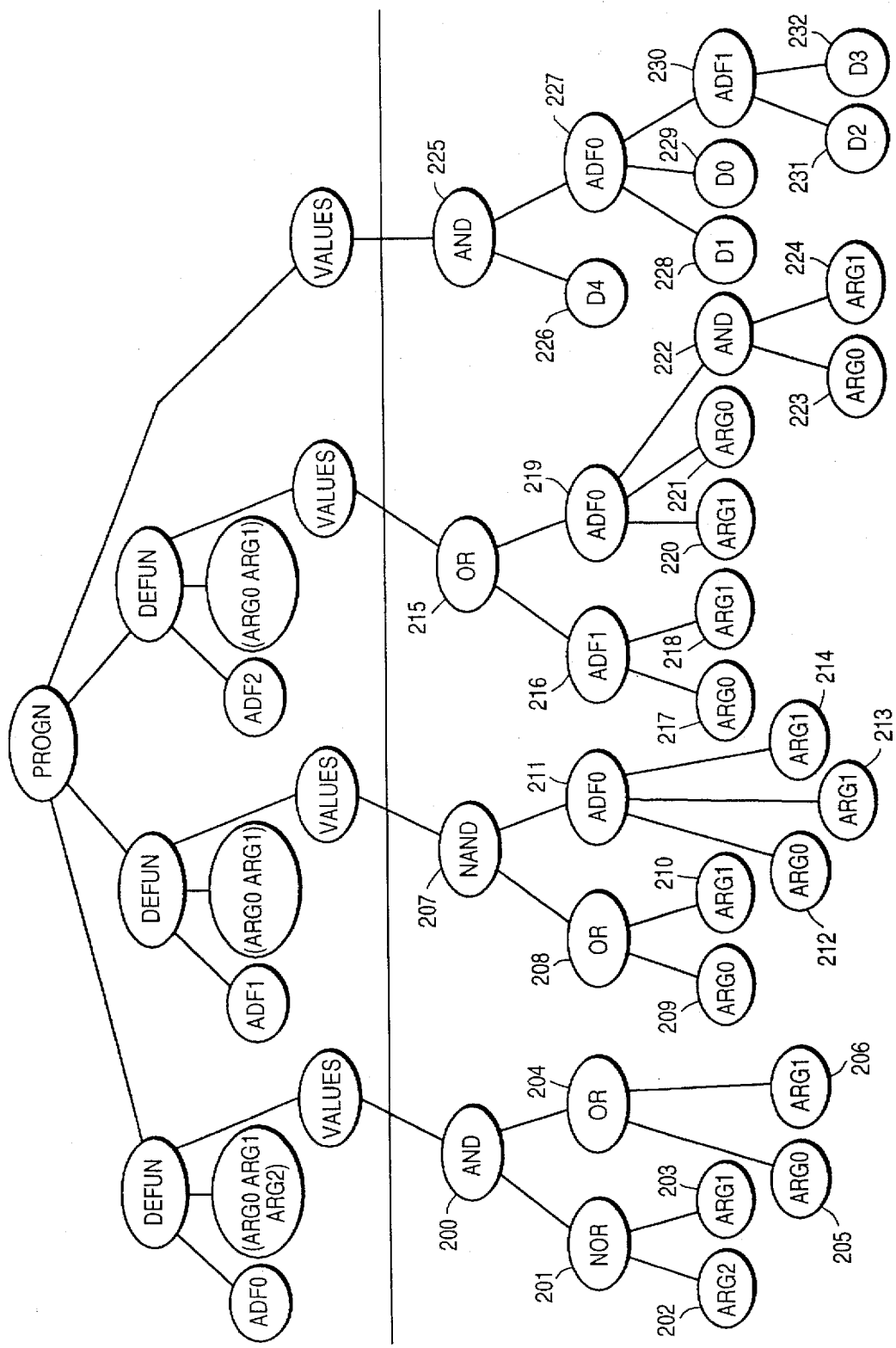
FIG. 22 illustrates an example of an entity according to the present invention.

FIGS. 22 and 23 illustrate the operation of deleting an argument. In FIG. 22, the program has two function-defining branches and one result-producing branch. The three branches are connected by PROGN 2201. The DEFUN 2210 indicates the beginning of the first function-defining branch ADF0. The DEFUN 2240 indicates the beginning of the second function-defining branch ADF1. The VALUES 2270 indicates the beginning of the result-producing branch.

The first function-defining branch defines an automatically defined function whose name is ADF0 2211. The argument list for ADF0 begins at LIST 2212. In this illustrative Figure, ADF0 possesses three dummy arguments (formal parameters) ARG0 2213, ARG1 2214, and ARG2 2215. The VALUES 2219 gathers the value produced by the body of ADF0 as the return value of ADF0. The body (work) of the function begins with the AND 2220 and includes all the functions and terminals below AND 2220. The body of ADF0 is composed of the Boolean (logical) functions AND, OR, NAND, and NOR and the dummy arguments ARG0, ARG1, and ARG2. In particular, the function AND appears at 2220 and 2228; OR appears at 2221; NAND appears at 2224; and NOR appears at 2225. The terminal ARG0 appears at 2226 and 2229; ARG1 appears at 2223 and 2227; and ARG2 appears at 2230.

The second function-defining branch defines an automatically defined function whose name is ADF1 2241. The argument list for ADF1 begins at LIST 2242. In this illustrative Figure, ADF1 possesses two dummy arguments (formal parameters) ARG0 2243 and ARG1 2244. The fact that ADF0 possesses three dummy arguments while ADF1 possesses only two dummy arguments illustrates the fact that different function-defining branches of a program can take different numbers of arguments. The VALUES 2249 gathers the value produced by the body of ADF1 as the return value of ADF1. The body (work) of the function begins with the OR 2250 and includes all the functions and terminals below OR 2250. The body of ADF1 is composed of AND, OR, NAND, and NOR, the dummy arguments ARG0 and ARG1, and the now-defined ADF0. For example, the body of ADF1 contains one reference to ADF0 at 2251. ADF0 takes three argument sub-trees. The first argument sub-tree consists only of the dummy argument ARG0 2252. The second argument sub-tree is the subtree, (OR ARG0 ARG1), consisting of OR 2253, ARG0 2254, and ARG1 2255. The third argument subtree is ARG1 2256. In addition, the body of ADF1 contains ARG1 2257.

It is not necessary that a second function-defining branch actually refer to the now-defined ADF0 (although it does here). It is not necessary that a second function-defining branch even be given the option of referring to the now-defined ADF0 (although this option is allowed here). Dummy arguments are defined only within their respective branch.

The result-producing (main) branch begins at VALUES 2270. VALUES 2270 gathers the value produced by the body of the result-producing branch as the return value of overall program connected together by PROGN 2201. The body of result-producing branch is composed of AND, OR, NAND, and NOR and the now-defined ADF0 and ADF1 and the actual variables of the problem, D0, D1, D2, D3, and D4. Dummy arguments do not appear in the result-producing branch. The actual variables of the problem, D0, D1, D2, D3, and D4, do not typically appear in the function-defining branches (although they may). The body of result-producing branch begins at OR 2280. Within the body of the result-producing branch, the function OR appears at 2280; the now-defined automatically defined function ADF0 appears at 2281 and 2291; the function AND appears at 2284; the function NOR appears at 2287; and the now-defined automatically defined function ADF1 appears at 2288. The actual variable of the problem, D0, appears at 2282 and 2292; D1 appears at 2285 and 2293; D2 appears at 2294; D3 appears at 2289; and D4 appears at 2283 and 2290. As it happens, the function NAND does not appear in this particular result-producing branch.

The operation of deleting an argument can now be illustrated with the program in FIG. 22. Suppose the first function-defining branch (defining ADF0) of this program is picked. That is, ADF0 is picked at random from the two possibilities: ADF0 and ADF1. ADF0 takes three arguments, ARG0, ARG1, and ARG2. Then suppose that ARG2 is chosen as the argument-to-be-deleted from this picked branch. That is, ARG2 is chosen at random from the three possibilities: ARG0, ARG1, and ARG2. The argument list of ADF0 is now changed by deleting ARG0, thereby decreasing its size from three to two. ADF0 is invoked once in the second function-defining branch (defining ADF1) at 2251 and twice in the result-producing branch at 2281 and 2291. For each of these three invocations of ADF0, the third argument subtree is deleted. Specifically, first, the argument subtree, ARG0 at 2256 (consisting of only one point) is deleted from the invocation of ADF0 at 2251. Second, the argument subtree, (AND D1 D2) at 2284, 2285, and 2286 (consisting of three points), from the invocation of ADF0 at 2281 in the result-producing branch is also deleted. Third, the argument subtree, D2 at 2294 (consisting of only one point), from the invocation of ADF0 at 2291 in the result-producing branch is also deleted.

The resulting program is shown in FIG. 23. In this resulting program, the definition of ADF0 in the first branch and the three invocations of ADF0 in the later branches all take only two arguments because of the action of the operation of argument deletion.

In the first function-defining branch (defining ADF0), the argument list at LIST 2312 in FIG. 23 (shown as 2212 in FIG. 22) now takes only two arguments, ARG0 at 2313 and ARG1 at 2314. ARG2 no longer appears anywhere below VALUES 2319 in the body of the definition of ADF0. In the second function-defining branch (defining ADF1), the one occurrence of ADF0 at 2251 now takes only two argument subtrees, namely the ARG0 at 2352 and the (OR ARG0 ARG1) at 2353, 2354, and 2355. The third argument ARG0 2256 of FIG. 22 does not appear in FIG. 23 because this third argument subtree of ADF0 2251 (and 2351) corresponds to the argument-to-be-deleted.

In the result-producing branch, the occurrence of ADF0 at 2381 now takes only two argument subtrees, namely the D0 at 2382 and the D4 at 2383. The third argument (AND D1 D2) 2284, 2285, and 2286 of FIG. 22 does not appear in FIG. 23 because this third argument subtree of ADF0 2281 (and 2381) corresponds to the argument-to-be-deleted. The occurrence of ADF0 at 2391 in the result-producing branch now takes only two argument subtrees, namely the D0 at 2392 and the D1 at 2393. The third argument D2 2294 of FIG. 22 does not appear in FIG. 23 because this third argument subtree of ADF0 2291 (and 2391) corresponds to the argument-to-be-deleted.

In this example, the argument map of the original overall program was {3, 2} in FIG. 22 and the argument map of the new overall program in FIG. 23 is {2, 2}.

When an argument is deleted, the question arises as to how to modify references to the argument-to-be-deleted within the picked branch. One alternative (called argument deletion with random regeneration) is to generate a new subtree in lieu of an invocation of the argument-to-be-deleted using the same method of generation originally used to create the picked branch at the time of creation of the initial random population (with the argument-to-be-deleted being unavailable during this random regeneration). The subtree may consist of either a single available argument or an entire generated argument subtree composed of the available functions and terminals.

A second alternative (called argument deletion by consolidation) involves identifying another argument of the picked branch as the surviving argument and replacing (consolidating) the argument-to-be-deleted with the surviving argument in the picked branch.

A third alternative (called argument deletion by macro expansion) may also be used. This alternative has the advantage of preserving the semantics of the overall program; however, it has the disadvantage of usually creating large programs.

Suppose, in employing argument deletion by consolidation (the second alternative), that ARG0 is chosen (from among the remaining arguments, ARG0 and ARG1, of the picked branch 2210) as the surviving argument. ARG2 appears in this picked branch at 2222 and 2230 in FIG. 22. These two occurrences of ARG2 in FIG. 22 are replaced by ARG0 at both 2322 and 2230 of FIG. 23.

In one embodiment of this operation, the step of choosing the surviving argument is performed at random using a uniform probability distribution; however, this choice may also be made with a non-uniform probability distribution or a non-random way using knowledge about the particular problem domain involved.

Since argument deletion by consolidation involves two arguments (i.e., the argument-to-be-deleted and the surviving argument), it is necessary that the picked branch have at least two arguments. Thus, when argument deletion by consolidation is being used and the picked function-defining branch has less than two arguments, this operation is aborted and no action is performed on this occasion.

For certain problems, it may be advisable to set a minimum permissible number of arguments for any function. For example, in a problem involving Boolean functions and variables and no side-effects, there are only four possible Boolean functions of one argument. These four functions are the function that always returns true (i.e., the constant function for T), the function that always returns false (i.e., the constant function for NIL), the function that returns the value of its own argument (i.e., the identity function), and the function that returns the negation of its one argument (i.e., the NOT function). It may be more efficient to exclude such one-argument functions for a Boolean problem. If this approach is adopted, whenever the picked function-defining branch currently takes only two arguments, this operation is aborted and no action is performed on this occasion. When argument deletion by macro expansion (i.e., the third alternative) is used, the first step is to delete the argument-to-be-deleted from the argument list of the picked branch. The second step is then to create as many copies of the now-modified picked branch as there are invocations of the picked branch in the overall program (e.g., in the result-producing branch or other branches) and to give each such copy of the picked branch a unique name. The third step is to replace each invocation of the picked branch in the overall program with an invocation to a particular one of the uniquely-named copy of the now-modified picked branch. The fourth step is, for each uniquely-named copies of the now-modified picked branch, to insert the argument subtree corresponding to the argument-to-be-deleted for every occurrence of the argument-to-be-deleted in that particular copy.

The alternative of argument deletion by macro expansion has the advantage of preserving the semantics of the overall program; however, it has the disadvantage of usually creating a vast number of additional branches and large overall programs. In addition, the objective of a deletion is often not to preserve the semantics of the overall program. Deletions offer a way to achieve generalization in problem solving procedure. Thus, if the objective is to try some generalization on some members of the population, it is distinctly undesirable to use argument deletion by macro expansion. Both the argument duplication and the branch duplication operations create larger programs. Larger programs consume more resources and a population of such growing programs may become unmanageable as a practical matter. The argument deletion operation and the branch deletion operation can create smaller programs and provide a mechanism for balancing the continual growth that would otherwise occur (provided the alternative of argument deletion by macro expansion is not used).

BRANCH DELETION

The operation of branch deletion deletes one of the automatically defined functions of a program.

In one embodiment, the steps in the operation of branch deletion are as follows:

(1) Select a program from the population to participate in this operation.

(2) Pick one of the function-defining branches of the selected program as the branch-to-be-deleted. If the selected program has no function-defining branches, this operation is aborted and no action is performed on this occasion.

(3) Delete the branch-to-be-deleted from the selected program, thus decreasing, by one, the number of branches in the selected program.

(4) For each occurrence of an invocation of the branch-to-be-deleted anywhere in the selected program (e.g., the result-producing branch or other branch that may invoke the branch-to-be-deleted), replace the invocation of the branch-to-be-deleted with a surviving branch (described below).

When a function-defining branch is deleted, the question arises as to how to modify invocations of the branch-to-be-deleted by the other branches of the overall program that invoke it.

One alternative (called branch deletion with random regeneration) is to generate a new subtree in lieu of an invocation of the branch-to-be-deleted using the same method of generation originally used to create the invoking branch (i.e., the branch containing the invocation of the branch-to-be-deleted) at the time of creation of the initial random population (with the branch-to-be-deleted being unavailable during this random regeneration). The subtree may consist of either a single available argument or an entire generated argument subtree composed of the available functions and terminals.

A second method (called branch deletion by consolidation) involves identifying a suitable second function-defining branch of the overall program as the surviving branch and replacing (consolidating) the branch-to-be-deleted with the surviving branch in each invocation of the branch-to-be-deleted.

A third alternative (called branch deletion by macro expansion) involves inserting the entire body of the branch-to-be-deleted for each instance of an invocation of that branch.

Figure 24:
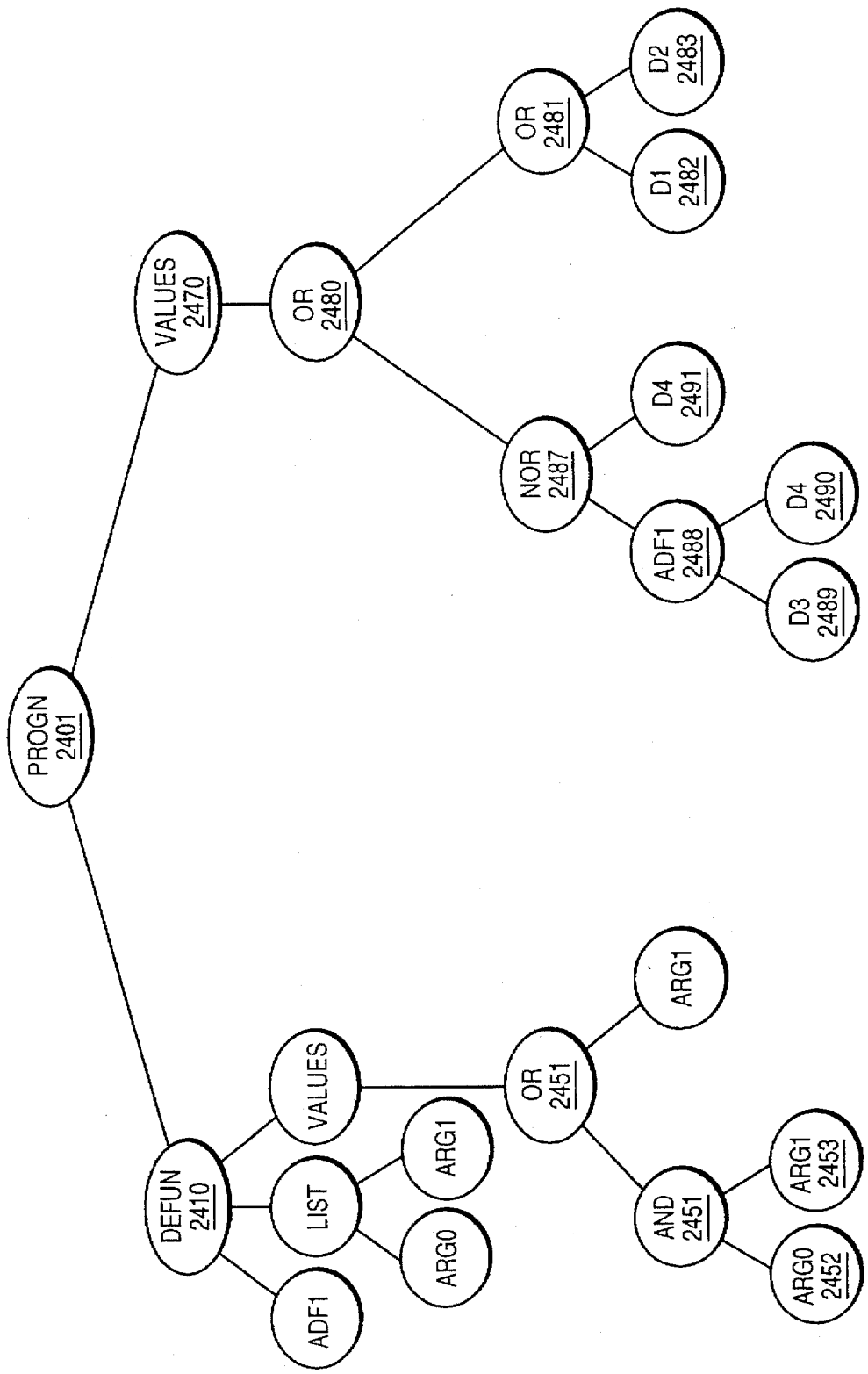
FIG. 24 illustrates the results of the operation of branch deletion on the structure in FIG. 22.

Branch deletion with random regeneration (the first alternative) can now be illustrated with FIGS. 22 and 24.

Suppose the first function-defining branch (defining ADF0) of the program in FIG. 22 is picked as the branch-to-be-deleted. The overall program is now changed by deleting this first function-defining branch, thereby decreasing its size from three to two branches. There are three invocations of ADF0 in the overall program in FIG. 22 at 2251, 2281, and 2291. FIG. 24 shows the results of employing branch deletion with random regeneration. The invocation of ADF0 at 2251 of FIG. 22 (below OR 2251) is replaced by the randomly generated argument subtree (AND ARG0 ARG1) at 2451, 2452, and 2453 of FIG. 24 (the ingredients, AND, ARG0, and ARG1 being among the permissible ingredients of the function-defining branch 2440 for ADF1). The invocation of ADF0 at 2281 of FIG. 22 is replaced by the randomly generated argument subtree (OR D1 D2) at 2481, 2482, and 2483 of FIG. 24 (the ingredients, OR, D1, and D2 being among the permissible ingredients of the main result-producing branch 2470). The invocation of ADF0 at 2291 of FIG. 22 is replaced by the randomly generated argument subtree consisting only of the single terminal D4 at 2491 (D4 being among the permissible ingredients of the main result-producing branch 2470). In this example, the argument map of the original overall program was {3, 2} in FIG. 22 and the argument map of the new overall program in FIG. 24 is {2}.

When branch deletion by consolidation (the second alternative) is employed, it is necessary to find a suitable choice for the surviving branch. Several approaches are possible. Suppose now that the first function-defining branch (defining ADF0) of the program in FIG. 22 is picked as the branch-to-be-deleted. The invocation of ADF0 at 2281 in FIG. 22 can be replaced by an invocation of the second function-defining branch (defining ADF1). This may be done by randomly generating a one argument subtree for each of the arguments possessed by the surviving branch ADF1. When the number of arguments possessed by the surviving branch is less than or equal to the number of arguments possessed by the branch-to-be-deleted (as is the case in FIG. 22), the existing argument subtrees of the branch-to-be-deleted may be used and any superfluous argument subtrees may be deleted. Thus, the invocation of ADF0 at 2281 is replaced by (ADF1 D0 D4) and the third argument subtree of ADF0 2281, namely (AND D1 D2) at 2284, 2285, and 2286, is superfluous and will be deleted. When the number of arguments possessed by the a proposed surviving branch is greater than the number of arguments possessed by the branch-to-be-deleted, the available argument subtrees may be used and the required addition argument subtrees may be randomly generated.

In one embodiment of this operation, the step of choosing the surviving branch is performed at random using a uniform probability distribution; however, this choice may also be made with a non-uniform probability distribution or a non-random way using knowledge about the particular problem domain involved.

Since branch deletion by consolidation involves two branches (i.e., the branch-to-be-deleted and the surviving branch), it is necessary that the selected program have at least two function-defining branches. Thus, when branch deletion by consolidation is being used and the selected program has less than two function-defining branches, this operation is aborted and no action is performed on this occasion.

Branch deletion by macro expansion (the third alternative) has the advantage of preserving the semantics of the overall program; however, it has the disadvantage of usually creating rather large programs. In FIG. 22, there are 11 point (starting at AND 2220) in the body of the branchto-be-deleted, ADF0. First, all 11 of these points are inserted at all three places (ADF0 2251, ADF0 2281, and ADF0 2291) where ADF0 is invoked. Then, each occurrence of a dummy variable of the just-inserted subtrees (i.e., ARG2 2222, ARG1 2223, ARG0 2226, ARG1 2227, ARG0 2229, and ARG2 2230) is replaced by the corresponding argument subtree at the particular place of insertion. For example, after the 11 point in the body of the branch-to-be-deleted, ADF0, are inserted at ADF0 2281, the two occurrences of ARG0 (from 2226 and 2229) are replaced by D0 (since D0 was the first argument subtree below ADF0 2281 prior to the insertion). Similarly, the two occurrences of ARG1 (from 2223 and 2227) are replaced by D4 (since D4 was the second argument subtree below ADF0 2281 prior to the insertion). Finally, the two occurrences of ARG2 (from 2222 and 2230) are replaced by the three-point argument subtree, (AND D1 D2), since this subtree located at AND 2284, D1 2285, and D2 2286 was the third argument subtree below ADF0 2281 prior to the insertion. The advantage of preserving the semantics of the overall program sometimes outweighs the cost (in terms of the size of the resulting program) of employing the alternative of branch deletion by macro expansion. As previously mentioned, if generalization is the goal, this alternative for branch deletion should not be used.

The objective of a deletion is often not to preserve the semantics of the overall program. Deletions provide a way to achieve generalization in problem solving procedure. Thus, if the objective is to experiment with a small amount of generalization (which, of course, may or may not be helpful in solving the problem at hand), it is distinctly undesirable to use branch deletion by macro expansion.

BRANCH CREATION

The operation of branch creation creates a new automatically defined function (ADF) within an overall program. The method of creating the new branch differs from the method used in the previously described operation of branch duplication. This operation is, in a sense, a generalization of the operation of branch duplication.

The steps in the operation of branch creation are as follows:

(1) Select a program from the population to participate in this operation.

(2) Pick a point in the body of one of the function-defining branches or result-producing branches of the selected program. This picked point will become the top-most point of the body of the branch-to-be-created.

(3) Starting at the picked point, begin traversing the subtree below the picked point in a depth-first manner.

(4) As each point below the picked point in the selected program is encountered during the traversal, make an determination as to whether to designate that point as being the top-most point of an argument subtree for the branch-to-be-created. If such a designation is made, no traversal is made of the subtree below that designated point. The depth-first traversal continues and this step (4) is repeatedly applied to each point encountered during the traversal so that when the traversal of the subtree below the picked point is completed, zero points, one point, or more than one point are so designated during the traversal.

(5) Add a uniquely-named new function-defining branch to the selected program. The argument list of the new branch consists of as many consecutively-numbered dummy variables (formal parameters) as the number of points that were designated during the depth-first traversal. The body of the new branch consists of a modified copy of the subtree starting at the picked point. The modifications to the copy are made as follows: For each point in the copy corresponding to a point designated during the traversal of the original subtree, replace the designated point in the copy (and the subtree in the copy below that designated point in the copy) by a unique dummy variable. The result is a body for the new function-defining branch that contains as many uniquely named dummy variables as there are dummy variables in the argument list of the new function-defining branch.

(6) Replace the picked point in the selected program by the name of the new function-defining branch. If no points below the picked point were designated during the traversal, the operation of branch creation is now completed.

(7) If one or more points below the picked point were designated during the traversal, the subtree below the just-inserted name of the new function-defining branch will be given as many argument subtrees as there are dummy arguments in the new function-defining branch as follows: For each point in the subtree below the picked point designated during the traversal, attach the designated point and the subtree below it as an argument to the function whose name was just inserted in the new function-defining branch.

Several different methods may be used to determine how to designate a point below the picked point during the depth-first traversal described above. Angeline and Pollack describes an operation called compress/on (also called module acquisition). In depth compress/on described by Angeline and Pollack, the points at a certain distance (depth) below the picked point are designated. In leaf compress/on described by Angeline and Pollack, all of the external points (leaves) below the picked point are designated. Other methods of designation may be used. In the present invention, internal points below the picked point are designated independently at random with a certain probability. Regardless of the method of designation, zero points, one point, or several points are designated.

The compression operation described by Angeline and Pollack differs from the operation of branch creation described herein, in at least three ways. First, Angeline and Pollack place each new function (called a module) created by the compression operation into a Genetic Library. The new function is not specifically associated with the selected program that gave rise to it. Instead, new functions placed in the Genetic Library may be invoked by any program in the population as soon as crossover, reproduction, mutation, or other operations cause references to the new function to proliferate throughout the population. In contrast, in the branch creation operation described herein, each new function is made a part of the selected program as a new branch of that program. The new function may be invoked only by the selected program in which it was originally created and of which it is a part.

A second difference between the compression (module acquisition) operation described by Angeline and Pollack and operation of branch creation described herein is that the body of the new branch created by the branch creation operation continues to be subject to the effects of other operations (notably crossover) in successive generations of the process. Thus, instead of being insulated from future change by residing in the Genetic Library, it is susceptible to continued change. Among the possible changes that may occur are the insertion (by means of crossover) of additional hierarchical references to other automatically-defined functions.

A third difference between the compression (module acquisition) operation described by Angeline and Pollack and operation of branch creation described herein is that the branch creation operation may be applied to any branch (and, in particular, to function-defining branches). Angeline and Pollack's operation was limited to one a single branch.

Figure 25:
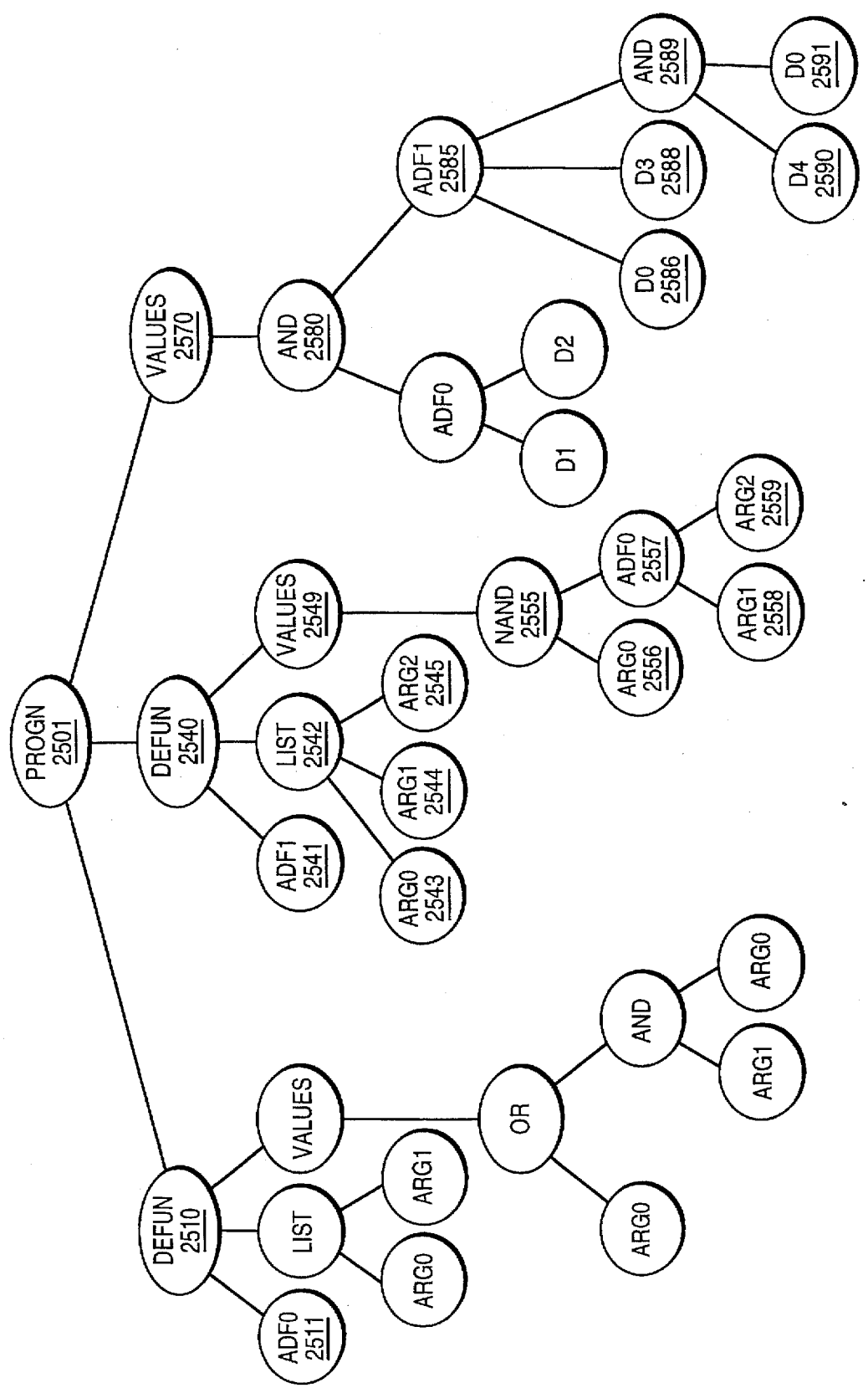
FIG. 25 illustrates the results of the operation of branch creation on the structure in FIG. 22.

FIG. 18 and 25 provide one illustration of the operation of branch creation. Suppose the point NAND 1885 is picked from the result-producing branch of the program starting at PROGN 1801 in FIG. 18. There are seven points (1885 through 1891) in the subtree of which the picked point, NAND 1885, is the top-most point.

Starting at the picked point, NAND 1885, a depth-first traversal of the subtree below the picked point would visit 1886, 1887, 1888, 1889, 1890 and 1891 in that order.

Suppose, while making this depth-first traversal, points 1886, 1888, and 1889 were designated. The three argument subtrees starting at these three designated points will thus become arguments for the branch-to-be-created. Because point 1889 was designated, no traversal of D4 1890 and D0 1891 is made.

The branch creation operation causes a new branch to be added to the overall selected program. The new branch starts at DEFUN 2540. The new branch is given a new name, ADF1 (at 2541), that is unique within the selected program. The argument list of this new branch contains three consecutively-numbered dummy variables (formal parameters), namely ARG0 2543, ARG1 2544, and ARG2 2545 appearing below LIST 2542.

The body of this new branch starts at VALUES 2549. The body of the new branch consists of a modified copy of the seven-point subtree starting at the picked point, NAND 1885. In modifying the copy, each of the three designated points (1886, 1888, and 1889) is replaced by a different consecutively-numbered dummy variable, ARG0, ARG1, and ARG2. Specifically, the first designated point, D0 1886, is replaced by ARG0 and appears as ARG0 2556 in FIG. 25. The second designated point, D3 1888, is replaced by ARG1 and appears as ARG1 2558. The third designated point, AND 1889 and the subtree below this designated point (i.e., D4 1890 and D0 1891) are replaced by ARG2 and appears as ARG2 2559.

Picked point, NAND 1885, is now replaced by the name, ADF1, of the new function-defining branch. It appears as ADF1 2585 in FIG. 25. Since three points below NAND 1885 were designated during the traversal, ADF1 2585 will be given three argument subtrees. The first designated point, D0 1886, is attached below ADF1 2585 and appears as D0 2586 in FIG. 25 as the first argument to ADF1 2585. D0 2586 appears alone in FIG. 25 because there was no subtree below it in FIG. 18 (i.e., D0 was a terminal). The second designated point, D3 1888, is attached below ADF1 2585 and appears as D3 2588 in FIG. 25 as the second argument to ADF1 2585. Again, D3 2588 appears alone in FIG. 25 because there was no subtree below it in FIG. 18. The third designated point, AND 1889, is attached below ADF1 2585 and appears as AND 2589 in FIG. 25 as the third argument to ADF1 2585. AND 1889 had a subtree below it, so (AND D4 D0) at 1889, 1890, and 1891 appears as (AND D4 D0) at 2589, 2590, and 2591. In this example, the argument map of the original overall program was {2} and the argument map of the new overall program in FIG. 25 is {2, 3} because the new branch (i.e., ADF1) now takes three arguments.

Note that ADF0 1887 happened to appear in the subtree below the picked point NAND 1885. It appears as ADF0 2557 in the new branch DEFUN 2540 defining the new function ADF1 2541. Since ADF0 was already defined (otherwise it would not have appeared at 1887 in the result-producing branch 1870 of the selected program in the first place), it is defined at the time when it is invoked within ADF1 at ADF0 2557.

Figure 26:
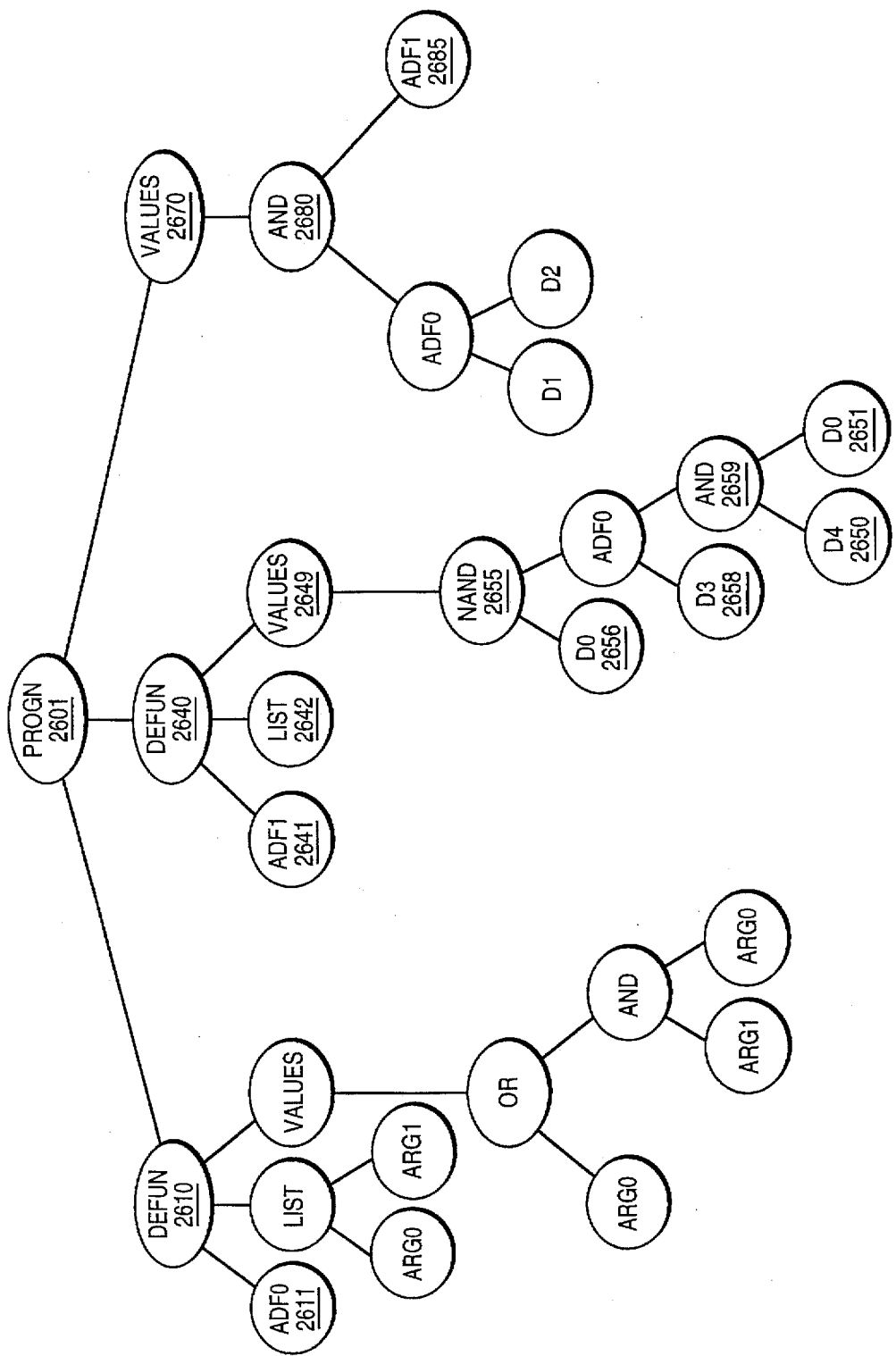
FIG. 26 illustrates the results of the operation of branch deletion on the structure in FIG. 22.

FIGS. 18 and 26 illustrate a special case of the operation of branch creation. Suppose the point NAND 1885 is again picked from the result-producing branch of the program starting at PROGN 1801 in FIG. 18. However, now suppose that, while making the depth-first traversal, no points were designated. As before, the branch creation operation causes a new branch to be added to the overall selected program. The new branch starts at DEFUN 2640. The new branch is given a new name, ADF1 (at 2641). However, since no points were designated during the traversal, the argument list of this new branch contains no dummy variables. There are no dummy arguments below LIST 2642. The body of this new branch starts at VALUES 2649. However, since no points were designated during the traversal, the body of the new branch consists of an exact copy of the seven-point subtree starting at the picked point, NAN D 1885. In particular, four of the five the actual variables of the problem (D0 2656, D3 2658, D4 2650, and D0 2651) appear in the body of the function definition for ADF1. As before, the picked point, NAND 1885, is replaced by the name, ADF1 2685, of the new function-defining branch. Since no points below NAND 1885 were designated during the traversal, ADF1 2685 is given no argument subtrees. Thus, in this special case, the entire subtree containing the picked point, NAND 1885, and the subtree below it is encapsulated in the zero-argument automatically defined function ADF1. In this example, the argument map of the original overall program was {2} and the argument map of the new overall program in FIG. 26 is {2, 0}.

The overall programs in the foregoing examples all had exactly one result-producing branch; however, the techniques described also apply to multi-action programs having more than one result-producing branch. The frequency of use of the operations of branch duplication, argument duplication, branch deletion, argument deletion, and branch creation are controlled by parameters. Frequencies of 1% on each generation (a convenient grouping of consecutive operations acting on a number of individuals equal to the population) are currently preferred starting with generation 1.

As operations of branch duplication, argument duplication, branch deletion, argument deletion, and branch creation are used repeatedly, individuals in the population will be modified by a series of applications of these architecturally-altering operations. At the same time, individuals in the population will be modified by a series of the genetic operations of crossover and mutation. In addition, the Darwinian selection and the reproduction operation causes differential selection in favor of more fit individuals. In addition, other operations (such as permutation, editing and encapsulation) may be performed.

The operation of branch creation as defined above always produces a syntactically valid program. In the event that one or more branches of an overall program were constructed in accordance with some specified constrained syntactic structure, these constraints will also be satisfied by the program produced by this operation. This operation does not have any immediate effect on the value(s) returned and the action(s) performed by the selected program. However, subsequent operations may alter the branch that is created by this operation and may therefore lead to some later divergence in structure and behavior.

ARGUMENT CREATION

The operation of argument creation creates a new argument within a function-defining branch of an overall program. The method of creating the new argument differs from the method used in the previously described operation of argument duplication. This operation is, in some sense, a generalization of the operation of argument duplication.

The steps in the operation of argument creation are as follows:

(1) Select a program from the population to participate in this operation.

(2) Pick a point in the body of one of the function-defining branches of the selected program.

(3) Add a uniquely-named new argument to the argument list of the picked function-defining branch for the purpose of defining the argument-to-be-created.

(4) Replace the picked point (and the entire subtree below it) in the picked function-defining branch by the name of the new argument.

(5) For each occurrence of an invocation of the picked function-defining branch anywhere in the selected program (e.g., the result-producing branch or other branch that may invoke the picked function-defining branch), add an additional argument subtree to that invocation. In each instance, the added argument subtree consists of a modified copy of the picked point (and the entire subtree below it) in the picked function-defining branch. The modification is made as follows: For each dummy argument in a particular added argument subtree, replace the dummy argument with the entire argument subtree of that invocation corresponding to that dummy argument.

Figure 30:
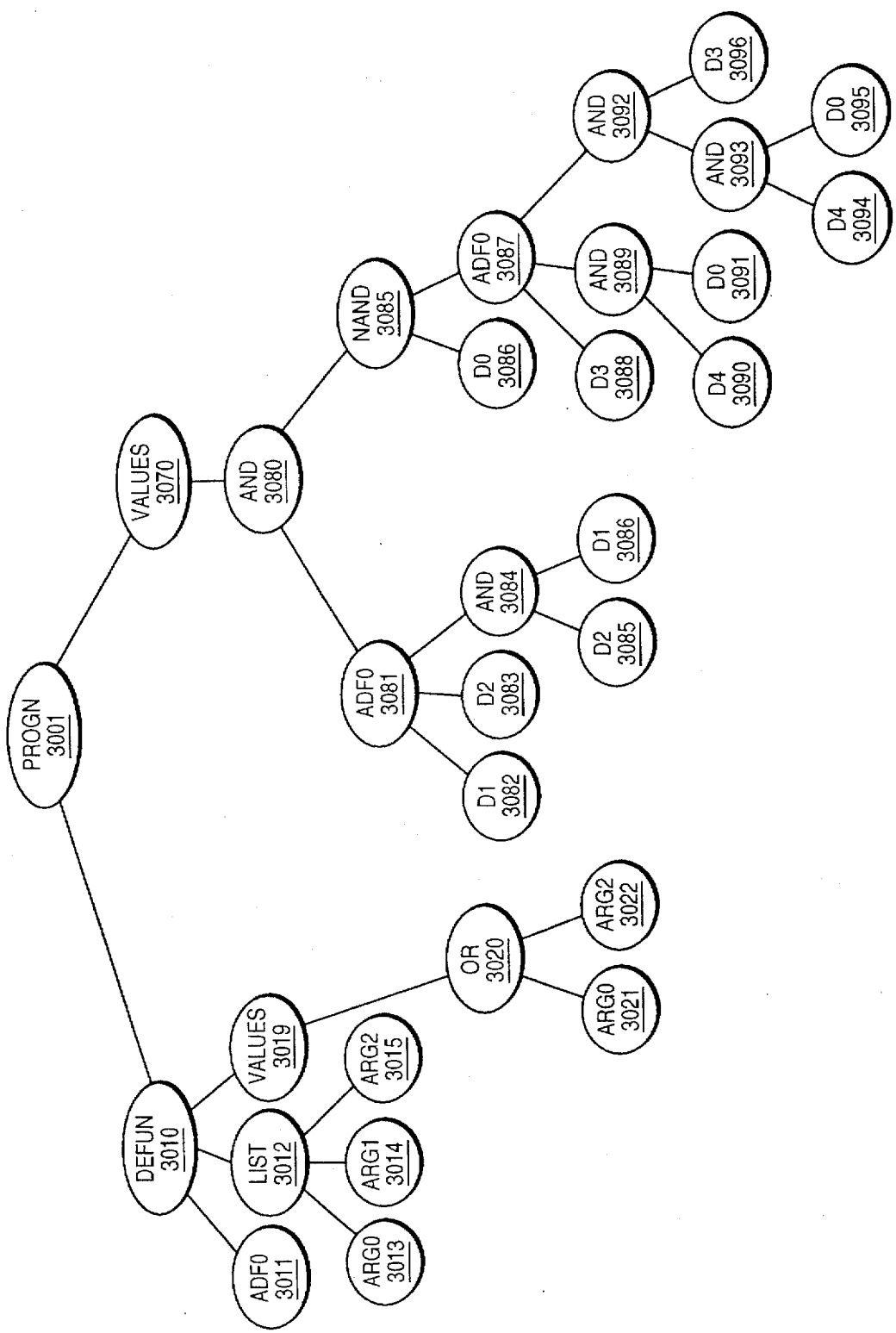
FIG. 30 illustrates the operation of argument creation of the present invention.

FIG. 18 and 30 illustrate the operation of argument creation. Suppose the point AND 1822 is the picked point in the body of the function-defining branch of the program starting at DEFUN 1810 in FIG. 18. In FIG. 30, ARG2 3015 is the uniquely-named new argument that has been added to the argument list starting at LIST 3012 of the picked function-defining branch starting at DEFUN 3010. ARG2 is the newly created argument to DEFUN 3010. In FIG. 30, ARG2 3022 has replaced the picked point, AND 1822 from FIG. 18, and the entire subtree below the picked point (i.e., the two points ARG1 1823 and ARG0 1824 from FIG. 18). There are two occurrences of invocations of the picked function-defining branch (i.e., ADF0) in the selected program. They are in the result-producing branch at ADF0 1881 and ADF0 1887 in FIG. 18. The first invocation of ADF0 in the selected program is the two-argument invocation (ADF0 D1 D2) at 1881, 1882, and 1883 in FIG. 18. A new third argument is added for the invocation ADF0 1881. The new argument subtree is manufactured by starting with a copy of the picked point and the entire subtree below that picked point from FIG. 18, namely (AND ARG1 ARG0) at 1822, 1823, and 1824. This copy is first modified by replacing the dummy argument ARG1 1823 by the argument subtree of the invocation of ADF0 at 1881 corresponding to the dummy argument ARG1 1823 (i.e., the single point D2 1883). Note that it is D2 1883 that corresponds because D2 1883 is the second argument subtree of ADF0 1881 and because ARG1 is the second dummy argument of DEFUN 1810 (i.e., ARG0 is the first since the numbering of dummy arguments, by convention, starts at zero). The copy is further modified by replacing the dummy argument ARG0 1824 by the argument subtree of the invocation of ADF0 at 1881 corresponding to that dummy argument (i.e., the single point D1 3082). The result is that ADF0 is now invoked at 3081 with three (instead of two) arguments, namely (ADF0 D1 D2 (AND D2 D1)).

The second invocation of ADF0 in the selected program is the two-argument invocation (ADF0 D3 (AND D4 D0)) at 1887, 1888, 1889, 1890 and 1891 in FIG. 18. A new third argument is added for the invocation ADF0 1887. The new argument subtree is manufactured by starting with a copy of the picked point and the entire subtree below that picked point from FIG. 18, namely (AND ARG1 ARG0) at 1822, 1823, and 1824. This copy is first modified by replacing the dummy argument ARG1 1823 by the argument subtree of the invocation of ADF0 at 1887 corresponding to the dummy argument ARG1 1823, namely the entire argument subtree (AND D4 D0) at 1889, 1890, and 1891. Note that a three-point subtree, (AND D4 D0), corresponds because it is the second argument subtree of ADF0 1887 and because ARG1 is the second dummy argument of DEFUN 1810. The copy is further modified by replacing the dummy argument ARG0 1824 by the argument subtree of the invocation of ADF0 at 1887 corresponding to that dummy argument (i.e., the single point D3 1888). The result is that ADF0 is now invoked at 3087 with three (instead of two) arguments, namely (ADF0 D3 (AND D4 D0) (AND (AND D4 D0) D3)).

The operation of argument creation changes the argument map of the selected program from {2} to {3} because ADF0 now takes three arguments, instead of two.

The operation of argument creation as defined above always produces a syntactically valid program. In the event that one or more branches of an overall program were constructed in accordance with some specified constrained syntactic structure, these constraints will also be satisfied by the program produced by this operation. This operation does not have any immediate effect on the value(s) returned and the action(s) performed by the selected program. However, subsequent operations may alter the argument that is created by this operation and may therefore lead to some later divergence in structure and behavior.

STRUCTURE-PRESERVING CROSSOVER IN AN ARCHITECTURALLY DIVERSE POPULATION

The new genetic operations described herein create overall programs that differ as to the number of function-defining branches and as to the number of arguments that each branch possesses. This fact alone means that the population will become architecturally diverse as soon as the process gets underway. In addition, in one implementation, the population is initially created with architectural diversity. Architectural diversity creates a problem as to how to perform crossover to produce syntactically valid offspring.

In one embodiment, structure-preserving crossover with automatic function definitions is one-offspring crossover. In one-offspring crossover operation, a crossover point is randomly chosen in each of two parents and genetic material from one parent is then inserted into a part of the other parent to create an offspring. When automatically defined functions are involved, each program in the population conforms to a constrained syntactic structure.

Because of the architectural diversity, crossover is performed in a structure-preserving way so as to preserve the syntactic validity of all offspring.

Some of the points in an overall program are invariant over the entire population. As FIG. 18 and the other Figures shown, every program in the population has a certain invariant structure. This invariant structure consists of (1) the PROGN 1801 (and similar PROGNs in other figures) appearing as the top-most function of the overall program, (2) DEFUN 1810 for the first function-defining branch appearing as the first argument of PROGN 1801, (3) a name (such as ADF0 1811 in FIG. 18) appearing as the first argument below DEFUN 1810, (4) the function LIST 1812 appearing as the second argument below DEFUN 1810, (5) dummy arguments (such as ARG0 1813 and ARG1 1814 in FIG. 18) appearing below LIST 1812 (assuming that the function being defined by DEFUN 1810 takes two dummy arguments), (6) the VALUES 1819 of the first function-defining branch appearing as the third argument below DEFUN 1810, (7) additional occurrences of items (2), (3), (4), (5), and (6) for each additional function-defining branch, and (8) the VALUES 1870 of the result-producing branch appearing as the final argument of PROGN 1801.

Structure-preserving crossover never involves or alters the eight kinds of invariant points of an overall program listed above, so none of these invariant points are ever eligible to be crossover points in structure-preserving crossover. Instead, structure-preserving crossover is restricted to the work-performing points. The work-performing points are the bodies of the result-producing branch and the function-defining branch(es). They are points such as OR 1820 and the four points below OR 1820 and points such as AND 1880 and the 10 points below AND 1880.

DIFFERENT WAYS OF TYPING WORK-PERFORMING POINTS

Every work-performing point in the overall program is assigned a type. The work-performing points correspond to the bodies (work) of the function-defining branches and the result-producing branch(es) and were called "noninvariant" points in Koza (1994).

The basic idea of structure-preserving crossover is that any work-performing point anywhere in the overall program is randomly chosen, without restriction, as the crossover point of the first parent. Then, once the crossover point of the first parent has been chosen, the crossover point of the second parent is randomly chosen from among points of the same type. The typing of the work-performing points of an overall program constrains the set of subtrees that can potentially replace the chosen crossover point and the subtree below it. This typing is done so that the structure-preserving crossover operation will always produce valid offspring.

There are several ways of assigning types to the work-performing points of an overall program.

(1) Branch typing assigns a different type uniformly to all the work-performing points of each separate branch of an overall program. There are as many types of work-performing points as there are branches in the overall program. In the special case where there is only one branch in the overall program (i.e., there are no function-defining branches), branch typing assigns a single type to all the work-performing points of the program.

(2) Like Branch Typing assigns the same type uniformly to all the work-performing points of each branch composed from exactly the same function sets and terminal sets (while assigning different types uniformly to branches with different ingredients).

(3) Point typing assigns a type to each individual work-performing point in the overall program. The type assigned reflects the function set of the branch where the point is located, the terminal set of the branch where the point is located, the argument map of the function set of the branch where the point is located, and any syntactic constraints applicable to the branch where the point is located.

Branch typing can be illustrated using the program shown in FIG. 18. In branch typing, a first type (perhaps called "type I") is assigned to all five points (1820, 1821, 1822, 1823, and 1824) in the body of the function-defining branch and a second type (called "type II") is assigned to all the work-performing points (1880 through 1891) in the body of the result-producing branch.

When structure-preserving crossover is performed with branch typing, any work-performing point anywhere in the overall program (i.e., any of the 16 points of types I or II) may be chosen, without restriction, as the crossover point of the first parent. However, the crossover point of the second parent must be chosen only from among points of this same type. In the context of FIG. 18 (with only one function-defining branch), if the crossover point of the first parent is from the function-defining branch (one of the five points of type I), the crossover point of the second parent is restricted to its function-defining branch (its type I points); if the crossover point of the first parent is from the result-producing branch (type II), the crossover point of the second parent is restricted to its result-producing branch (its type II points). In other words, in the context of the simple program of FIG. 18, structure-preserving crossover will either exchange a subtree from a function-defining branch only with a subtree from another function-defining branch or it will exchange a subtree from a result-producing branch only with a subtree from another result-producing branch. The restriction on the choice of the crossover point of the second parent ensures the syntactic validity of the offspring.

If an overall program has more than one function-defining branch, a choice arises as to how to assign a type to each additional function-defining branch. If a second function-defining branch is composed of different ingredients, then the second branch is assigned a type of its own. For example, the second function-defining branch in FIG. 19 can contain references to ADF0, whereas the first function-defining branch (defining ADF0) does not contain references to ADF0 (itself) or to ADF1 (which is higher in the calling hierarchy). In that event, the second function-defining branch would be assigned a new type of its own (when branch typing is being used). If a second branch is composed of identical ingredients to an earlier branch, the second branch may be assigned a type of its own or may be assigned the same type as the earlier branch (called "like branch typing").

POINT TYPING

Once the population becomes architecturally diverse, the parents selected to participate in the crossover operation will usually possess different numbers of automatically defined functions. Moreover, an automatically defined function with a certain name (e.g., ADF2) belonging to one parent will often possess a different number of arguments than the same-named automatically defined function belonging to the other parent (if indeed ADF2 is present at all in the second parent).

If, hypothetically, branch-typing or like-branch typing were to be used on an architecturally diverse population, the crossover operation would be virtually hamstrung; hardly any crossovers could occur. The types produced by branch typing are insufficiently descriptive and overly constraining in an architecturally diverse population. Note that after a crossover is performed, each call to an automatically defined function actually appearing in the crossover fragment from the contributing parent will no longer refer to the automatically defined function of the contributing parent, but instead will refer to the same-named automatically defined function of the receiving parent. Consequently, the restriction on the choice for the crossover point of the receiving (second) parent must be different. The crossover point of the receiving (second) parent (called the point of insertion) must be chosen from the set of points such that the crossover fragment from the contributing (first) parent "has meaning" if the crossover fragment from the contributing parent were to be inserted at the chosen point of insertion into the receiving parent. Thus, crossover operations using point typing are directional and are usually one-offspring crossover.

As will be seen, structure-preserving crossover with point typing permits robust recombination while simultaneously guaranteeing that any pair of architecturally different parents will produce syntactically and semantically valid offspring. When genetic material is inserted into the receiving parent during structure-preserving crossover with point typing, the offspring inherits its architecture from the receiving parent and is guaranteed to be syntactically and semantically valid.

Point typing is governed by three general principles. First, every terminal and function actually appearing in the crossover fragment from the contributing parent must be in the terminal set or function set of the branch of the receiving parent containing the point of insertion. This first general principle applies to actual variables of the problem, dummy variables, random constants, primitive functions, and automatically defined functions. Second, the number of arguments of every function actually appearing in the crossover fragment from the contributing parent must equal to the number of arguments specified for the same-named function in the argument map of the branch of the receiving parent containing the insertion point. This second general principle governing point typing applies to all functions. However, the emphasis is on the automatically defined functions because the same function name is used to represent entirely different functions with differing number of arguments for different individuals in the population. Third, all other syntactic rules of construction of the problem must be satisfied.

For clarity and ease of implementation, the three general principles above governing point typing can be restated as the following seven conditions. A crossover fragment from a contributing parent is said to have meaning at a chosen crossover point of the receiving parent if the following seven conditions are satisfied:

(1) All the actual variables of the problem, if any, actually appearing in the crossover fragment from the contributing parent must be in the terminal set of the branch of the receiving parent containing the point of insertion.

(2) All the dummy variables, if any, actually appearing in the crossover fragment from the contributing parent must be in the terminal set of the branch of the receiving parent containing the point of insertion.

(3) All the automatically defined functions, if any, actually appearing in the crossover fragment from the contributing parent must be in the function set of the branch of the receiving parent containing the point of insertion.

(4) All the automatically defined functions, if any, actually appearing in the crossover fragment from the contributing parent must have exactly the number of arguments specified for that automatically defined function for the branch of the receiving parent containing the point of insertion.

(5) All functions (other than automatically defined functions) must also satisfy conditions (3) and (4).

(6) All terminals (other than dummy variables and actual variables of the problem already mentioned in conditions (1) and (2), if any, actually appearing in the crossover fragment from the contributing parent must be in the terminal set of the branch of the receiving parent containing the point of insertion.

(7) All other syntactic rules of construction of the problem must be satisfied.

The first condition will usually be satisfied if both crossover points are from the result-producing branch of their respective parents. For the even-5-parity problem, the actual variables of the problem, D0, D1, D2, D3, and D4, appear in the result-producing branch. Moreover, they appear only in the result-producing branch.

The second condition requires that the argument list of the branch of the receiving parent into which the crossover fragment from the contributing parent is being inserted must contain all the dummy variables, if any, contained in the crossover fragment. Since dummy variables may not appear in the result-producing branch, this second condition applies only to crossovers between function-defining branches.

There are several implications of the third condition which requires that all automatically defined functions in the crossover fragment must be in the function set of the branch in which they are to be inserted. This condition specifies that it is only permissible to have an automatically defined function in a crossover fragment if that automatically defined function has already been defined at the point of insertion of the receiving parent. In the context of the even-5-parity problem where each function-defining branch is allowed to refer hierarchically to every already-defined (i.e., lower numbered) automatically defined function, this means that the number of every automatically defined function referenced from within a crossover fragment must be lower than the number of the automatically defined function being defined by the branch of the receiving parent containing the point of insertion. For example, a crossover fragment containing a reference to ADF1 may be inserted into the branch defining ADF2 of the receiving parent, but may not be inserted into branches defining ADF0 (or ADF1) of the receiving parent.

The fourth condition requires that the number of arguments taken by each automatically defined function in a crossover fragment from the contributing parent exactly match the number of arguments in the argument list of the branch of the receiving parent that defines the same-named automatically defined function. For example, a crossover fragment from a contributing parent containing a four-argument call to ADF0 cannot be inserted into any branch of a receiving parent unless the branch of the receiving parent that defines ADF0 specifies that ADF0 can take exactly four arguments.

The fifth condition merely restates the omnipresent requirement that a non-ADF function cannot be imported into a branch unless it is permitted to be included in that branch by the function set of that branch. This condition (and the sixth condition) are presented separately in order to highlight the issues related to automatically defined functions.

The sixth condition similarly restates the general requirement that any other type of terminal (e.g., random constants, zero-argument primitive functions being treated as terminals) cannot be imported into a branch unless it is permitted to be included in that branch by the terminal set of that branch.

The seventh condition covers the fact that all of the other syntactic rules of construction of the problem must always continue to be satisfied. Although there are no syntactic constraints in the even-5-parity problem beyond those required to implement the automatically defined functions themselves, other problems, such as those involving decision trees, have additional syntactic constraints.

Figure 27:
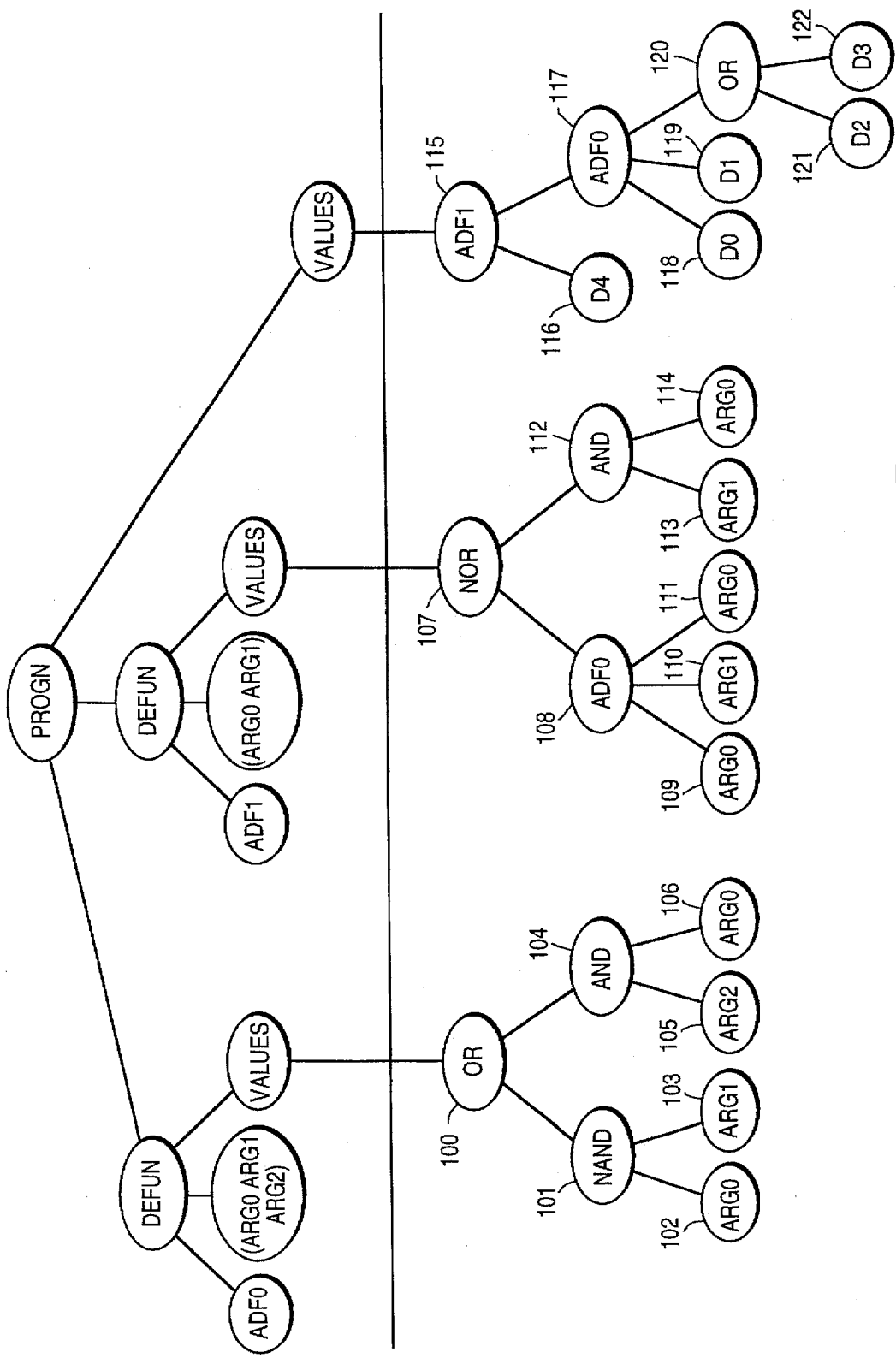
FIG. 27 illustrates an example program.

FIG. 27 shows an illustrative program, called parent A. The argument map for the automatically defined functions belonging to this overall program is {3, 2}. Parent A has two function-defining branches and one result-producing branch. The first function-defining branch of parent A defines a three-argument function (ADF0) and its second function-defining branch defines a two-argument function (ADF1). ADF1 can refer hierarchically to ADF0. If one were planning to perform structure-preserving crossover using branch typing, there would only be three types of points in the overall program. The points of the body of the three-argument ADF0 would be of type I; the points of the two-argument ADF1 would be of type II; and the points of the result-producing branch would be of type III.

FIG. 28 shows another illustrative program, called parent B, with an argument map of {3, 2, 2} for its automatically defined functions. Parent B has three function-defining branches and one result-producing branch. The first function-defining branch defines a three-argument function (ADF0); the second function-defining branch defines a two-argument function (ADF1); and the third function-defining branch defines a two-argument function (ADF2). The usual hierarchy of dependencies applies here in that ADF1 can refer hierarchically to ADF0 and ADF2 can refer hierarchically to both ADF0 and ADF1. If one were planning to perform structure-preserving crossover using branch typing, the points of ADF0, ADF1, ADF2, and the result-producing branch would be of four different types.

Structure-preserving crossover (e.g., one-offspring crossover) with point typing is now illustrated using parents A and B. Suppose point 101 (labeled NAND) from ADF0 is chosen as the crossover point from contributing parent A (FIG. 27). The crossover fragment rooted at point 101 is (NAND ARG0 ARG1). Now consider the eligibility of a point such as 207 (labeled NAND) of ADF1 of parent B (FIG. 28) to be a point of insertion. The eligibility of point 207 is determined by examining the terminal set, the function set, and the ordered set containing the number of arguments associated with each function in the function set of the receiving parent.

The terminal set for ADF1 of the receiving parent (parent B) is $$T_{adf1}=\{ARG0, ARG1\}$$

The function set for ADF1 of the receiving parent (parent B) is $$F_{adf1}=\{ADF0, AND, OR, NAND, NOR\}$$

with an argument map for this function set of

{3, 2, 2, 2, 2}.

Point 207 is eligible to be a crossover point in parent B to receive the crossover fragment (NAND ARG0 ARG1) rooted at point 101 of parent A because both ARG0 and ARG1 are in the terminal set, $T_{adf1}$, of ADF1 of receiving parent B, because NAND is in the function set, $F_{adf1}$, of ADF1 of receiving parent B, and because the NAND function from contributing parent A takes the same number of arguments (two) as the same-named function, NAND, takes in receiving parent B.

In fact, all eight points (points 207 through 214) are eligible to be chosen as the point of insertion of parent B because the crossover fragment (NAND ARG0 ARG1) is valid throughout ADF1 of parent B. In addition, all ten points of ADF2 of parent B (points 215 through 224) are also eligible to be chosen as the point of insertion of parent B because the crossover fragment chosen in parent A is also valid throughout ADF2. All seven points of ADF0 of parent B (200 through 206) are also acceptable points of insertion for this crossover fragment. Thus, when point typing is being used and the crossover fragment rooted at point 101 of parent A is chosen, a total of 25 points of parent B are eligible to receive this crossover fragment.

If point 104 labeled AND from ADF0 is chosen as the crossover point of parent A, no point within ADF1 or ADF2 of parent B is eligible to be chosen. The reason is that the crossover fragment (AND ARG2 ARG0) that is rooted at point 104 contains the dummy variable ARG2. ADF1 and ADF2 of parent B both take only two dummy variables, ARG0 and ARG1. ARG2 is not in the argument list of either ADF1 or ADF2 of parent B. The terminal set of ADF1 (shown above) does not contain ARG2. The terminal set of ADF2 of parent B happens to be the same as that of ADF1 and also does not contain ARG2. The second condition above would be violated for such a choice. In fact, the only points of parent B that are eligible as points of insertion are the seven points (200 through 206) of ADF0 of parent B.

If point 112 labeled AND from ADF1 is chosen as the crossover point of parent A, then all seven points of ADF0 of parent B (200 through 206), all eight points of ADF1 of parent B (points 207 through 214), and all ten points of ADF2 of parent B (points 215 through 224) are now eligible to be chosen as the point of insertion of parent B because the crossover fragment (AND ARG1 ARG0) is valid throughout ADF0, ADF1, and ADF2 in parent B.

However, if point 108 labeled ADF0 from ADF1 is chosen from parent A as the crossover point, no point within ADF0 of the second parent may be chosen. The function set for ADF0 of parent B, the receiving parent, is $$F_{adf0}=\{AND, OR, NAND, NOR\}$$

with an argument map for this function set of

{2,2,2,2} and this function set does not contain ADF0 (i.e., recursion is not permitted here). The third condition above would be violated for such a choice. The same applies to point 107 labeled NOR because ADF0 appears within the crossover fragment rooted at this point.

In contrast, all ten points of ADF2 of parent B (points 215 through 224) are eligible since ADF2 is permitted to refer hierarchically to ADF0. The function set for ADF2 of parent B is $$F_{adf2}=\{ADF0, ADF1, AND, OR, NAND, NOR\}$$

with an argument map for this function set of

{3,2,2,2,2,2}.

The second condition is illustrated by considering points 225 through 232 from the result-producing branch of parent B. None of these points is eligible to be chosen as the point of insertion for any of the above cases because all of the crossover fragments contain dummy variables which are not in the terminal set of the result-producing branch.

The first condition can be illustrated by considering points 115 through 122 from the result-producing branch of parent A. If any point from the result-producing branch of parent A is chosen as the crossover point of parent A, then only points in the result-producing branch of parent B (points 225 through 232) may be chosen as the point of insertion of the second parent because the actual variables of the problem, D0, D1, D2, D3, and D4, are, for this problem, in the terminal set of only the result-producing branch of the overall program.

Point typing imposes a directionality on structure-preserving crossover that does not arise with branch typing. For example, when point 101 from ADF0 is chosen as the crossover point of parent A, a point such as 211 of ADF1 of parent B is eligible to be chosen as the point of insertion of parent B because the crossover fragment (NAND ARG0 ARG1) is valid anywhere in ADF1 of parent B. However, crossover is not possible from parent B to parent A, given the selection of these two points. The subtree (ADF0 ARG0 ARG1 ARG1) rooted at point 211 of parent B is not eligible for insertion at point 101 of ADF0 of parent A because ADF0 is not yet defined at point 101 of parent A. Because of this asymmetry, the simplest approach to implementing point typing is to produce only one offspring each time two parents are selected to participate in crossover. This is called single-offspring crossover.

Now suppose that the roles of parents A and B are reversed and parent B (FIG. 28) becomes the contributing parent while parent A (FIG. 27) becomes the receiving parent. There are three different possibilities for the ten points of the branch defining ADF2 of parent B when they are chosen as the crossover point.

First, if the point 216 labeled ADF1 from ADF2 of parent B is chosen as the crossover point of the contributing parent, none of the eight points (107 through 114) of ADF1 of parent A and none of the seven points (100 through 106) of ADF0 of parent A may be chosen because ADF1 is not allowed in ADF0 or ADF1. The same applies to point 215 (labeled OR) because point 216 (labeled ADF1) appears within the crossover fragment rooted at point 215. After selecting the two parents to participate in crossover and choosing the crossover point from the contributing parent, an attempt is made to choose a valid crossover point from the receiving parent. If the set of eligible points in the second parent proves to be empty, the second parent is discarded and a new selection is made for the second parent to mate with the first parent. Note that no crossover ever fails completely due to the constraints imposed by point typing because there is always at least one eligible point of insertion (e.g., when a program mates with itself).

Second, if the point 219 labeled ADF0 from ADF2 of parent B is chosen as the crossover point of the contributing parent, any point of the eight points (107 through 114) of ADF1 of parent A can now be chosen as the point of insertion since the entire crossover fragment rooted at point 219 is allowed in ADF1 of the receiving parent; however, it is still true that none of the seven points (100 through 106) of ADF0 of parent A may be chosen because a reference to ADF0 is not permitted in ADF0.

Third, if points such as 217, 218, 220, 221,222, 223, or 224 from ADF2 of parent B are chosen, the constraints imposed by point typing permit any point of ADF0 or ADF1 of parent A to be chosen. The unrelated convention used throughout this book of never choosing a root as the point of insertion for a crossover fragment consisting only of a single terminal would have the effect of preventing points 100 and 107 of parent A from being chosen for terminal points 217, 218, 220, 221,223, or 224 (but they could be chosen for point 222).

Figure 29:
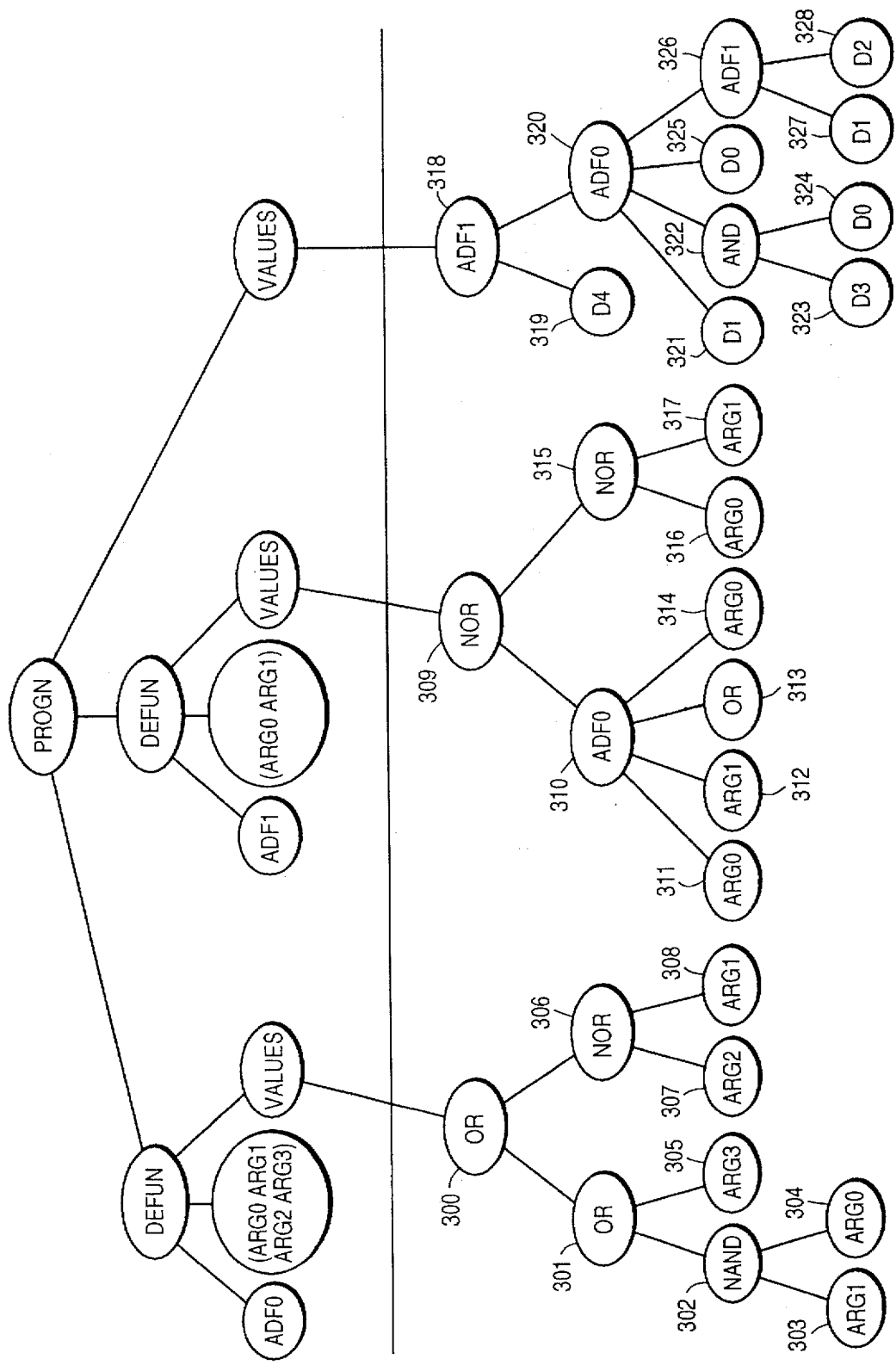
FIG. 29 depicts another example of a program.

FIG. 29 shows parent C with an argument map of {4, 2} for its automatically defined functions. Parent C has two function-defining branches and one result-producing branch. The first function-defining branch defines a four-argument function (ADF0), and the second function-defining branch defines a two-argument function (ADF1).

New situations arise when parent B (FIG. 28) is chosen to be the first (contributing) parent while parent C (FIG. 29) is chosen to be the second (receiving) parent.

If either point 211 (labeled ADF0) from ADF1 of contributing parent B or point 219 (also labeled ADF0) from ADF2 of parent B is chosen as a crossover point of the contributing parent, then the crossover fragment contains a reference to a three-argument ADF0. No point in receiving parent C is eligible to be chosen as the point of insertion for this fragment because ADF0 takes four arguments in parent C and the occurrences of ADF0 in these crossover fragments from parent B take only three arguments. That is, the fourth condition above would be violated by either of these choices. The same applies to points 207 and 215. Note that this ineligibility arises only in relation to a particular receiving parent; these same points are eligible to be crossover points when the ADF0 belonging to the receiving parent takes three arguments.

Similarly, points such as 227 (labeled ADF0) and 225 (labeled AND) from the result-producing branch of parent B cannot find a home in parent C because a crossover fragment rooted at those points would contain a three-argument reference to ADF0.

Point typing enables genetic recombination to occur in an architecturally diverse population. The architecture of the single offspring produced by one-offspring crossover employing point typing is always the same as the architecture of the receiving parent participating in the crossover. An individual with an architecture appropriate for solving the problem can thus emerge during a run of the evolutionary process, while the problem is simultaneously being evolved.

BENEFITS OF THE NEW OPERATIONS OPERATING ALONE

The new architecture-altering genetic operations are each useful when operating alone in enhancing the ability to solve problems. When operating alone, the operation of argument deletion, in effect, constitutes an ability to generalize a particular function. In many instances of artificial intelligence and automated programming, it is desirable to have the ability to generalize. A generalization is a more general procedure that performs a particular function while ignoring some available variables. The process of generalizing a procedure is often useful because it permits the development of a procedure that is applicable to a wider variety of situations and because it shortens the description of the procedure (i.e., improves its parsimony).

For example, a procedure for changing the tire on a yellow Volkswagen car may be modified by generalizing it so that the color of the car is ignored. The procedure might also be generalized so that the size of the bolts holding the tire is ignored (depleted). Ignoring the color (i.e., deleting the color argument from the procedure) produces a procedure that works, that is applicable to a wider variety of situations, and that is more parsimonious. However, generalizations are not always useful since the information conveyed by an ignored variable may be critical to the successful execution of the procedure. For example, the size of wrench needed to loosen the tire's bolts is an important part of the procedure because the task cannot be performed if a wrench is of unsuitable size.

The operation of branch deletion provides a way to generalize at a higher level (i.e., at the level of whole sub-procedures).

When operating alone, the operation of branch deletion may produce an overall procedure with improved parsimony. For example, two separate identical sub-procedures may not be necessary for turning screws.

When operating alone, both the operations of branch duplication and argument duplication enable a procedure to be specialized and refined over a period of time. In many instances of artificial intelligence and automated programming, it is desirable to have the ability to split the problem environment into different cases and treat the cases slightly differently. Such a specialization or refinement permits such slightly differing treatments of two similar, but different situations. For example, the procedure for changing the tire on a Cadillac car may be similar to the procedure for a Volkswagen, except that the Cadillac may require different tire inflation pressure. Even though the procedure for changing the tire may be similar for all vehicles, the procedures must be specialized to each particular type of vehicle in certain respects. Perhaps, an extra step (such as first removing the hub cap) is required for the Cadillac as compared to a pick-up truck (with no hub caps) in an otherwise similar procedure.

BENEFITS OF THE NEW OPERATIONS OPERATING ACTING TOGETHER

When operating together, the new architecture-altering genetic operations are useful in enabling the simultaneous evolution of the architecture of the overall program for solving a problem while solving the problem. That is, the architecture of the eventual solution to the problem need not be preordained by the user during the preparatory steps. Instead, the architecture can emerge from a competitive fitness-driven process that occurs during the run at the same time as the problem is being solved.

This simultaneous evolution of architecture while solving a problem may be implemented in several different ways using the new architecture-altering genetic operations.

When it is desired to evolve the architecture of the solution whilst simultaneously solving the problem, the initial population of programs may begin in any one of several possible ways.

One possibility (called the "single minimal ADF" approach) is that each multi-part program in the initial population at generation 0 has a uniform architecture with exactly one automatically defined function with a minimal number of arguments appropriate to the problem. Thus, for example, for a Boolean problem, the initial population might consist of embroyomic programs, each with an architecture consisting of one two-argument function-defining branch and one result-producing branch. That is, each such embryonic program in the population has an argument map of {2}.

A second possibility (called the "ADF-less" approach) is that each multi-part program in the initial population has a uniform architecture with no automatically defined functions (i.e., only a result-producing branch). That is, all automatically defined functions must be created during the run. Since automatically defined functions often facilitate solution of problems, the operation of branch creation may be used with a high frequency on generation 0 (and perhaps other early generations) to create multi-part programs early in the run.

A third possibility is that the initial population at generation 0 is architecturally diverse. In this approach, the creation of an individual program in the initial random population begins with a random choice of the number of automatically defined functions, if any, that will belong to the overall program. Then a series of independent random choices is made for the number of arguments possessed by each automatically defined function, if any, in the program. All of these random choices are made within a wide (but limited) range that includes every number that might reasonably be thought to be useful for the problem at hand. Zero is usually included in the range of choices for the number of automatically defined functions, so the initial random population also includes some programs without any automatically defined functions. Once the number of automatically defined functions is chosen for a particular overall program, the automatically defined functions, if any, are systematically named in the usual sequential manner from left to right. For example, if a particular newly created program has three automatically defined functions, they are named ADF0, ADF1, and ADF2.

These approaches may accelerate the problem-solving process because they guarantee inclusion of individuals with function-defining branch(es) in the initial random population and because problems containing even a modest amount of regularity, symmetry, homogeneity, and modularity in their problem environments can often be solved with less computational effort with automatically defined functions than without them (Koza 1994). The branch creation operation may therefore not be necessary in these approaches.

We first use the Boolean even-5-parity problem to illustrate the creation of an architecturally diverse initial random population.

The range of possibly useful numbers of arguments for the automatically defined functions cannot, in general, be predicted with certainty for an arbitrary problem. One can conceive of hypothetical problems involving only a few actual variables for which it might be useful to have an automatically defined function that takes a much larger number of arguments. However, many problem-solving efforts more frequently focus primarily on solving problems by decomposing them into problems of lower dimensionality. Accordingly, it may be reasonable to cap the range of the number of probably-useful arguments for each automatically defined function by the number of actual variables of the problem. There is no guarantee that this cap (motivated by the desire to decompose problems) is necessarily optimal, desirable, or sufficient to solve a given problem. Conceivably, a wider range may be necessary for a particular problem. (If this were the case, there is no reason not to use a wider range).

In any event, practical considerations concerning resources often play a controlling role in setting the upper bound on the number of arguments to be permitted. In the case of the even-5-parity problem, there are five actual variables for the problem, D0, D1, D2, D3, and D4. When the above cap is applied, the range of the number of arguments for each automatically defined function for the even-5-parity problem is from zero to five.

The range of potentially useful numbers of automatically defined functions cannot, in general, be predicted with certainty for an arbitrary problem. The number of automatically defined functions does not necessarily bear any relation to the dimensionality of the problem. However, once again, considerations of resources again play a controlling role in setting the upper bound on the number of automatically defined functions to be permitted. A range of between zero and five automatically defined functions provides seemingly sufficient capacity to solve the even-5-parity problem.

Of course, if no consideration need be given to resources, one might permit automatically defined functions with more arguments than there are actual variables for the problem and one might permit still more automatically defined functions than just specified.

In practice, a zero-argument automatically defined function may not be a meaningful option. If an automatically defined function has no access to the actual variables of the problem has no dummy variables, does not contain any side-effecting primitive functions, and does not contain any random constants, nothing is available to serve as terminals (leaves) of the program tree in the body of such a zero-argument automatically defined function. In the floating-point, integer, and certain other domains, it may be useful to include random constants because a zero-argument automatically defined function can be used to create an evolvable constant that can then be repeatedly called from elsewhere in the overall program. For the special case of the Boolean domain, the two possible Boolean constants (T or NIL) have limited usefulness because all compositions of these two constants merely evaluate to one of these two values. Consequently, we have started the range of the number of arguments for each automatically defined function for a Boolean problem at one, instead of zero.

If the ranges described above are adopted for the even-5-parity problem, there are six possibilities for the number of automatically defined functions and between five possibilities for the number of arguments for each automatically defined function. When there are no automatically defined functions, there is only one possible argument map for the automatically defined functions, namely the map $\{\}$. When there is exactly one automatically defined function in the overall program, there are five possible argument maps for that automatically defined function, namely $\{1\}$, $\{2\}$, $\{3\}$, $\{4\}$, and $\{5\}$. When there are exactly two automatically defined functions, there are 25 possible argument maps for the automatically defined functions. In all, there are 3,906 possible argument maps for programs subject to the constraints described above.

If a population size of 4,000 were used, not all of the 3,906 possible argument maps for the ADFs will, as a practical matter, be represented in an initial random generation. If the population were significantly larger than 4,000, all, or virtually all, of the 3,906 possible argument maps for the ADFs would likely be represented in generation 0. In a population of 4,000, there are about 666 initial random programs with each of the six possible numbers of automatically defined functions (between zero and five). Approximately a fifth of the automatically defined functions have each of the five possible numbers of arguments (between one and five).

The terminal set for the result-producing branch, $T_{rpb}$, for a program in the population for the Boolean even-5-parity problem is $$T_{rpb}=\{D0, D1, D2, D3, D4\}.$$

The terminal set for each automatically defined function is derived from the argument map of the overall program. For example, if the argument map is $\{3, 5\}$, there are two automatically defined functions in the overall program. The terminal set for the first automatically defined function, ADF0, is $$T_{adf0}=\{ARG0, ARG1, ARG2\},$$

and the terminal set for the second automatically defined function, ADF1, is $$T_{adf1}=\{ARG0, ARG1, ARG2, ARG3, ARG4\}.$$

The function set for the result-producing branch, $F_{rpb}$, is the union of $\{AND, OR, NAND, NOR\}$ and whatever automatically defined functions are present in that particular program. Thus, when there are no automatically defined functions, $$F_{rpb}=\{AND, OR, NAND, NOR\}$$

with an argument map for this function set of $$\{2,2,2,2\}.$$

However, when there are five automatically defined functions, the function set for the result-producing branch is $$F_{rpb}=\{ADF0, ADF1, ADF2, ADF3, ADF4, AND, OR, NAND, NOR\}$$ with an argument map for this function set of $$\{k_0, k_1, k_2, k_3, k_4, 2, 2, 2, 2\},$$

where $k_0$, $k_1$, $k_2$, $k_3$, and $k_4$ are the number of arguments possessed by ADF0, ADF1, ADF2, ADF3, and ADF4, respectively, in that particular individual.

The function set, $F_{adf0}$, for ADF0 (if present in a particular program in the population) consists merely of the primitive functions of the problem.

$$F_{adf0}=\{AND, OR, NAND, NOR\}$$

with an argument map for this function set of $$\{2,2,2,2\}.$$

Each automatically defined function can refer hierarchically to any already-defined function-defining branches belonging to the program. For example, the function set, $F_{adf1}$, for ADF1 (if present) is $$F_{adf1}=\{ADF0, AND, OR, NAND, NOR\}$$

with an argument map for this function set of $$\{k_0,2,2,2,2\},$$

where $k_0$ is the number of arguments possessed by ADF0.

Similarly, the function set for each successive automatically defined function (if present) is the union of the function set of the previous automatically defined function and the name of the previous automatically defined function. For example, the function set, $F_{adf4}$, for ADF4 (if present) is $$F_{adf4}=\{ADF0, ADF1, ADF2, ADF3, AND, OR, NAND, NOR\}$$

with an argument map for this function set of $$\{k_0, k_1, k_2, k_3, 2, 2, 2, 2\},$$

where $k_0$, $k_1$, $k_2$, and $k_3$, are the number of arguments possessed by ADF0, ADF1, ADF2, and ADF3, respectively.

The random method of creating the initial population determines whether the body of any particular function-defining branch of any particular program in the population actually calls all, none, or some of the automatically defined functions which it is theoretically permitted to call hierarchically. Subsequent crossovers may change the body of a particular function-defining branch and thereby change the set of other automatically defined functions that the branch actually calls hierarchically. Thus, the function-defining branches have the ability to organize themselves into arbitrary disjoint hierarchies of dependencies among the automatically defined functions. For example, within an overall program with five automatically defined functions at generation 0, ADF4 might actually refer only to ADF2 and ADF3, with ADF2 and ADF3 not referring at all to either ADF0 or ADF1; and ADF1 might refer only to ADF0. In this situation, there would be two disjoint hierarchies of dependencies. A subsequent crossover might change this organization so that ADF3 might then refer to ADF0 (but still not to ADF1). After this crossover, a different hierarchy of dependencies would exist. Any allowable (i.e., noncircular) hierarchy of dependencies may thus be created in generation 0 or created by crossover during the evolutionary process.

After creation of the initial random population (called generation 0) consisting of programs consisting of a random two-argument function-defining branch and a random result-producing branch, the fitness of each individual in the population is measured (either explicitly or implicitly). The operations of reproduction, crossover, and mutation are performed to produce each subsequent generation of individuals. The individuals selected to participate in each operation are selected on the basis of fitness. After the new generation of the population is produced, the fitness of each individual in the population is again measured and the operations are again performed. This process is iterated over a number of generations until some condition for termination is satisfied. A wide variety of problems can be solved in this manner. However, reproduction, crossover, and mutation do not change the argument map of any individual in the population during the evolutionary process in the previously described and reported processes.

The new operations of argument duplication, branch duplication, argument deletion, branch deletion, branch creation and argument creation do change the argument map of the individual on which they act.

When the new operations of argument duplication, branch duplication, argument deletion, branch deletion, branch creation, and argument creation are performed on a percentage of the individuals in the population on each generation, the argument maps of at least one participating individual changes. These operations may be usefully performed on 1% of the population on each generation of the process. The fitness-driven evolutionary process will tend to select against individuals in the population with architectures that are less suitable for solving the problem. Individuals in the population with architectures that facilitate solving the problem will tend to prosper. Individuals in the population with unsuitable architectures will tend to become extinct over a period of generations.

Examples of Actual Evolutionary Runs

The architecture-altering operations described herein will now be illustrated by showing several actual runs of the problem of symbolic regression. The problem requires evolution of a computer program to mimic the behavior of an unknown function. For simplicity, the even-3-parity function is the unknown function.

The run starts with the random creation of a population of 1,000 individual programs. The "single minimal ADF" approach is used in this example. Thus, each program in the initial population consists of one result-producing branch and a single one-argument function-defining branch.

After creating the 1,000 programs for the initial random population (called "generation 0"), each program in the population is evaluated as to how well it solves the problem at hand. The problem is to mimic the behavior of the unknown function (e.g., the even-3-parity function). Thus, the fitness of a program in the population of 1,000 programs is measured according to how well that program mimics the unknown function. There are eight combinations of three Boolean arguments. Thus, a program can score between zero and eight matches with the unknown function. This number of matches is called the "raw fitness" of a program.

In one particular run, one of the 1,000 programs in generation 0 has the function-defining branch shown below.

Because the single minimal ADF approach was used for this run, this branch, like all branches in generation 0, takes one dummy argument, ARG0. That is, its argument map is {1}. This function-defining branch is composed of the four primitive functions OR, AND, NAND, and NOR and the one dummy argument, ARG0.

(OR (AND (NAND ARG0 ARG0) (OR ARG0 ARG0))
(NOR (NOR ARG0 ARG0) (AND ARG0 ARG0)))

The behavior of this function-defining branch can be easily understood by means of a table. The table below shows the behavior of this branch for the two combinations of values (i.e., 0 and 1) that its one dummy argument, ARG0, may assume. As is shown, ADF0 always returns the value 0 (false, NIL) and is, in effect, the Boolean constant function zero (called "Always False").

| ARG0 | ADF0 |
|------|------|
| 0    | 0    |
| 1    | 0    |

In fact, there are only four possible Boolean functions of one argument. In addition to the "Always False" function, there is the "Always True" function that returns 1 (true) for both values of ARG0. In addition, there is the "Identity" function that returns 0 when ARG0 is 0 and returns 1 when ARG0 is 1. Finally, there is the "Negation" function (also called the "NOT" function) that returns 1 when ARG0 is 0 and returns 0 when ARG0 is 1. None of these four possible one-argument functions are particularly useful in solving a Boolean problem (given that NAND and NOR are available as primitive functions). Indeed, the "single minimal ADF approach" is not intended to provide a highly useful function-defining branch, but rather to provide a starting point for the evolutionary process.

The result-producing branch of this same program from generation 0 is shown below. It is composed of two of the four available primitive functions (NOR and AND) and all three of the available actual variables of the problem, namely D0, D1, and D2.

(NOR (AND D0(NOR D2 D1)) (AND (AND D2 D1)))

This result-producing branch might have also contained ADF0 (i.e., the function defined by the one function-defining branch of this program); however, this particular result-producing branch does not contain such a reference. Also, it might have contained OR and NAND, but it did not.

The table below shows the behavior of this program from generation 0. The first three columns show the values of the three Boolean variables, D0, D1, and D2. The fourth column shows the value produced by the overall program (which, for this particular program, is the value produced by the result-producing branch alone, since the result-producing branch does not refer to ADF0). The fifth column shows the value of the unknown function, the even-3-parity function. The last column shows how well the program performed at matching the behavior of the unknown function. As is shown, the program was correct for six of the eight possible combinations (fitness cases). Thus, the program scored a raw fitness of 6 (out of a possible 8).

| D0 | D1 | D2 | Best program of generation 0 | Even-3-parity function | Score |
|----|----|----|---|---|---|
| 0 | 0 | 0 | 1 | 1 | correct |
| 0 | 0 | 1 | 1 | 0 | wrong |
| 0 | 1 | 0 | 1 | 0 | wrong |
| 0 | 1 | 1 | 1 | 1 | correct |
| 1 | 0 | 0 | 0 | 0 | correct |
| 1 | 0 | 1 | 1 | 1 | correct |
| 1 | 1 | 0 | 1 | 1 | correct |
| 1 | 1 | 1 | 0 | 0 | correct |

As it happens, the program just described was the best program of generation 0. Other programs in generation 0 scored only five, four, three, or two matches. That is, they were less fit at solving the problem of mimicking the unknown function (i.e., the even-3-parity function).

A new population of 1,000 programs is then created from the existing population of 1,000 programs. Each successive generation of the population is created from the existing population by applying various genetic operations. Reproduction and crossover are the most frequently performed genetic operations. In addition, the architecture-altering operations described herein are used on this run. Mutation and other previously described genetic operations may also be used in the process (although they are not used on this particular run).

The raw fitness of the best-of-generation program for generation 5 improves to 7. The program achieving this new and higher level of fitness has a total of four branches (i.e., one result-producing branch and three function-defining branches). The change in the number of branches from 1 at generation 0 to 4 at generation 5 is the consequence of the architecture-altering operations. In addition to its one result-producing branch, this best-of-generation program for generation 5 has branches defining ADF0 (taking two arguments), ADF1 (taking two arguments), and ADF2 (taking three arguments), so that its argument map is {2, 2, 3}. The result producing branch of this program is shown below. As can be seen, this result-producing branch refers to ADF1 and ADF2, but it happens to ignore its ADF0.
(NOR (ADF2 D0 D2 D1) (AND (ADF1 D2 D1)D0))

The table below shows the behavior of the best-of-generation program for generation 5. As is shown, this program correctly mimics the behavior of the unknown function (the even 3-parity function) for seven of the eight fitness cases and thus scores a raw fitness of 7.

| D0 | D1 | D2 | Best program of generation 0 | Even-3-parity function | Score |
|----|----|----|---|---|---|
| 0 | 0 | 0 | 1 | 1 | correct |
| 0 | 0 | 1 | 0 | 0 | correct |
| 0 | 1 | 0 | 1 | 0 | wrong |
| 0 | 1 | 1 | 1 | 1 | correct |
| 1 | 0 | 0 | 0 | 0 | correct |
| 1 | 0 | 1 | 1 | 1 | correct |
| 1 | 1 | 0 | 1 | 1 | correct |
| 1 | 1 | 1 | 0 | 0 | correct |

The function-defining branch for ADF0 of this best-of-generation program for generation 5 takes two dummy arguments, ARG0 and ARG1, and is shown below. The existence of two dummy arguments in this function-defining branch is a consequence of the argument duplication operation. The behavior of ADF0 is not important since ADF0 is not referenced by the result-producing branch of the overall program.
(OR (AND (NAND ARG0 ARG0) (OR ARG1 ARG0)) (NOR (NOR ARG1 ARG0) (AND ARG0 ARG1)))

The function-defining branch for ADF1 of this best-of-generation program for generation 5 takes two dummy arguments, ARG0 and ARG1, and is shown below. The existence of this second function-defining branch is a consequence of the branch duplication operation. This branch acquired its second dummy argument as a consequence of an argument duplication operation.
(OR (AND ARG0 ARG1) (NOR ARG0 ARG1))

The table below shows the behavior of ADF1. As can be seen, ADF1 is equivalent to the even-2-parity function. That is, ADF1 returns 1 if an even number of its two arguments are 1, but otherwise returns 0.

| ARG0 | ARG1 | ADF0 |
|------|------|------|
| 0 | 0 | 1 |
| 0 | 1 | 0 |
| 1 | 0 | 0 |
| 1 | 1 | 1 |

The function-defining branch for ADF2 of this best-of-generation program for generation 5 takes three dummy arguments, ARG0, ARG1, and ARG2, and is shown below. This third function-defining branch exists as a consequence of a branch duplication operation. This branch acquired its three dummy arguments as a consequence of argument duplication operations.
(AND ARG1 (NOR ARG0 ARG2))

The table below shows that the behavior of ADF2 consists of returning 1 only when ARG0 and ARG2 are 0 and ARG1 is 1.

| ARG0 | ARG1 | ARG2 | ADF2 |
|------|------|------|------|
| 0 | 0 | 0 | 0 |
| 0 | 0 | 1 | 0 |
| 0 | 1 | 0 | 1 |
| 0 | 1 | 1 | 0 |
| 1 | 0 | 0 | 0 |
| 1 | 0 | 1 | 0 |
| 1 | 1 | 0 | 0 |
| 1 | 1 | 1 | 0 |

The raw fitness of the best individual program in the population remains at a value of 7 for generations 6, 7, 8, and 9; however, the average fitness of the population as a whole improves during these generations. The progressive improvement, from generation to generation, of the population as a whole is a characteristic of runs of this evolutionary process.

On generation 10, the best program in the population of 1,000 perfectly mimics the behavior of the even-3-parity function. This 100% -correct solution to the problem has a total of six branches (i.e., five function-defining branches and one result-producing branch). This multiplicity of branches is a consequence of the repeated application of the branch duplication operation and the branch creation operation. The argument map of this program is {2, 2, 3, 2, 2}. The function-defining branches of this program each have more than one dummy argument. All of these additional arguments exist as a consequence of the repeated application of the argument duplication operation.

The result-producing branch of this best-of-generation program for generation 10 is shown below:

(NOR (ADF4 D0(ADF1 D2 D1)) (AND (ADF1 D2 D1) D0))

The table below shows that the behavior of this best-of-generation program for generation 10 correctly mimics the behavior of the even-3-parity function for all 8 fitness cases.

| D0 | D1 | D2 | Best program of generation 10 | Even-3-parity function | Score |
|---|---|---|---|---|---|
| 0 | 0 | 0 | 1 | 1 | correct |
| 0 | 0 | 1 | 0 | 0 | correct |
| 0 | 1 | 0 | 0 | 0 | correct |
| 0 | 1 | 1 | 1 | 1 | correct |
| 1 | 0 | 0 | 0 | 0 | correct |
| 1 | 0 | 1 | 1 | 1 | correct |
| 1 | 1 | 0 | 1 | 1 | correct |
| 1 | 1 | 1 | 0 | 0 | correct |

The function-defining branch for ADF0 of this best-of-generation program for generation 10 takes two dummy arguments, ARG0 and ARG1, and is shown below.

(OR (AND (NAND ARG0 ARG0) (OR ARG1 ARG0)) (NOR (NOR ARG1 ARG0) (AND ARG0 ARG1)))

The table below shows the behavior of ADF0 of this best-of-generation program for generation 10. As shown, ADF0 is equivalent to the odd-2-parity function. That is, ADF1 returns 1 if an odd number of its two arguments are 1, but otherwise returns 0. However, ADF0 is ignored by the result-producing branch of this program.

| ARG0 | ARG1 | ADF0 |
|---|---|---|
| 0 | 0 | 0 |
| 0 | 1 | 1 |
| 1 | 0 | 1 |
| 1 | 1 | 0 |

The function-defining branch for ADF1 of the best-of-generation program for generation 10 takes two dummy arguments, ARG0 and ARG1, and is shown below. ADF1 is equivalent to the even-2-parity function.

(OR (AND ARG0 ARG1) (NOR ARG0 ARG1))

The function-defining branch for ADF2 takes three dummy arguments, ARG0, ARG1, and ARG2, and is shown below. ADF2 returns 1 only when ARG0 and ARG2 are 0 and ARG1 is 1. However, ADF2 is ignored by the result-producing branch.

(AND ARG1 (NOR ARG0 ARG2))

The function-defining branch for ADF3 is the one-argument identity function. This relatively useless branch is ignored by the result-producing branch.

The function-defining branch for ADF4 of the best-of-generation program for generation 10 takes two dummy arguments, ARG0 and ARG1, and is shown below. It is equivalent to the even-2-parity function.

(OR (AND ARG0 ARG1) (NOR ARG0 ARG1))

Since both ADF1 and ADF4 are both even-2-parity functions, the result-producing branch can be simplified to the expression below. This expression can be verified as being equivalent to the even-3-parity function.

(NOR (EVEN-2-PARITY D0(EVEN-2-PARITY D2 D1)) (AND (EVEN-2-PARITY D2 D1) D0))

An examination of the genealogical audit trail shows the interplay between the Darwinian reproduction operation, the one-offspring crossover operation using point typing, and the new architecture-altering operations described herein.

FIG. 31 shows all of the ancestors of the just-described 100%-correct solution from generation 10 of this run of the problem of symbolic regression of the even-3-parity problem. The generation numbers (from 0 to 10) are shown on the left edge of FIG. 31. FIG. 31 also shows the sequence of reproduction operations, crossover operations, and architecture-altering operations that gave rise to every program that was an ancestor to the 100%-correct program in generation 10. The 100%-correct solution from generation 10 is represented by the box at the bottom of the figure at 3110. The argument map of this solution, namely {2, 2, 3, 2, 2}, is shown in this box.

The two lines flowing into the box 3110 indicate that the solution in generation 10 was produced by a crossover operation acting on two programs from the previous generation (generation 9). FIG. 31 uses the convention of placing the mother 3109 (the receiving parent) on the right and father 3119 (the contributing parent) on the left. Recall that, in a one-offspring crossover operation using point typing, the bulk of the structure of a multi-part program comes from the mother since the father contributes only one subtree into only one of the many branches of the mother. Thus, the 11 boxes on the right side of this figure (consecutively numbered from 3100 to 3110) represent the maternal genetic lineage (from generations 0 through generation 10) of the 100%-correct solution 3110 that emerged in generation 10. The 100%-correct solution 3110 in generation 10 has the same argument map, {2, 2, 3, 2, 2}, as the mother 3109 because crossover does not change the architecture (or argument map) of the offspring (as compared to the mother).

The maternal lineage will now be reviewed in detail so as to illustrate the overall process of evolving the architecture of a solution to a problem while simultaneously evolving the solution to the problem.

The mother 3109 from generation 9 (shown on the right side of FIG. 31) has an argument map of {2, 2, 3, 2, 2}, has a raw fitness of 7, was itself the result of a crossover of two parents from generation 8. The grandfather of the 100%-correct solution 3110 in generation 10 (and the farther of 3109) was 3118. The grandmother of the 100%-correct solution 3110 in generation 10 (and the mother of 3109) was 3108.

The grandmother 3108 from generation 8 of the 100%-correct solution 3110 in generation 10 (and the mother of 3109) has an argument map of {2, 2, 3, 2, 2}, has a raw fitness of 7, and was the result of a branch duplication from a single ancestor 3107 from generation 7.

Because of the branch duplication operation, the program 3107 from generation 7 of the maternal lineage at the far right of FIG. 31 has one fewer branches than its offspring 3108. Program 3107 has an argument map of {2, 2, 3, 2}. Program 3107 was the result of an argument duplication from a single ancestor from generation 6.

Because of the argument duplication operation, the fourth function-defining branch of the program 3106 from generation 6 of the maternal lineage at the far right of FIG. 31 has one less argument than its offspring 3107. Program 3106 from generation 6 has an argument map of {2, 2, 3, 1 } whereas program 3107 from generation 7 has an argument map of {2, 2, 3, 2}. Program 3106 was the result of an branch creation from a single ancestor 3105 from generation 5.

Because of the branch creation operation, the program 3105 from generation 5 shown on the right side of FIG. 31 has one fewer function-defining branch as program 3106. Program 3105 has an argument map of {2, 2, 3}. In turn, program 3105 was the result of an branch creation from a single ancestor 3104 from generation 4.

Program 3104 from generation 4 shown on the right side of FIG. 31 has one less function-defining branch than its offspring program 3105. Program 3104 has an argument map of {2, 2}. Program 3104 was the result of a reproduction operation from a single ancestor 3103 from generation 3.

Program 3104 from generation 3 shown on the right side of FIG. 31 has an argument map of {2, 2} and was the result of a crossover involving father 3112 and mother 3102 from generation 2.

Program 3102 from generation 2 (shown on the right side of FIG. 31) has an argument map of {2, 2} and was the result of a branch creation from a single ancestor 3101 from generation 1.

Program 3101 from generation 1 has an argument map of {2} and was the result of an argument duplication of a single ancestor 3100 from generation 0.

Program 3100 from generation 0 at the upper right corner of FIG. 31 has an argument map of {1} and has a raw fitness of 6. It has an argument map of {1} because all programs at generation 0 consist of one result-producing branch and a single one-argument function-defining branch when the "single minimal ADF" approach is being used.

The sequence of genetic operations and architecture-altering operations of this run shows the simultaneous evolution of the architecture while solving the problem.

A second run of the process is now described in order to illustrate the evolution of a hierarchical reference by one function-defining branch of another and to illustrate the operation of branch deletion. In this run, a 100%-correct solution emerges in generation 15 to the problem of symbolic regression of the even-3-parity problem.

The best-of-generation program 3200 from generation 0 of this run has a raw fitness of only 5. There are a number of programs in the population of 1,000 with this level of fitness. This program 3200 is the ancestor of the 100%-correct solution that eventually emerges in generation 15. The result-producing branch of this early ancestor refers to its ADF0 and is shown below:
(OR (NOR D2 (ADF0 (AND D1 D0))) (AND D2 (ADF0 (NAND D0 D0))))

ADF0 of this program is shown below:
(AND (NAND (OR ARG0 (OR ARG0 ARG0)) (AND (AND ARG0 ARG0) (OR ARG0 ARG0))) (AND (NAND (OR ARG0 ARG0) (NOR ARG0 ARG0)) (OR (AND ARG0 ARG0) (NOR ARG0 ARG0))))

The table below shows that ADF0 of this best-of-generation program from generation 0 is the one-argument negation (NOT) function. The one-argument NOT function was not one of the four primitive functions of the original problem (i.e., the two-argument AND, OR, NAND, and NOR functions).

| ARG0 | ADF0 |
| --- | --- |
| 0 | 1 |
| 1 | 0 |

FIG. 9 shows all of the maternal ancestors of the 100%-correct solution from generation 15 of this second run. Because 15 generations are involved, FIG. 9, unlike FIG. 31, does not show all of the ancestors. The program represented by box 3200 in FIG. 9 is, in fact, the program shown above. Program 3200 has an argument map of {1}. FIG. 9 also shows the raw fitness of each program to the immediate left of the argument map of that program.

A branch duplication operates on program 3200 to produce program 3201 in generation 1 with an argument map of {1, 1}.

Two crossovers occurring in generations 2 and 3 raise the raw fitness of the maternal ancestor 3203 in generation 3 from 5 to 6.

Program 3203 has two one-argument function-defining branches. Its ADF0 is "Always False" and is shown below:
(AND (NAND (OR ARG0 (OR ARG0 ARG0)) (AND (AND ARG0 ARG0) (OR ARG0 ARG0))) (AND (NAND (OR ARG0 ARG0) (NOR ARG0 ARG0)) (OR (AND ARG0 ARG0) (OR ARG0 ARG0))))

ADF1 of this program 3203 is the exactly the same as ADF0 of ancestor 3200 at generation 0 (i.e., the NOT function). The branch duplication that created program 3201 in generation 1 duplicated ADF0 of ancestor 3200 of generation 0. Then the intervening crossovers modified ADF0 so as to convert it into the useless "Always False" function.

Then, a branch deletion removes the now-always-false ADF0 of program 3203 to produce program 3204 in generation 4. The surviving function-defining branch of program 3204 is exactly the same as ADF0 of ancestor 3200 at generation 0 (i.e., its it the NOT function). Program 3204 retains a fitness level of 6.

The result-producing branch of program 3204 from generation 4 is shown below:
(OR (NOR D2 (ADF0 (AND D1 D0))) (AND D2 (OR D1 D0)))

Next, a branch creation operation takes creates a new branch, ADF1, of program 3205 of generation 5 from the underlined portion of the result-producing branch of program 3204 above. The new branch, ADF1, is shown below:
(ADF0 (AND ARG1 ARG0))

The result-producing branch of program 3204 of generation 4 is also modified and the modified version is part of program 3205 of generation 5 as shown below:
(OR (NOR D2 (ADF1 D1 D0)) (AND D2 (OR D1 D0)))

Two crossovers, one reproduction, one branch creation, and one branch duplication then occur on the maternal lineage.

The ADF0 of program 3210 is the NOT function. ADF1 of program 3210 from generation 10 uses the hierarchical reference created above to emulate the behavior of the NAND function, as shown below:
(ADF0 (AND ARG1 ARG0))

Mother 3210 mates with father 3230 to produce offspring 3211 in generation 11.

ADF0 of father 3230 performs the even-2-parity function and is shown below:
(AND (NAND (OR ARG1 ARG0) (AND (NAND ARG1 ARG0) (OR ARG1 ARG1))) (AND (NAND ARG0 (NOR ARG1 ARG0)) (OR (AND ARG1 ARG1) (NOR ARG0 ARG0))))

In the crossover, this entire branch from father 3230 was inserted into ADF1 of mother 3210 replacing (AND ARG1 ARG0) and producing a new ADF1 that performs the odd-2-parity function (since ADF0 performs the NOT function).

Three crossovers and one branch creation then occur on the maternal lineage; however, the ADF1 that was created in generation 11 and that performs the odd-2-parity functions remains intact.

The 100%-correct solution that emerged in generation 15 had an argument map of {1, 2, 1, 1, 2}. Only ADF0 and ADF1 of this particular program are referenced by the result-producing branch.

ADF0 performs the NOT function and is shown below:
(AND (NAND (OR ARG0 ARG0) (AND (AND ARG0 ARG0) (OR ARG0 ARG0))) (AND (NAND (OR ARG0 ARG0) (NOR ARG0 ARG0)) (OR (AND ARG0 ARG0) (NOR ARG0 ARG0))))

ADF1 defines the odd-2-parity function by hierarchically referring to ADF0. ADF1 is shown below:

(ADF0 (AND (NAND (OR ARG1 ARG0) (AND (NAND ARG1 ARG0) (OR ARG1 ARG1))) (AND (NAND ARG0 (NOR ARG1 ARG0)) (OR (AND ARG1 ARG1) (NOR ARG0 ARG0)))))

Thus, a hierarchy of function definitions has emerged.

The architecture-altering operations that actually appear in FIG. 9 are now further illustrated, in detail, to provide an additional explanation of these operations.

First, the operation of branch deletion is illustrated using program 3203 from generation 3 and offspring program 3204 from generation 4. The result-producing branch of program 3203 from generation 3 is shown below:

(OR (NOR D2 (ADF1 (AND D1 D0))) (AND D2 (OR D1 D0)))

The overall program 3203 has two one-argument function-defining branches, so its argument map is {1, 1}. The one-argument ADF0 of program 3203 is "Always False" and is shown below:

(AND (NAND (OR ARG0 (OR ARG0 ARG0)) (AND (AND ARG0 ARG0) (OR ARG0 ARG0))) (AND (NAND (OR ARG0 ARG0) (NOR ARG0 ARG0)) (OR (AND ARG0 ARG0) (OR ARG0 ARG0))))

The one-argument ADF1 of program 3203 from generation 3 is shown below: (AND (NAND (OR ARG0 (OR ARG0 ARG0)) (AND (AND ARG0 ARG0) (OR ARG0 ARG0))) (AND (NAND (OR ARG0 ARG0) (NOR ARG0 ARG0)) (OR (AND ARG0 ARG0) (NOR ARG0 ARG0))))

When the operation of branch deletion is performed in this particular instance, the function-defining branch defining ADF0 is picked as the branch-to-be deleted. ADF0 of program 3203 is then deleted from the overall program, leaving just ADF1 in the overall program. The new argument map is {1}. As a matter of convention, the sole surviving function-defining branch is renamed as ADF0, so that the numbering of all function-defining branches is consecutive starting at zero. Thus, ADF0 of offspring program 3204 in generation 4 is the same as ADF1 of program 3203 from generation 3. ADF0 of offspring program 3204 is shown below:

(AND (NAND (OR ARG0 (OR ARG0 ARG0)) (AND (AND ARG0 ARG0) (OR ARG0 ARG0))) (AND (NAND (OR ARG0 ARG0) (NOR ARG0 ARG0)) (OR (AND ARG0 ARG0) (NOR ARG0 ARG0))))

Except for the change in name (indicated by underlining), this result-producing branch of offspring program 3204 in generation 4 is same as the result-producing branch of program 3203 from generation 3.

(OR (NOR D2 (ADF0 (AND D1 D0))) (AND D2 (OR D1 00)))

Second, the operation of branch duplication is further illustrated using program 3200 from generation 0 and its offspring program 3201 from generation 1. The parent, program 3200 from generation 0 has one function-defining branches with an argument map of {1}. The result-producing branch of this individual is shown below:

(OR (NOR D2 (ADF0 (AND D1 D0))) (AND D2 (ADF0 (NAND D0 D0))))

The one-argument ADF0 of program 3200 from generation 0 is shown below:

(NAND (OR ARG0 (OR ARG0 ARG0)) (AND (AND ARG0 ARG0) (OR ARG0 ARG0))) (AND (NAND (OR ARG0 ARG0) (NOR ARG0 ARG0)) (OR (AND ARG0 ARG0) (NOR ARG0 ARG0))))

When the branch duplication operation is performed in this particular instance, the one-argument ADF0 is picked as the branch-to-be-duplicated (since it the only ADF of this particular program). The result is offspring program 3201 in generation 1 with a second function-defining branch and an argument map of {1, 1}. The result-producing branch of offspring program 3201 in generation I is shown below.

(OR (NOR D2 (ADF1 (AND D1 D0))) (AND D2 (ADF1 (NAND D0 D0))))

Note that for each of the two occurrences of ADF0 in the result-producing branch of program 3200 of generation 0 (both of which are underlined above), a probabilistic determination was made as to whether to change the reference to ADF0 to a reference to the new ADF1. As it happens, in both cases, the change was made (as shown by the two occurrences of ADF1 that are underlined immediately above).

ADF0 of program 3200 is unaffected by the branch duplication operation so ADF0 of program 3201 in generation 1 is the same.

The branch duplication operation has added a new function-defining branch, ADF1, which is identical to ADF0 and which is shown below:

(AND (NAND (OR ARG0(OR ARG0 ARG0)) (AND (AND ARG0 ARG0) (OR ARG0 ARG0))) (AND (NAND (OR ARG0 ARG0) (NOR ARG0 ARG0)) (OR (AND ARG0 ARG0) (NOR ARG0 ARG0))))

Third, the operation of argument duplication is further illustrated using program 3228 from generation 8 and its offspring is program 3229 in generation 9. Program 3228 has an argument map of {1, 2}. The result-producing branch of program 3228 is shown below:

(OR (NOR D2 (ADF1 (AND D1 D0) (AND D1 D0))) (AND D2 (OR D1 D0)))

One-argument ADF0 of program 3228 is shown below:

(AND (NAND (OR ARG0 ARG0) (AND (AND ARG0 ARG0) (OR ARG0 ARG0))) (AND (NAND ARG0 (NOR ARG0 ARG0)) (OR (AND ARG0 ARG0) (NOR ARG0 ARG0))))

Two-argument ADF1 of program 3228 is shown below:

(AND (NAND (OR ARG0 (OR ARG1 ARG0)) (AND (AND ARG1 ARG1) (OR ARG1 ARG0))) (AND (NAND ARG1 (NOR ARG0 ARG0)) (OR (AND ARG0 ARG1) (NOR ARG1 ARG1))))

When the operation of argument duplication is performed in this instance, the result is program 3229 in generation 9 with an argument map of {2, 2}. The result-producing branch of offspring program 3229 is shown below:

(OR (NOR D2 (ADF1 (AND D1 D0) (AND D1 D0))) (AND D2 (OR D1 D0)))

ADF0 of offspring program 3229 now has two arguments, as shown below:

(AND (NAND (OR ARG1 ARG0) (AND (AND ARG0 ARG0) (OR ARG1 ARG1))) (AND (NAND ARG0 (NOR ARG1 ARG0)) (OR (AND ARG1 ARG1) (NOR ARG0 ARG0))))

Note that ARG1 appears 7 times in this new branch because of the argument duplicating operation.

The two-argument ADF1 of offspring program 3229 is identical to ADF1 of program 3228.

Fourth, the operation of branch creation is further illustrated using program 3204 from generation 4 and its offspring program 3205 in generation 5. This program has an argument map of {1}. The result-producing branch is shown below. The point invoking the one-argument ADF0 and the argument subtree, (AND D1 D0), below that point are underlined.

(OR (NOR D2 (ADF0 (AND D1 D0))) (AND D2 (OR D1 D0)))

One-argument ADF0 of program 3204 from generation 4 is shown below:

(AND (NAND (OR ARG0 (OR ARG0 ARG0)) (AND (AND ARG0 ARG0) (OR ARG0 ARG0))) (AND (NAND (OR ARG0 ARG0) (NOR ARG0 ARG0)) (OR (AND ARG0 ARG0) (NOR ARG0 ARG0))))

When the branch creation operation is performed in this instance, ADF0 is the picked point and the underlined four-point subtree will become the new branch. The result is offspring program 3205 in generation 5 with an argument map of {1, 2}. Since the underlined portion of the result-producing branch contains two arguments, D1 and D0, the newly created branch will take two dummy arguments (ARG0 and ARG1).

ADF1 of offspring program 3205 is the newly created two-argument function-defining branch and is shown below:
(ADF0 (AND ARG1 ARG0))

The result-producing branch of offspring program 3205 contains an invocation of the newly created branch for two-argument ADF1. The invocation of the newly created branch for ADF1 in offspring program 3205 is underlined and replaces the underlined portion of the result-producing branch from program 3204 from generation 4. The result-producing branch of offspring program 3205 is shown below:
(OR (NOR D2 (ADF1 D1 D0)) (AND D2 (OR D1 D0)))

As it happens, the newly created ADF1 hierarchically refers to the preexisting one-argument ADF0. Thus, this instance of the branch creation operation created a hierarchical reference of automatically defined function to another.

ADF0 of offspring program 3205 is identical to ADF0 of program 3204.

The specific arrangements and methods herein are merely illustrative of the principles of this invention. Numerous modifications in form and detail may be made by those skilled in the art without departing from the true spirit and scope of the invention.

Although this invention has been shown in relation to a particular embodiment, it should not be considered so limited. Rather it is limited only by the appended claims.

Thus, a non-linear genetic process for solving problems has been described.

We claim:

1. A process for solving a problem comprising the steps of:
   creating a population of programmatic entities;
   generating a solution to the problem, wherein the step of generating the solution comprises the steps of
      altering an architecture of at least one of the population of programmatic entities, and
      evolving the population to generate a new entity, wherein the step of altering and the step of evolving are performed such that a solution to the problem is created while evolving the architecture of said at least one of the population of programmatic entities.

2. The process defined in claim 1 wherein at least one of said programmatic entities is comprised of sub-entities, wherein at least one of said sub-entities is externally invocable and at least one of said entities in the population has at least one internally invocable sub-entity.

3. The process defined in claim 2 wherein said step of altering the architecture comprises the steps of:
   duplicating a portion of an internally invocable sub-entity from a programmatic entity in the population of programmatic entities to create a duplicated portion of the internally invocable sub-entity; and
   adding the duplicated portion of the internally invocable sub-entity to the programmatic entity.

4. The process defined in claim 2 wherein said step of altering the architecture comprises the steps of:
   duplicating an internally invocable sub-entity from a programmatic entity in the population of programmatic entities to create a duplicated internally invocable sub-entity; and
   adding the duplicated internally invocable sub-entity to the programmatic entity.

5. The process defined in claim 2 wherein said step of altering the architecture comprises the steps of:
   duplicating an argument of an internally invocable sub-entity from a programmatic entity in the population of programmatic entities to create a duplicated argument; and
   adding the duplicated argument to the programmatic entity.

6. The process defined in claim 2 wherein said step of altering comprises deleting a portion of an internally invocable sub-entity from a programmatic entity in the population of programmatic entities.

7. The process defined in claim 6 wherein the step of altering the architecture further comprises the step of placing a tree structure at an occurrence of an invocation of the deleted portion of the internally invocable sub-entity.

8. The process defined in claim 7 wherein the step of placing a tree structure at an occurrence of the internally invocable sub-entity once deleted comprises the step of randomly generating the tree structure.

9. The process defined in claim 6 further comprising the step of replacing the portion of the internally invocable sub-entity with another internally invocable sub-entity in the programmatic entity containing the internally invocable sub-entity.

10. The process defined in claim 6 further comprising the step of performing macro expansion.

11. The process defined in claim 2 wherein said step of altering the architecture comprises the step of deleting an internally invocable sub-entity from a programmatic entity in the population of programmatic entities.

12. The process defined in claim 2 wherein said step of altering the architecture comprises the step of deleting an argument of an internally invocable sub-entity from a programmatic entity in the population of programmatic entities.

13. The process defined in claim 12 wherein the step of altering further comprises the step of placing a tree structure at an occurrence of the argument once deleted.

14. The process defined in claim 13 wherein the step of placing a tree structure at an occurrence of the argument once deleted comprises the step of randomly generating the tree structure.

15. The process defined in claim 12 further comprising the step of replacing the argument with another argument defined for use in the internally invocable sub-entity.

16. The process defined in claim 12 further comprising the step of performing macro expansion.

17. The process defined in claim 1 wherein the step of altering the architecture comprises the step of creating an internally invocable sub-entity from a portion of a sub-entity.

18. The process defined in claim 1 wherein the step of altering the architecture comprises the step of creating an argument for a sub-entity.

19. The process defined in claim 1 wherein the step of evolving comprises a series of iterative steps, wherein each of said population of programmatic entities is activated to produce a result, and thereafter is subjected to an operation to generate a new entity, said new entity being added to the population, such that a solution to said problem is generated.

20. The process defined in claim 1 wherein each of the population of entities comprises exactly two sub-entities, each of said programmatic entities in the population having only one internally invocable sub-entity with a minimum number of arguments and one externally invocable sub-entity.

21. The process defined in claim 20 wherein the minimum number of arguments comprises a single argument.

22. The process defined in claim 1 wherein the step of creating a population of programmatic entities comprises creating a population of entities, where each of the population of entities has only an externally invocable sub-entity.

23. The process defined in claim 1 wherein the step of creating a population of programmatic entities comprises creating a population of entities where at least two of the entities have different architectures.

24. A process for solving a problem comprising the steps of:

creating a population of programmatic entities;

evolving the population, wherein the step of evolving comprises the step of altering an architecture of at least one of the population of programmatic entities, wherein the step of altering comprises duplicating an internally invocable sub-entity of said at least one of the population and adding the duplicated internally invocable sub-entity to said at least one of the population as a new internally invocable sub-entity, said step of altering further comprising the step of changing a portion of references referencing the duplicated internally invocable sub-entity to reference the new internally invocable sub-entity.

25. A process for solving a problem comprising the steps of:

creating a population of programmatic entities;

evolving the population, wherein the step of evolving comprises the step of altering an architecture of at least one of the population of programmatic entities, wherein the step of altering comprises duplicating an argument in an internally invocable sub-entity of said at least one of the population to create an additional argument and changing a portion of occurrences of the duplicated argument in said at least one of the population internally invocable sub-entity to the additional argument, wherein an architecture of a programmatic entity is simultaneously evolved with a solution to the problem, such that a new programmatic entity is generated.

26. A process for solving a problem comprising the steps of:

creating a population of programmatic entities; and evolving the population, wherein the step of evolving comprises the step of altering an architecture of at least one of the population of programmatic entities, wherein the step of altering comprises deleting an argument of an internally invocable sub-entity of said at least one of the population and eliminating occurrences of said argument throughout said internally invocable sub-entity, wherein an architecture of a programmatic entity is simultaneously evolved with a solution to the problem, such that a new programmatic entity is generated.

27. The process defined in claim 26 wherein the step of altering further comprises the step of placing a tree structure at an occurrence of the argument once deleted.

28. The process defined in claim 27 wherein the step of placing a tree structure at an occurrence of the argument once deleted comprises the step of randomly generating the tree structure.

29. The process defined in claim 27 wherein the tree structure comprises a variable.

30. The process defined in claim 26 further comprising the step of deleting each instantiation of the argument at each occurrence of said internally invocable sub-entity in said at least one of the population.

31. A process for solving a problem comprising the steps of:

creating a population of programmatic entities; and evolving the population, wherein the step of evolving comprises the step of altering an architecture of at least one of the population of programmatic entities, wherein the step of altering comprises deleting an internally invocable sub-entity of said at least one of the population and eliminating occurrences of said internally invocable sub-entity throughout said at least one of the population, wherein an architecture of a programmatic entity is simultaneously evolved with a solution to the problem, such that a new programmatic entity is generated.

32. The process defined in claim 31 further comprising the step of placing a tree structure at an occurrence of the internally invocable sub-entity once deleted.

33. The process defined in claim 31 wherein the tree structure comprises a randomly generated tree structure.

34. The process defined in claim 31 wherein the tree structure comprises a variable.

35. A process for solving a problem comprising the steps of:

creating a population of programmatic entities;

evolving the population, wherein the step of evolving comprises the step of altering an architecture of at least one of the population of programmatic entities, wherein the step of altering comprises creating an internally invocable sub-entity of said at least one of the population to create an additional internally invocable sub-entity and adding the additional internally invocable sub-entity to said at least one of the population, wherein at least one architecture of a programmatic entity is simultaneously evolved with a solution to the problem, such that a new programmatic entity is generated.

36. A process for solving a problem comprising the steps of:

creating a population of programmatic entities;

evolving the population, wherein the step of evolving comprises the step of altering an architecture of at least one of the population of programmatic entities, wherein the step of altering comprises creating an argument in an internally invocable sub-entity of said at least one of the population, wherein at least one architecture of a programmatic entity is simultaneously evolved with a solution to the problem, such that a new programmatic entity is generated.

37. An apparatus for solving a problem comprising:

means for creating a population of programmatic entities;

means for generating a solution to the problem comprising means for altering an architecture of at least one of the population of programmatic entities, and means for evolving the population to generate a new entity, wherein the means for altering and the means for evolving operate to create a solution to the problem while evolving the architecture of said at least one of the population of programmatic entities.

38. The apparatus defined in claim 37 further comprising means for duplicating a portion of an internally invocable sub-entity from a programmatic entity in the population of programmatic entities.

39. The apparatus defined in claim 38 wherein said portion comprises an internally invocable sub-entity.

40. The apparatus defined in claim 38 wherein said portion comprises an argument of an internally invocable sub-entity.

41. The apparatus defined in claim 37 wherein the means for altering comprises means for deleting a portion of an internally invocable sub-entity from a programmatic entity in the population of programmatic entities.

42. The apparatus defined in claim 41 wherein said portion comprises an internally invocable sub-entity.

43. The apparatus defined in claim 41 wherein the means for altering further comprises means for placing a tree structure at an occurrence of an invocation of the deleted internally invocable sub-entity.

44. The apparatus defined in claim 41 wherein said portion comprises an argument of an internally invocable sub-entity.

45. The apparatus defined in claim 44 wherein the means for altering further comprises means for placing a tree structure at an occurrence of the argument once deleted.

46. The apparatus defined in claim 44 further comprising means for replacing the argument with another argument defined for use in the internally invocable sub-entity.

47. The apparatus defined in claim 37 further comprising means for replacing an internally invocable sub-entity with another internally invocable sub-entity in a programmatic entity.

48. The apparatus defined in claim 37 wherein the means for altering comprises means for creating an internally invocable sub-entity from a portion of an internally invocable sub-entity.

49. The apparatus defined in claim 37 wherein the means for altering comprises means for creating an argument for an internally invocable sub-entity.

50. A process for solving a problem comprising the steps of:

maintaining a population of programmatic entities; and modifying one or more programmatic entities in the population so as to evolve the population of programmatic entities to create a solution to the problem, said step of modifying including the step of altering an architecture of at least one of the population.

51. An apparatus for solving a problem comprising:

means for maintaining a population of programmatic entities; and means for modifying one or more programmatic entities in the population so as to evolve the population of programmatic entities to create a solution to the problem, said means for modifying including means for altering an architecture of at least one of the population.

* * * * *